United States Patent
Takahashi et al.

(10) Patent No.: US 8,787,691 B2
(45) Date of Patent: Jul. 22, 2014

(54) IMAGE PROCESSING DEVICE AND IMAGE PROCESSING METHOD OF IMAGES WITH PIXELS ARRAYED IN A CHECKERBOARD FASHION

(75) Inventors: Yoshitomo Takahashi, Kanagawa (JP); Teruhiko Suzuki, Kanagawa (JP); Takuya Kitamura, Tokyo (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 340 days.

(21) Appl. No.: 13/378,744

(22) PCT Filed: Jun. 23, 2010

(86) PCT No.: PCT/JP2010/060604
§ 371 (c)(1),
(2), (4) Date: Dec. 16, 2011

(87) PCT Pub. No.: WO2011/001864
PCT Pub. Date: Jan. 6, 2011

(65) Prior Publication Data
US 2012/0114260 A1    May 10, 2012

(30) Foreign Application Priority Data
Jul. 1, 2009 (JP) .................... 2009-156562
Jan. 25, 2010 (JP) .................... 2010-012952

(51) Int. Cl.
*G06K 9/36* (2006.01)

(52) U.S. Cl.
USPC ............ 382/238; 382/258; 382/260; 348/43; 358/524

(58) Field of Classification Search
USPC ............ 382/238, 258, 260; 358/524; 348/43
See application file for complete search history.

(56) References Cited

U.S. PATENT DOCUMENTS

| 5,767,898 A | 6/1998 | Urano et al. |
| 6,075,556 A | 6/2000 | Urano et al. |

(Continued)

FOREIGN PATENT DOCUMENTS

| JP | 3 187693 | 8/1991 |
| JP | 8-70475 | 3/1996 |

(Continued)

OTHER PUBLICATIONS

Extended European Search Report issued Mar. 6, 2013 in Patent Application No. 10794033.0.

(Continued)

*Primary Examiner* — Chan Park
*Assistant Examiner* — Eueng-Nan Yeh
(74) *Attorney, Agent, or Firm* — Oblon, Spivak, McClelland, Maier & Neustadt, L.L.P.

(57) ABSTRACT

Encoding efficiency of image prediction encoding can be improved by performing horizontal packing as horizontal processing to manipulate a horizontal-direction array of pixels of each of a first thinned-out image and a second thinned-out image arrayed in checkerboard fashion, obtained by thinning out the pixels of each of a first image and a second image different from the first image every other line in an oblique direction, wherein pixels of first and second thinned-out images are packed in the horizontal direction. A combined image can be generated, which is combined by adjacently arraying the post-horizontal processing first and second thinned-out images after horizontal processing, as an image to serve as the object of prediction encoding. Aspects of this disclosure can be applied to a case of performing prediction encoding on a first and second image, such as a left and right images making up a 3D image.

18 Claims, 34 Drawing Sheets

(56) References Cited

U.S. PATENT DOCUMENTS

| | | | |
|---|---|---|---|
| 2008/0089428 A1 | 4/2008 | Nakamura et al. | |
| 2008/0303895 A1 | 12/2008 | Akka et al. | |
| 2009/0268816 A1* | 10/2009 | Pandit et al. | 375/240.12 |
| 2010/0045782 A1 | 2/2010 | Morita | |
| 2010/0260268 A1* | 10/2010 | Cowan et al. | 375/240.25 |

FOREIGN PATENT DOCUMENTS

| | | |
|---|---|---|
| JP | 9 271042 | 10/1997 |
| JP | 2001 268596 | 9/2001 |
| JP | 2005-522958 | 7/2005 |
| JP | 2006 135783 | 5/2006 |
| JP | 2008 182669 | 8/2008 |
| JP | 2010 49607 | 3/2010 |
| JP | 2010 171522 | 8/2010 |

OTHER PUBLICATIONS

Alexis M Tourapis, et al., "Format Extensions to the Spatially Interleaved Pictures SEI message", Joint Video Team (JVT) of ISO/IEC MPEG & ITU-T VCEG, XP030007457A, Jan. 31, 2009, pp. 1-10.

Tomoo Yamakage, et al., "Generalized SEI message for spatially intereleaved pictures", Joint Video Team (JVT) of ISO/IEC MPEG & ITU-T VCEG, XP030007447A, Jan. 25, 2009, 1-6.

Combined Chinese Office Action and Search Report issued Dec. 2, 2013 in Patent Application No. 201080028005.5 with English Translation.

International Search Report Issued Sep. 28, 2010 in PCT/JP10/60604 Filed Jun. 23, 2010.

Office Action mailed Feb. 27, 2014, in Japanese Patent Application No. 2010-012952 (with English-language translation).

* cited by examiner

CONVENTIONAL EXAMPLE

CONVENTIONAL EXAMPLE

CONVENTIONAL EXAMPLE

FIG. 14

| separate_flag | 0 | NO SEPARATION INTO ODD LINES AND EVEN LINES |
| --- | --- | --- |
| | 1 | SEPARATION INTO ODD LINES AND EVEN LINES |
| vertical_pattern | 0 | SHIFT ODD LINES AND EVEN LINES IN VERTICAL DIRECTION |
| | 1 | INTERLEAVE ODD LINES ALONE AND EVEN LINES ALONE |
| arrange_pattern | 0 TO 5 | USE PATTERNS #0 THROUGH #5 FOR ARRAY PATTERNS |

IMAGE PROCESSING DEVICE AND IMAGE PROCESSING METHOD OF IMAGES WITH PIXELS ARRAYED IN A CHECKERBOARD FASHION

TECHNICAL FIELD

The present invention relates to an image processing device and an image processing method, and more particularly relates to an image processing device and an image processing method whereby, for example, encoding efficiency of prediction encoding of an image can be improved.

BACKGROUND ART

As of recent, there have come into widespread use, both for information distribution such as broadcasting stations and information reception in general homes, devices which conform to formats such as MPEG (Moving Picture Expert Group) which uses redundancy which is characteristic to image information and perform compression by orthogonal transform such as discreet cosine transform and the like and motion compensation, in order to transmit and store information with high efficiency when handling image information as digital signals.

That is to say, there is coming into widespread use encoding devices and decoding devices used for processing performed when receiving image information compressed by an encoding format using orthogonal transform such as discrete cosine transform or Karhunen-Louève transform and motion compensation, such as MPEG or H.26x or the like for example (bit stream) via network media such as satellite broadcasting, cable TV, the Internet or the like, or at the time of processing such on storage media such as optical discs or magnetic disks, flash memory, or the like.

For example, MPEG2 (ISO/IEC 13818-2) is defined as a general-purpose image encoding format, and is a standard which encompasses both interlace scanning images (interlace format images) and sequential scanning images (progressive format) images, and also standard resolution images and high-resolution images, and is currently widely used in a broad range of professional-use and consumer use applications. Using the MPEG2 compression format enables realization of high compression rate and good image quality by assigning a code amount (bit rate) of 4 to 8 Mbps for interlace scanning images of standard resolution having a horizontal× vertical size of 720×480 pixels, and 18 to 22 Mbps interlace scanning images of high resolution having a horizontal×vertical size of 1920×1088 pixels.

MPEG2 was primarily for high image quality encoding suitable for broadcasting, but did not handle code amounts (bit rate) lower than MPEG1, i.e., encoding formats with even higher compression rates. It is thought that cellular phones coming into widespread use will increase the demand for such encoding formats from now on, and accordingly the MPEG4 encoding format has been standardized. With regard to the image encoding method, the standard thereof was recognized as an international standard as ISO/IEC 14496-2 in December 1998.

Further, as of recent, progress is being made on standardization of a standard called H.264 (ITU-TQ6/16 VCEG), which initially was intended for image encoding for videoconferencing. It is known that H.264 can realize even higher encoding efficiency as compared with conventional encoding methods such as MPEG2 or MPEG4, though greater computation amounts are required for the encoding and decoding thereof. Also, currently, standardization based on H.264 for realizing even higher encoding efficiency including functions not supported by H.264 is being worked on as part of MPEG4 activities, as Joint Model of Enhanced-Compression Video Coding.

With regard to the encoding format (JVT Codec) being standardized by the Joint Video Team, various improvements are being studied to improve the encoding efficiency beyond the existing art such as MPEG2 or MPEG4 or the like. For example, with discrete cosine transform, transform to integer transform coefficients is performed on blocks of 4×4 pixels. Also, with motion compensation, the block sizes are variable, and optimal motion compensation can be performed. Note however, that the basic algorithms for encoding are the same as with the existing art such as MPEG2 or MPEG4 or the like.

Now, as for image contents to be subjected to encoding such as described above, there are stereoscopic image contents which can be viewed by stereoscopy, in addition to 2-dimensional images (2D images)

A dedicated device (hereinafter, stereoscopy device) is used for displaying stereoscopic images, an example of such a stereoscopy device being an IP (Integral Photography) stereoscopic image system developed by NHK (Japan Broadcasting Corporation).

Image data of a stereoscopic image is made up of image data from multiple viewpoints (image data of images shot from multiple viewpoints), and the greater the number of viewpoints there are and the wider range the viewpoints are spread over, the more a "television which can be looked into", as if it were, can be realized where the subject can be seen from various directions.

Now, a method for encoding and decoding image data of stereoscopic images, i.e., image data of multiple viewpoints, is described in, for example, PTL 1.

Of stereoscopic images, that which has the fewest number of viewpoints is a 3D (Dimensional) image of which the number of viewpoints is two viewpoints (stereo image), with the image data of the 3D image being made up of image data of a left eye image which is an image observed with the left eye (hereinafter also referred to as L (Left) image), and a right eye image which is an image observed with the right eye (hereinafter also referred to as R (Right) image).

AS described above, a 3D image (stereo image) is configured of an L image and R image, so image data of the two screens worth of the L image and R image (two screens worth of a case of displaying a 2D image) is necessary for display of one screen of a 3D image.

However, depending on the transmission band of a transmission path for transmitting the 3D image, storage capacity of the recording medium for recording the 3D image, transfer rate restrictions to the recording medium, and so forth, there are cases where it is difficult to transmit two screens worth of image data (including recording to the recording medium) for displaying one screen of the 3D image.

Accordingly, an encoding device has been proposed which performs processing to convert the image data for displaying one screen of 3D image into image data for one screen worth by performing sub-sampling (thinning out) of each of the L image and R image making up the 3D image, in the spatial direction, following which the image data is encoded.

FIG. 1 is a diagram for describing methods for thinning out (pixels of) the L image and R image making up the 3D image.

A in FIG. 1 is a diagram illustrating the L image and R image.

The L image and R image each have one screen worth of a 2D image (2-dimensional image).

B in FIG. 1 illustrates an image where the spatial resolution in the horizontal direction is made to be ½ that of the original by thinning out the pixels of each of the L image and R image every other line in the vertical direction.

Note that for thinning out every other line in the vertical direction, either odd-numbered or even-numbered pixels from the left of the L image and R image may be thinned out, or an arrangement may be made where, of the L image and R image, one of odd-numbered and even-numbered pixels is thinned out for the L image and the other is thinned out for the R image.

C in FIG. 1 illustrates an image where the spatial resolution in the vertical direction is made to be ½ that of the original by thinning out the pixels of each of the L image and R image every other line in the horizontal direction.

Note that for thinning out every other line in the horizontal direction, either odd or even-numbered pixels from the top of the L image and R image may be thinned out, or an arrangement may be made where, of the L image and R image, one of odd-numbered and even-numbered pixels is thinned out for the L image and the other is thinned out for the R image.

D in FIG. 1 illustrates an image where the spatial resolution in oblique direction is made to be ½ that of the original by thinning out the pixels of each of the L image and R image every other line in an oblique direction (either the oblique direction toward the upper left or the oblique direction toward the upper right).

The L image and R image after thinning out in D in FIG. 1 are images where pixels are arrayed in checkerboard fashion, due to the thinning out of pixels in the oblique direction.

With thinning out of pixels in the oblique direction, the pixels to be thinned out from one of the L image and R image may be pixels of the same pixels to be thinned out from the other image, or may be pixels other than pixels to be thinned out from the other image (pixels at the positions where pixels are remaining in the other image following thinning out).

The number of pixels of the L image and R image following thinning out is ½ of the original with any thinning of B in FIG. 1 through D in FIG. 1, and consequently the overall data amount (number of pixels) of the L image and R image following thinning out is equal to the data amount of one screen worth of image data of a 2D image.

Note that when thinning out pixels, filtering is necessary to cut out high-band components in order to prevent aliasing from occurring due to the thinning out, and blurring occurs in the L image and R image following thinning out due to this filtering.

Human sight tends to be insensitive in the oblique direction as compared to the horizontal direction or vertical direction, so by performing pixel thinning out of pixels in the oblique direction, visually apparent blurring can be reduced.

FIG. 2 is a block diagram illustrating the configuration of an example of a conventional encoding device which performs thinning out of every other line in the oblique direction of the pixels of each of the L image and R image as described with D in FIG. 1, and encoding the thinned out L image and thinned out R image with pixels arrayed in checkerboard fashion that are obtained as a result thereof.

With the encoding device in FIG. 2, (image data of) a 3D image which is a moving image, for example, is supplied to a filter unit 11, in increments of single screens.

That is to say, an L image and R image making up one screen of a 3D image is supplied to the filter unit 11.

The filter unit 11 performs filtering to cut out high-band components (of the oblique direction spatial frequencies) of the L image and R image to prevent aliasing from occurring in the thinned out L image and thinned out R image obtained by thinning out the L image and R image.

That is to say, the filter unit 11 is configured of filters 11L and 11R which are low-pass filters.

The filter 11L performs filtering of the L image supplied to the filter unit 11, and supplies to a thinning out unit 12. The filter 11R performs filtering of the R image supplied to the filter unit 11, and supplies to the thinning out unit 12.

The thinning out unit 12 performs thinning out of the pixels of the L image supplied from the filter unit 11 every other line in the oblique direction as described with D in FIG. 1, whereby the L image from the filter unit 11 is converted into a thinned out L image with pixels arrayed in checkerboard fashion.

Further, the thinning out unit 12 performs thinning out of the pixels of the R image supplied from the filter unit 11 in the oblique direction in the same way, whereby the R image from the filter unit 11 is converted into a thinned out R image with pixels arrayed in checkerboard fashion.

That is to say, the thinning out unit 12 is configured of thinning out units 12L and 12R.

The thinning out unit 12L performs thinning out of the pixels of the L image supplied from the filter unit 11 every other line in the oblique direction as described with D in FIG. 1, and supplies a thinned out L image with the pixels arrayed in checkerboard fashion (checkerboard pattern) to a combining unit 13.

The thinning out unit 12R performs thinning out of the pixels of the R image supplied from the filter unit 11 every other line in the oblique direction as described with D in FIG. 1, and supplies a thinned out R image with the pixels arrayed in checkerboard fashion to the combining unit 13.

We will say that the thinning out unit 12R performs thinning out from the R image of pixels other than the pixels which the thinning out unit 12L has performed thinning out of from the L image.

Accordingly, the thinned out L image (or thinned out R image) is an image with pixels where there are no pixels in the thinned out R image (or thinned out L image).

The combining unit 13 combines the thinned out L image and the thinned out R image supplied from the thinning out unit 12, generates a combined image equal to the data amount of image data of one screen worth of a 2D image, and supplies this to an encoder 14.

The encoder 14 encodes the combined image supplied from the combining unit 13 with the MPEG2 format or H.264/AVC format or the like for example, and outputs the encoded data obtained as a result thereof. The encoded data which the encoder 14 outputs is transmitted via a transmission medium, or recorded in a recording medium.

FIG. 3 is a diagram for describing combining of the thinned out L image and thinned out R image at the combining unit 13 in FIG. 2.

A in FIG. 3 is a diagram illustrating the thinned out L image and thinned out R image to be combined at the combining unit 13.

The thinned out L image and thinned out R image are such that the pixels (remaining after thinning out) are arrayed in checkerboard fashion.

That is to say, we will express (the pixel value of) a pixel x'th from the left and y'th from the top that makes up the thinned out L image as $L_{x, y}$, and a pixel x'th from the left and y'th from the top that makes up the thinned out R image as $R_{x, y}$.

Also, we will say that C being the remainder of dividing A by B will be expressed by the expression modd(A, B)=C.

The thinned out L image is an image where the pixel $L_{x, y}$ is situated at a position (x, y) satisfying an expression modd(x, 2)=modd(y, 2)=0 and a position (x, y) satisfying an expression modd(x, 2)=modd(y, 2)=1 (or at a position (x, y) satisfying expression modd(x, 2)=1 and expression modd(y, 2)=0, and at a position (x, y) satisfying expression modd(x, 2)=0 and expression modd(y, 2)=1).

Also, the thinned out R image is an image where the pixel $R_{x, y}$ is situated at a position (x, y) satisfying expression modd(x, 2)=1 and expression modd(y, 2)=0, and at a position (x, y) satisfying expression modd(x, 2)=0 and expression modd(y, 2)=1 (or at a position (x, y) satisfying expression modd(x, 2)=modd(y, 2)=0 and a position (x, y) satisfying expression modd(x, 2)=modd(y, 2)=1).

B in FIG. 3 illustrates a combined image obtained by combining the thinned out L image and thinned out R image at the combining unit 13 shown in FIG. 2.

The combining unit 13 generates a combined image where the pixels $L_{x, y}$ of the thinned out L image and the pixels $R_{x, y}$ of the thinned out R image are arrayed in checkerboard fashion, by fitting, as if it were, the pixels $R_{x, y}$ of the thinned out R image into the thinned-out L image at positions where the pixels $L_{x, y}$ of the thinned out L image are not arrayed, for example.

That is to say, the combining unit 13 situates the pixels $L_{x, y}$ of the thinned out L image at a position (x, y) satisfying expression modd(x, 2)=modd(y, 2)=0 and a position (x, y) satisfying expression modd(x, 2)=modd(y, 2)=1, and also situates the pixels $R_{x, y}$ of the thinned out R image at a position (x, y) satisfying expression modd(x, 2)=1 and expression modd(y, 2)=0 and a position (x, y) satisfying expression modd (x, 2)=0 and expression modd(y, 2)=1, thereby generating a combined image equal to the data amount of image data of one screen worth of a 2D image.

Accordingly, if we express (the pixel value of) a pixel at position (x, y) in the combined image as $C_{x, y}$, $C_{x, y}$ is equal to the pixels $L_{x, y}$ of the thinned out L image at a position (x, y) satisfying expression modd(x, 2)=modd(y, 2)=0 and a position (x, y) satisfying expression modd(x, 2)=modd(y, 2)=1 ($C_{x, y}=L_{x, y}$).

Also, $C_{x, y}$ is equal to the pixels $R_{x, y}$ of the thinned out R image at a position (x, y) satisfying expression modd(x, 2)=1 and expression modd(y, 2)=0 and a position (x, y) satisfying expression modd(x, 2)=0 and expression modd(y, 2)=1 ($C_{x, y}=R_{x, y}$).

FIG. 4 is a block diagram illustrating the configuration of an example of a conventional decoding device which decodes encoded data output from the encoding device shown in FIG. 2.

With the decoding device in FIG. 4, a decoder 21 is supplied with encoded data which the encoding device outputs.

The decoder 21 performs decoding with a format corresponding to the format with which an encoder 34 in FIG. 2 performs encoding.

That is to say, the decoder 21 decodes the encoded data supplied thereto with the MPEG2 format or H.264/AVC format for example, and supplies the combined image obtained as a result thereof to a 3D display device 22.

The 3D display device 22 is a stereoscopic device capable of 3D display (displaying as a 3D image) of the combined image where the pixels $L_{x, y}$ of the thinned out L image and the pixels $R_{x, y}$ of the thinned out R image shown in B in FIG. 3 are arrayed in checkerboard fashion, and displays a 3D image by displaying the L image and R image for example, in accordance with the combined image from the decoder 21.

CITATION LIST

Patent Literature

PTL 1: Japanese Unexamined Patent Application Publication No. 2008-182669

SUMMARY OF INVENTION

Technical Problem

The thinned out L image and the thinned out R image are images with disparity, and the combined image obtained at the combining unit 13 of the encoding device in FIG. 2 is an image where the pixels $L_{x, y}$ of the thinned out L image and the pixels $R_{x, y}$ of the thinned out R image are arrayed in checkerboard fashion.

Accordingly, the combined image obtained from one screen of the 3D image for a certain screen (the L image for one screen and the R image for one screen) has the same amount of data (number of pixels) as compared with a 2D image of a scene the same as that scene (or the L image or R image making up that 3D image), but the temporal direction and spatial direction correlation of the image is markedly lower.

Specifically, in the event that there is an edge extending continuously (smoothly) in a certain direction such as the vertical direction or horizontal direction or the like, in a 3D image for example, the continuous edge within the 3D image appears as being a non-continuous edge in the combined image obtained by combining the thinned out L image an thinned out R image with disparity as described with FIG. 3.

As a result, with the combined image, spatial direction correlation (correlation between a certain pixel in one screen of the combined image, and the pixels around that pixel (particularly, the correlation between a pixel in the thinned out L image and pixels in the thinned out R image which are in the proximity of that pixel)).

Also, in the event that there is an object (moving object) moving at a constant speed in the 3D image, for example, with a combined image where the thinned out L image and thinned out R image with disparity are combined as described in FIG. 3, the motion of the object at the constant speed within the 3D image appears as different motions depending on the pixels.

As a result, with the combined image, the temporal direction correlation (the correlation between a certain screen and a screen immediately before or immediately after that screen) becomes low.

As described above, the correlation of the combined image in the spatial direction and temporal direction is low, so in the event that prediction encoding is to be performed at the encoder 14 of the encoding device in FIG. 2 where the image is encoded using the temporal direction or spatial direction correlation of the encoding, such as with MPEG2 format or H.264/AVC format encoding or the like for example (e.g., with regard to a portion of an image to be encoded, a portion temporally or spatially near to that portion is taken as a prediction value, and the difference between the portion to be encoded and the prediction value is encoded), the encoding efficiency of prediction encoding of the combined image deteriorates.

Such deterioration in encoding efficiency occurs not only in the case of performing prediction encoding of an L image and R image making up a 3D image, but also a case of generating a combined image from any two different images and performing prediction encoding.

The present invention has been made in light of such a situation, and is to enable improvement in encoding efficiency of prediction encoding of images.

Solution to Problem

An image processing device according to a first aspect of the invention includes: horizontal processing means configured to take, as an object of processing, a first thinned-out image obtained by thinning out pixels of a first image in an oblique direction, and a second thinned-out image obtained by thinning out pixels of a second image which differs from the first image in an oblique direction, and perform horizontal packing in which, as horizontal processing for manipulating the array of pixels in the horizontal direction, pixels of the first thinned-out image and pixels of the second thinned-out image are packed in the horizontal direction; and combining means configured to generate, as an encoding object image to serve as the object of prediction encoding, a combined image in which the first thinned-out image and the second thinned-out image subjected to horizontal packing by the horizontal processing are arrayed adjacently.

An image processing method according to the first aspect of the invention includes the steps of: an image processing device taking, as an object of processing, a first thinned-out image obtained by thinning out pixels of a first image in an oblique direction, and a second thinned-out image obtained by thinning out pixels of a second image which differs from the first image in an oblique direction, and performing horizontal packing in which, as horizontal processing for manipulating the array of pixels in the horizontal direction, pixels of the first thinned-out image and pixels of the second thinned-out image are packed in the horizontal direction; and generating, as an encoding object image to serve as the object of prediction encoding, a combined image in which the first thinned-out image and the second thinned-out image subjected to horizontal packing by the horizontal processing are arrayed adjacently.

With the first aspect as described above, with a first thinned-out image obtained by thinning out pixels of a first image in an oblique direction, and a second thinned-out image obtained by thinning out pixels of a second image which differs from the first image in an oblique direction, as an object of processing, horizontal packing is performed in which, as horizontal processing for manipulating the array of pixels in the horizontal direction, pixels of the first thinned-out image and pixels of the second thinned-out image are packed in the horizontal direction, and a combined image is generated as an encoding object image to serve as the object of prediction encoding, in which the first thinned-out image and the second thinned-out image subjected to horizontal packing by the horizontal processing are arrayed adjacently.

An image processing device according to a second aspect of the first invention includes: separating means comprised to separate, into a first thinned-out image and a second thinned-out image subjected to horizontal packing by the horizontal processing, a combined image obtained by taking, as an object of processing, a first thinned-out image obtained by thinning out pixels of a first image in an oblique direction, and a second thinned-out image obtained by thinning out pixels of a second image which differs from the first image in an oblique direction, and performing horizontal packing in which, as horizontal processing for manipulating the array of pixels in the horizontal direction, pixels of the first thinned-out image and pixels of the second thinned-out image are packed in the horizontal direction, and performing prediction encoding of a combined image combined by adjacently arraying the first thinned-out image and the second thinned-out image subjected to horizontal packing by the horizontal processing, and decoding the encoded data obtained thereby; and inverse horizontal processing means configured to perform inverse horizontal processing, where the first thinned-out image and the second thinned-out image subjected to horizontal packing by the horizontal processing which have been separated by the separating means are returned to the first thinned-out image and the second thinned-out image.

An image processing method according to the second aspect of the invention includes the steps of: an image processing device separating, into a first thinned-out image and a second thinned-out image subjected to horizontal packing by said horizontal processing, a combined image obtained by taking, as an object of processing, a first thinned-out image obtained by thinning out pixels of a first image in an oblique direction, and a second thinned-out image obtained by thinning out pixels of a second image which differs from the first image in an oblique direction, and performing horizontal packing in which, as horizontal processing for manipulating the array of pixels in the horizontal direction, pixels of the first thinned-out image and pixels of the second thinned-out image are packed in the horizontal direction, and performing prediction encoding of the combined image combined by adjacently arraying the first thinned-out image and the second thinned-out image subjected to horizontal packing by the horizontal processing, and decoding the encoded data obtained thereby; and performing inverse horizontal processing, where the first thinned-out image and the second thinned-out image subjected to horizontal packing by the horizontal processing are returned to the first thinned-out image and the second thinned-out image.

With the second aspect as described above, separation is performed to separate, into a first thinned-out image and a second thinned-out image subjected to horizontal packing by said horizontal processing, a combined image obtained by taking, as an object of processing, a first thinned-out image obtained by thinning out pixels of a first image in an oblique direction, and a second thinned-out image obtained by thinning out pixels of a second image which differs from the first image in an oblique direction, and performing horizontal packing in which, as horizontal processing for manipulating the array of pixels in the horizontal direction, pixels of the first thinned-out image and pixels of the second thinned-out image are packed in the horizontal direction, and performing prediction encoding of the combined image combined by adjacently arraying the first thinned-out image and the second thinned-out image subjected to horizontal packing by the horizontal processing, and decoding the encoded data obtained thereby; and inverse horizontal processing is performed, where the first thinned-out image and the second thinned-out image subjected to horizontal packing by the horizontal processing are returned to the first thinned-out image and the second thinned-out image.

Note that the image processing devices of the first and second aspects may be independent devices, or may be internal blocks configuring a single device.

Also, the image processing device according to the first and second aspects may be realized by causing a computer to execute a program.

Further, in order to realize the encoded data where a combined image obtained at the first image processing device has been subjected to prediction encoding, and the image processing devices of the first and second aspects, the program to be executed by the computer may be provided by being transmitted via a transmission medium, or recorded in a recording medium.

Advantageous Effects of Invention

According to the first and second aspects of the present invention, encoding efficiency of prediction encoding of images can be improved.

BRIEF DESCRIPTION OF DRAWINGS

FIG. 14 is a diagram for describing a separate flag, a vertical pattern flag, and an arrange pattern flag.

DESCRIPTION OF EMBODIMENTS

First Embodiment

[Embodiment of Encoding Device]

Figure 5:
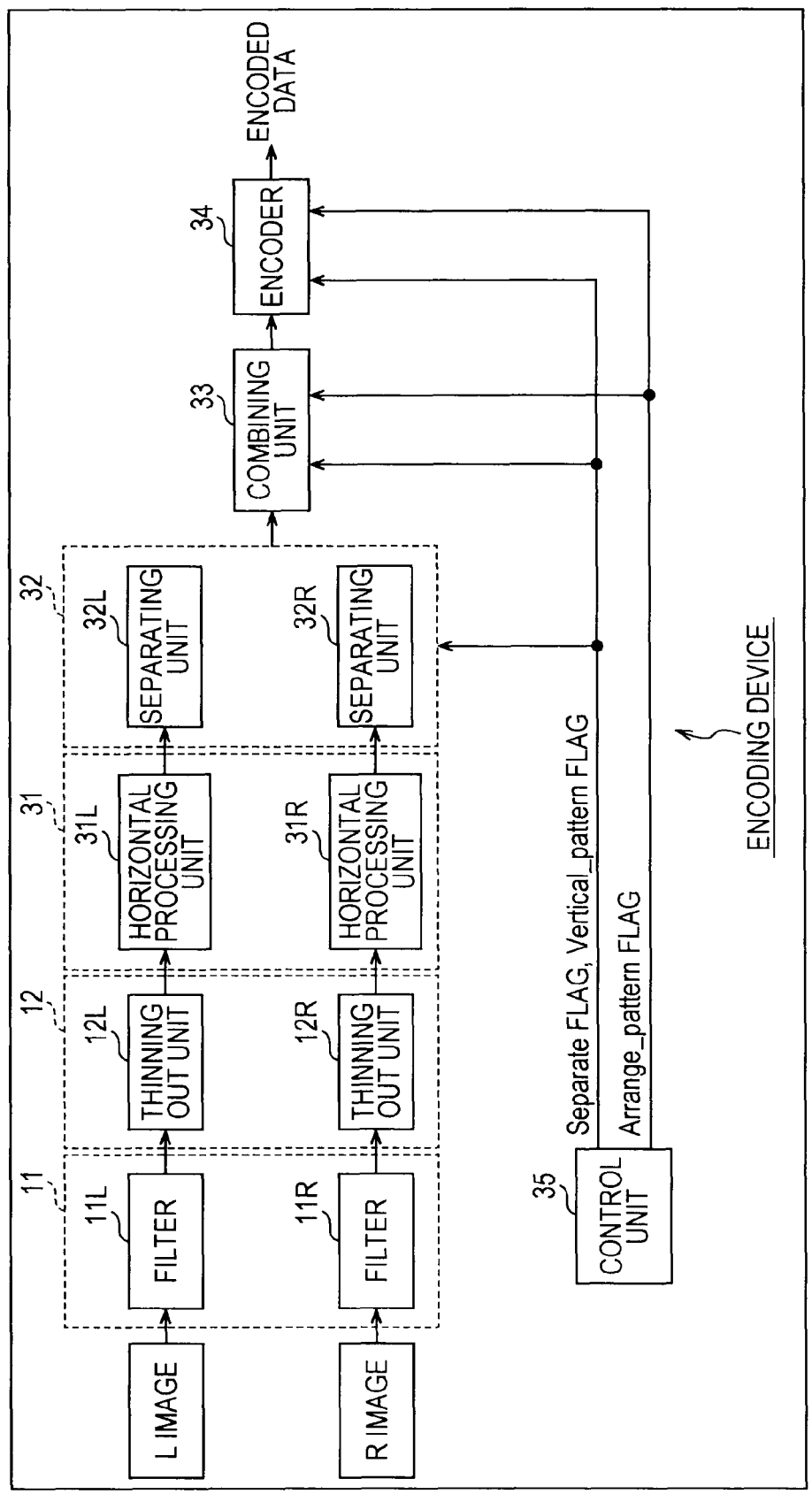
FIG. 5 is a block diagram illustrating a configuration example of an embodiment of an encoding device to which the present invention has been applied.

FIG. 5 is a block diagram illustrating the configuration of an embodiment of a encoding device to which an image processing device according to the present invention has been applied.

Figure 2:
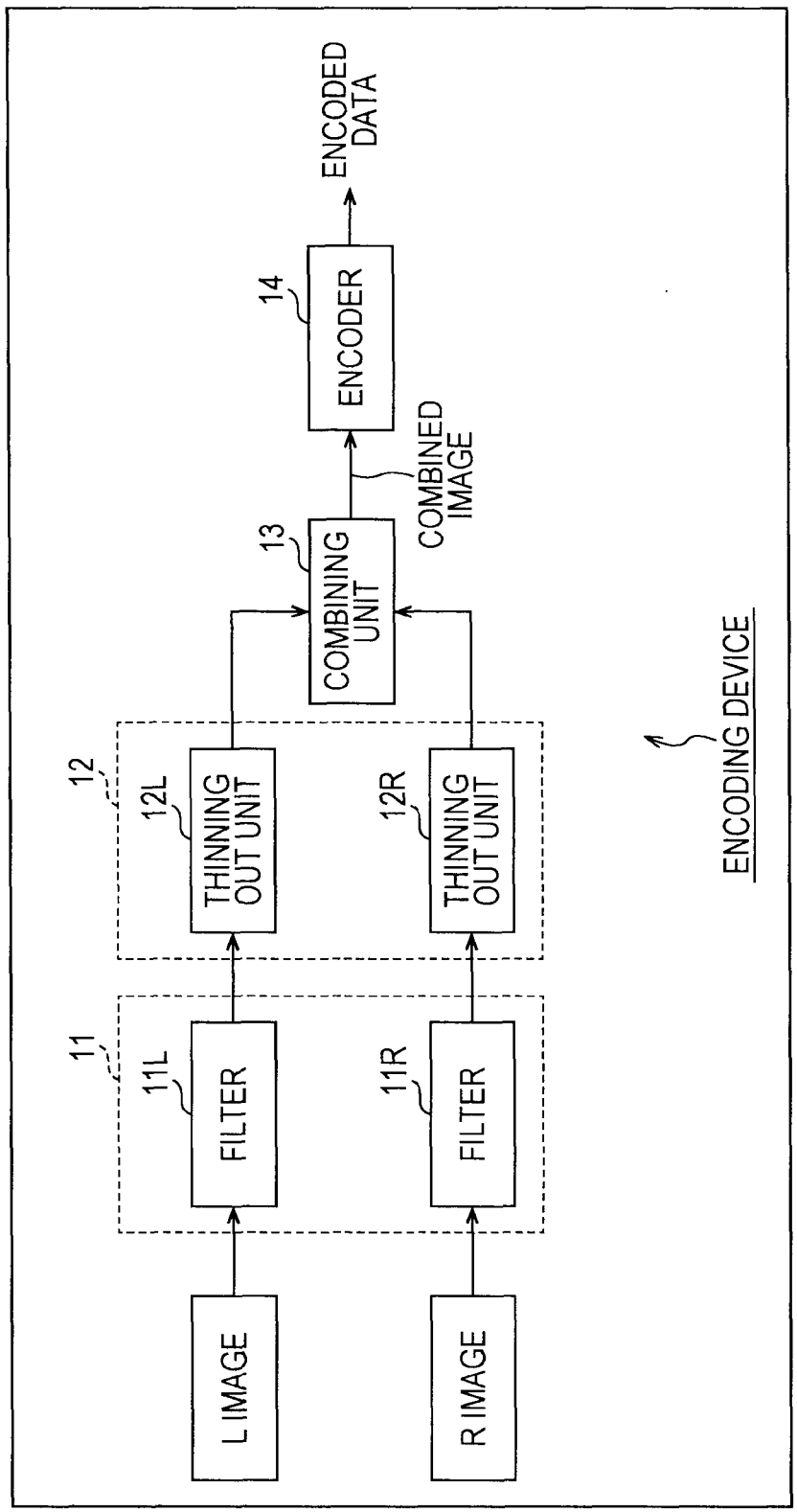
FIG. 2 is a block diagram illustrating the configuration of an example of a conventional encoding device.

In FIG. 5, the portions corresponding to the encoding device shown in FIG. 2 are denoted with the same reference numerals, and in the following, description thereof will be omitted as appropriate.

That is to say, the encoding device in FIG. 5 is the same as with the case in FIG. 2 regarding the point of having a filter unit 11 and thinning out unit 12.

Note however, that the encoding device in FIG. 5 differ from the case in FIG. 2 regarding the point of having a horizontal processing unit 31, a vertical processing unit 32, and a control unit 35. Further, the encoding device in FIG. 5 has, instead of the combining unit 13 and encoder 14, a combining unit 33 and encoder 34, respectively, which is a point also different from the case in FIG. 2.

The horizontal processing unit 31 is supplied from the thinning out unit 12 with a thinned out L image and thinned out R image with pixels arrayed in checkerboard fashion, obtained by thinning out the pixels of each of the L image and R image every other line in the oblique direction.

That is to say, with the encoding device in FIG. 5, the L image and R image making up the 3D image are subjected to processing at the filter unit 11 and thinning out unit 12 the same as with the case in FIG. 2, and the thinned out L image and thinned out R image (first thinned out image and second thinned out image) obtained as a result thereof are supplied to the horizontal processing unit 31.

Now, while we will say that the two images of the L image and R image making up a 3D image are the object of processing at the encoding device, the object of processing at the encoding device are not restricted to the L image and R image.

That is to say, with the encoding device, two images with disparity other than an L image and R image making up a 3D image, specifically for example, the two images of an image of a certain subject shot from a certain position A, and an image shot from an arbitrary position at other than on a half line originating from the subject and passing through the position A, may be the object of processing.

Also, with the encoding device, an arbitrary first image and a second image different from the first image, specifically for example, the two images of an odd-numbered frame and even-numbered frame of a certain moving image, or frames of the same number from the start of two arbitrary moving images, and so forth, may be the object of processing.

The horizontal processing unit 31 performs horizontal packing, to pack the pixels of the thinned out L image and the thinned out R image in the horizontal direction, as horizontal processing for manipulating the positions of the pixels of each of the thinned out L image and thinned out R image from the thinning out unit 12 in the horizontal direction.

That is to say, the horizontal processing unit 31 is configured of a horizontal processing unit 31L and horizontal processing unit 31R.

The horizontal processing unit 31L subjects the thinned out L image from the thinning out unit 12 to horizontal processing, and supplies an image obtained as the result thereof (hereinafter also referred to as post-horizontal-processing L image) to the vertical processing unit 32.

That is to say, the thinned out L image is an image with the pixels arrayed in checkerboard fashion, so the pixels are arrayed with gaps, so as to say, in checkerboard fashion, as compared with a 2D image of the same size.

By shifting the pixels of the thinned out L image in the horizontal direction so that there are no gaps therein, the horizontal processing unit 31L generates an image in the state of the pixels of the thinned out L image being horizontally packed, as a post-horizontal-processing L image.

In the same way as with the horizontal processing unit 31L, the horizontal processing unit 31R subjects the thinned out R image from the thinning out unit 12 to horizontal processing, and supplies an image obtained as the result thereof (hereinafter also referred to as post-horizontal-processing R image) to the vertical processing unit 32.

As vertical processing to manipulate the placement in the vertical direction of the pixels of each of the post-horizontal-processing L image and post-horizontal-processing R image (first thinned out image following horizontal processing and second thinned out image following horizontal processing) from the horizontal processing unit 31, the vertical processing unit 32 performs processing to separate odd lines and even lines from the post-horizontal-processing L image and post-horizontal-processing R image, and generate multiple post-vertical-processing images including an image with only odd lines arrayed and an image with only even lines arrayed.

That is to say, the vertical processing unit 32 is configured of separating units 32L and 32R.

The separating unit 32L separates odd lines and even lines from the post-horizontal-processing L image from the horizontal processing unit 31.

The separating unit 32R separates odd lines and even lines from the post-horizontal-processing R image from the horizontal processing unit 31.

Now, in addition to being supplied with the post-horizontal-processing L image and post-horizontal-processing R image from the horizontal processing unit 31, the vertical processing unit 32 is supplied with a separate (Separate) flag and vertical pattern (Vertical_pattern) flag from the control unit 35.

The separate flag is a flag indicating whether or not to separate odd lines and even lines from the post-horizontal-processing L image and post-horizontal-processing R image (indicating whether or not odd lines and even lines are separated from the post-horizontal-processing L image and post-horizontal-processing R image).

Also, the vertical pattern flag is a flag indicating the array of the odd lines and even lines of the post-horizontal-processing L image and post-horizontal-processing R image, in the multiple post-vertical-processing images obtained at the vertical processing unit 32.

In the event that the separate flag from the control unit 35 indicates not separating odd lines and even lines from the post-horizontal-processing L image and post-horizontal-processing R image, the post-horizontal-processing L image and post-horizontal-processing R image from the horizontal processing unit 31 are supplied to the combining unit 33 as multiple post-vertical-processing images as they are, regardless of the vertical pattern flag from the control unit 35.

Accordingly, in the event that the separate flag indicates not separating odd lines and even lines from the post-horizontal-processing L image and post-horizontal-processing R image, no vertical processing is performed at the vertical processing unit 32, the post-horizontal-processing L image and post-horizontal-processing R image from the horizontal processing unit 31 are supplied to the combining unit 33 as multiple post-vertical-processing images as they are.

In the event that the separate flag from the control unit 35 indicates separating odd lines and even lines from the post-horizontal-processing L image and post-horizontal-processing R image, the vertical processing unit 32 causes the separating unit 32L to separate odd lines and even lines from the post-horizontal-processing L image from the horizontal processing unit 31, and also causes the separating unit 32R to separate odd lines and even lines from the post-horizontal-processing R image from the horizontal processing unit 31.

The vertical processing unit 32 then follows the vertical pattern flag from the control unit 35 to generate, as multiple post-vertical-processing images, the four images of an image with only the odd lines of the post-horizontal-processing L image arrayed, an image with only the even lines of the post-horizontal-processing L image arrayed, an image with only the odd lines of the post-horizontal-processing R image arrayed, and an image with only the even lines of the post-horizontal-processing R image arrayed, or the two images of a post-vertical-processing odd line image obtained by interleaving and arraying the odd lines of the post-horizontal-processing L image and post-horizontal-processing R image, and a post-vertical-processing even line image obtained by interleaving and arraying the even lines of the post-horizontal-processing L image and post-horizontal-processing R image, and to supply these to the combining unit 33.

Now hereinafter, an image with only odd lines of the post-horizontal-processing L image arrayed will also be referred to as an odd line L image, and an image with only even lines of the post-horizontal-processing L image arrayed will also be referred to as an even line L image. Also, an image with only odd lines of the post-horizontal-processing R image arrayed will also be referred to as an odd line R image, and an image with only even lines of the post-horizontal-processing R image arrayed will also be referred to as an even line R image.

In addition to being supplied with multiple post-vertical-processing images from the vertical processing unit 32, the combining unit 33 is supplied with a separate flag, a vertical pattern flag, and an arrange pattern (Arrange_pattern) flag, from the control unit 35.

Now, an arrange pattern flag is a flag indicating the array pattern of the four images in the event that the multiple post-vertical-processing images are the odd line L image, even line L image, odd line R image, and even line R image, and these four images are to be arrayed to make a combined image.

The combining unit 33 follows the separate flag, vertical pattern flag, and arrange pattern flag from the control unit 35 to array the multiple post-vertical-processing images from the vertical processing unit 32 and generate a combined image of the multiple post-vertical-processing images (an image of one screen worth of data amount the same as with one screen of L image or R image), which is output as an image to be subjected to prediction encoding at a downstream encoder 34.

Now, in the event that the separate flag indicates not separating odd lines and even lines from the post-horizontal-processing L image and post-horizontal-processing R image, the vertical processing unit 32 supplies the post-horizontal-processing L image and post-horizontal-processing R image to the combining unit 33 as multiple post-vertical-processing images as they are, as described earlier.

In this case, the combining unit 33 generates the combined image by arraying the post-horizontal-processing L image and post-horizontal-processing R image supplied from the vertical processing unit 32 as multiple post-vertical-processing images by arranging in a predetermined array.

Also, in the event that the separate flag from the control unit 35 indicates separating odd lines and even lines from the post-horizontal-processing L image and post-horizontal-processing R image, the combining unit 33 makes reference to the vertical pattern flag from the control unit 35 to confirm whether the image supplied as multiple post-vertical-processing images is the four images of an odd line L image, even line L image, odd line R image, and even line R image, or the two images of a post-vertical-processing odd line image and post-vertical-processing even line image.

In the event that the combining unit 33 is provided from the vertical processing unit 32 with the two images of a post-vertical-processing odd line image and post-vertical-processing even line image, as the multiple post-vertical-processing images, the combining unit 33 generates a combined image by arranging the post-vertical-processing odd line image and post-vertical-processing even line image as the multiple post-vertical-processing images in a predetermined array.

Also, in the event that the combining unit 33 is provided from the vertical processing unit 32 with the four images of an odd line L image, even line L image, odd line R image, and even line R image, as the multiple post-vertical-processing images, the combining unit 33 generates a combined image by arranging the odd line L image, even line L image, odd line R image, and even line R image, as the multiple post-vertical-processing images, in an array indicated by the array pattern which the arrange pattern flag from the control unit 35 indicates.

The encoder 34 is supplied with the combined image output from the combining unit 33 and the separate flag, vertical pattern flag, and arrange pattern flag output from the control unit 35.

The encoder 34 performs prediction encoding of the combined image output from the combining unit 33 in accordance with the MPEG2 format or H.264/AVC format or the like for example, and includes the separate flag, vertical pattern flag, and arrange pattern flag output from the control unit 35, in the encoding data obtained as the result of prediction encoding thereof, by multiplexing thereof.

The encoded data including the separate flag, vertical pattern flag, and arrange pattern flag, obtained at the encoder 34, is transmitted via a transmission medium, or is recorded in a recording medium.

The control unit 35 follows operator (user) operations and the like to set the separate flag, vertical pattern flag, and arrange pattern flag, and supplies to the combining unit 33 and encoder 34. Further, the control unit 35 supplies the separate flag and vertical pattern flag to the vertical processing unit 32.

Note that at the encoder 34, the separate flag, vertical pattern flag, and arrange pattern flag can be included in, for example, the header or the like of the system layer or picture layer, for example of the encoded data. Specifically, for example, in the event that encoding is to be performed at the encoder 34 with the H.264/AVC format for example, the separate flag, vertical pattern flag, and arrange pattern flag can be included in SEI (Supplemental Enhancement Information) which is user data. Note however, that the encoder 34 can transmit the encoded data, and the separate flag, vertical pattern flag, and arrange pattern flag, with various types of methods. That is to say, for transmission of the separate flag, vertical pattern flag, and arrange pattern flag, besides the above-described transmission of encoded data, and separate flag, vertical pattern flag, and arrange pattern flag, with the separate flag, vertical pattern flag, and arrange pattern flag described as a syntax within the encoded data such as SEI or the like, recording the encoded data, and separate flag, vertical pattern flag, and arrange pattern flag in a recording medium, transmitting the encoded data, and separate flag, vertical pattern flag, and arrange pattern flag, individually, and so forth, are included.

Now, with the encoding device in FIG. 5, the arrangement is such that the three flags of separate flag, vertical pattern flag, and arrange pattern flag, are prepared, and combined images with various patterns of pixel arrays can be generated by the settings of the three flags, but the combined image generated at the encoding device may be an image with the pixel array being one particular pattern.

That is to say, the encoding device in FIG. 5 can generate a combined image with the array of pixels being a particular pattern obtained in the event that the separate flag, vertical pattern flag, and arrange pattern flag are set to particular values.

Figure 3:
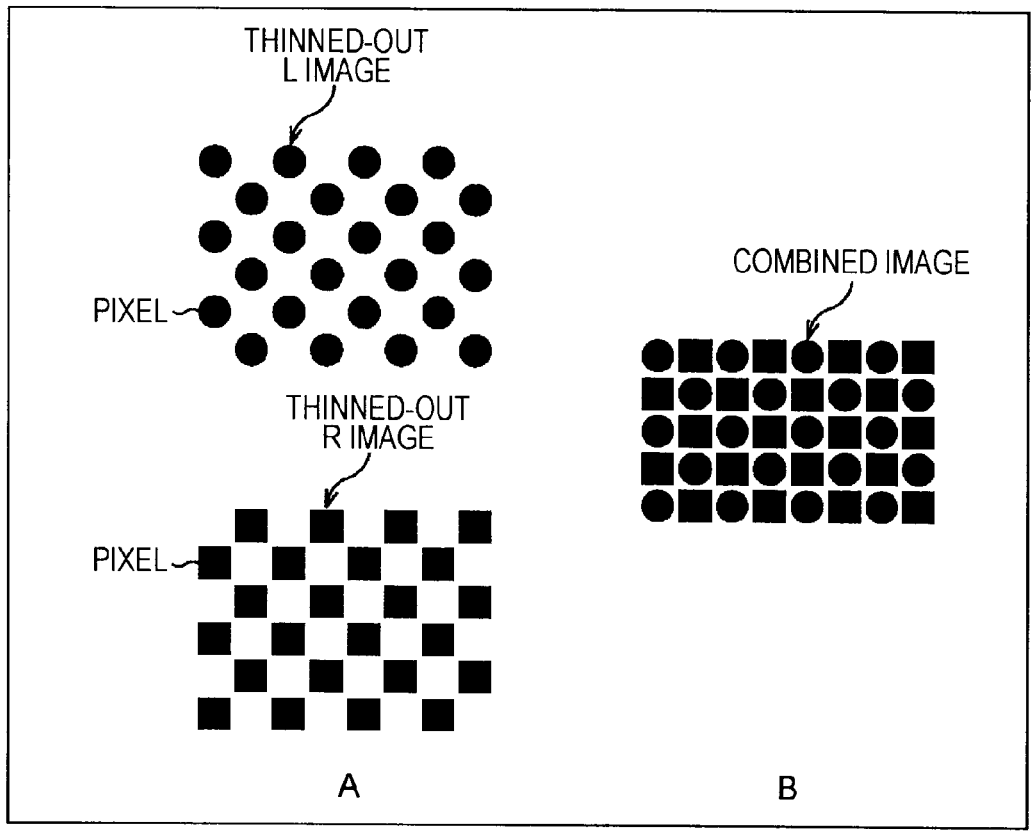
FIG. 3 is a diagram for describing combining of a thinned out L image and a thinned out R image at a combining unit 13.

In this case, by including in the encoded data a flag indicating whether the combined image is the same as a conventional image where the pixels of the thinned out R image are fit into positions where the pixels of the thinned out L image are not situated (B in FIG. 3) as described with FIG. 3, or whether the image is such that the array of pixels is a particular pattern, instead of the separate flag, vertical pattern flag, and arrange pattern flag, confirmation can be made at the decoding device which decodes the encoded data regarding which of the two images the combined image obtained as the result of decoding is.

[Configuration Example of Encoder 34]

Figure 6:
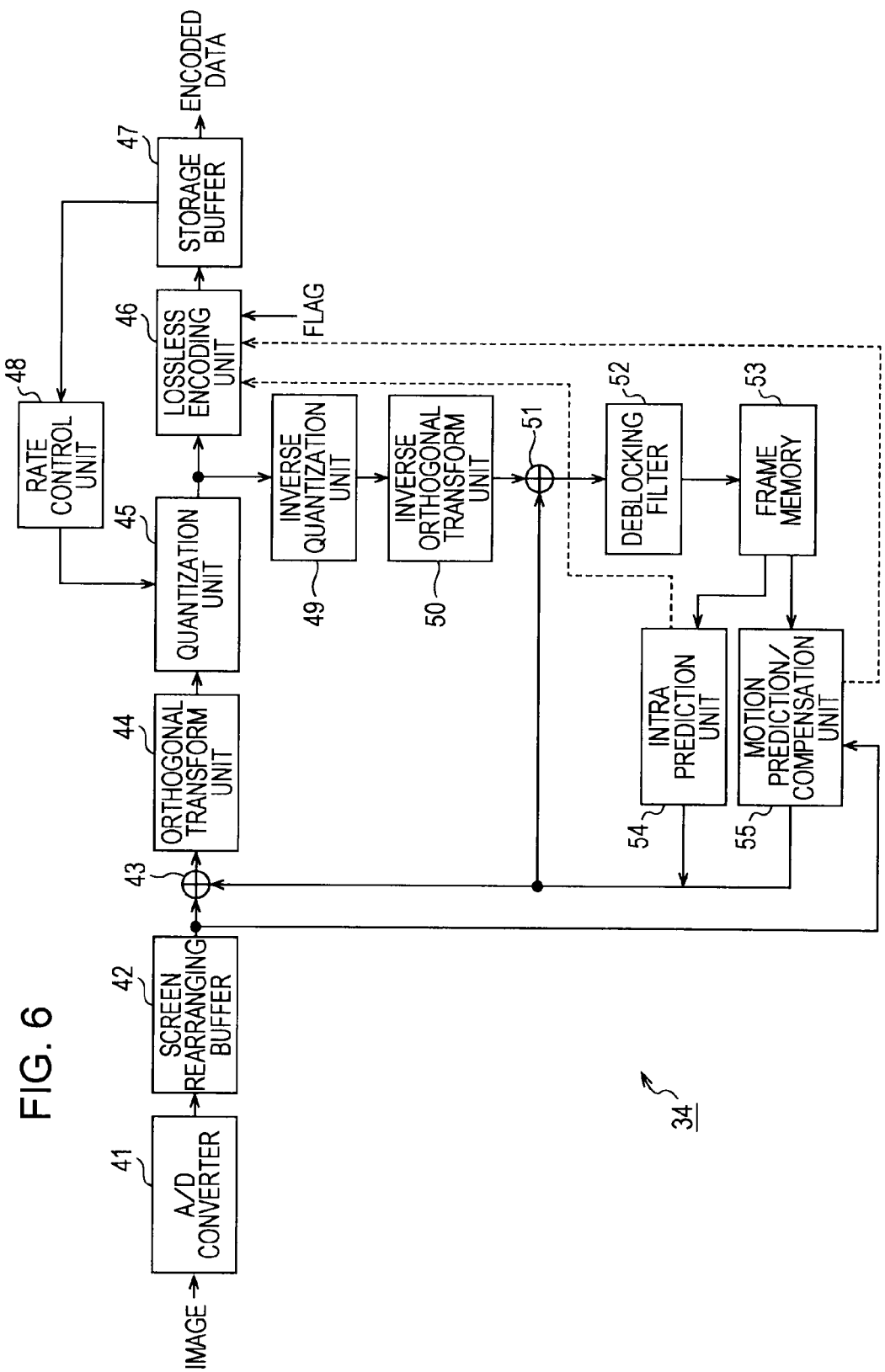
FIG. 6 is a block diagram illustrating a configuration example of a decoder 34.

FIG. 6 is a block diagram illustrating a configuration example of the encoder 34 in FIG. 5.

The encoder 34 is an image information encoding device which realizes image compression by orthogonal transform such as discrete cosine transform or Karhunen-Louève transform and motion compensation.

The image data to be encoded is supplied to an A/D (Analog/Digital) converting unit 41.

Now, with the present embodiment, the image data to be encoded which is supplied to the A/D converting unit 41 is image data of the combined image generated at the combining unit 33 (FIG. 5).

In the event that the image data supplied thereto is image data (signals) of analog signals, the A/D converting unit 41 performs A/D conversion of the image data, thereby converting into image data of digital signals, which is supplied to a screen rearranging buffer 42.

The screen rearranging buffer 42 temporarily stores the image data from the A/D converting unit 41 and reads this out as necessary, thereby performing rearranging wherein pictures of the image data (frames) (fields) are rearranged in the order of encoding, in accordance with the GOP (Group of Pictures) structure of the encoded data which is the output of the encoder 34.

Of the pictures read out from the screen rearranging buffer 42, intra pictures to be subjected to intra encoding are supplied to a computing unit 43.

The computing unit 43 subtracts pixel values of a prediction image supplied from an intra prediction unit 54, as necessary, from the pixel values of an intra picture supplied from the screen rearranging buffer 42, and this is supplied to an orthogonal transform unit 44.

The orthogonal transform unit 44 performs orthogonal transform such as discrete cosine transform or Karhunen-Louève transform on the intra picture (the pixel values thereof, of the subtracted values with the prediction image subtracted), and supplies the transform coefficients obtained as a result thereof to a quantization unit 45.

The quantization unit 45 performs quantization of the transform coefficients from the orthogonal transform unit 44, and supplies quantization values obtained as the result thereof to a lossless encoding unit 46.

The lossless encoding unit 46 performs lossless encoding such as variable-length encoding and arithmetic encoding or the like on the quantization values from the quantization unit 45, and supplies the encoded data obtained as a result thereof to a storage buffer 47.

The storage buffer 47 temporarily stores the encoded data from the lossless encoding unit 46, and outputs this with a predetermined rate.

A rate control unit 48 monitors the storage amount of encoded data in the storage buffer 47, and based on the storage amount thereof, controls the behavior of the quantization unit 45, such as a quantization step of the quantization unit 45 and so forth.

The quantization value obtained at the quantization unit 45 is supplied to the lossless encoding unit 46, and is also supplied to an inverse quantization unit 49. The inverse quantization unit 49 performs inverse quantization of the quantization values from the quantization unit 45 into transform coefficients, and supplies to an inverse orthogonal transform unit 50.

The inverse orthogonal transform unit 50 performs inverse orthogonal transform of the transform coefficients from the inverse quantization unit 49, and supplies to a computing unit 51.

The computing unit 51 adds to the data supplied from the inverse orthogonal transform unit 50, pixel values of a prediction image supplied from the intra prediction unit 54, as necessary, thereby obtaining a decoded image of the intra picture, which is supplied to a deblocking filter 52.

The deblocking filter 52 subjects the decoded image from the computing unit 51 to filtering processing for reducing block noise, and supplies this to frame memory 53.

The frame memory 53 temporarily stores the decoded image supplied from the computing unit 51 via the deblocking filter 52, and supplies this decoded image to the intra prediction unit 54 and motion-prediction/motion-compensation unit 55 as necessary, as a reference image to be used for generating a prediction image.

The intra prediction unit 54 generates a prediction image from pixels nearby a portion (block) which is the object of processing at the computing unit 43 that have already been stored in the frame memory 53, and supplies this to the computing units 43 and 51.

In the event that a prediction image is supplied from the intra prediction unit 54 to the computing unit 43 as described above, with regard to a picture regarding which intra encoding is to be performed, the prediction image supplied from the intra prediction unit 54 is subtracted at the computing unit 43 from the picture supplied from the image rearranging buffer 42.

Also, at the computing unit 51, the prediction image subtracted at the computing unit 43 is added to data supplied from the inverse orthogonal transform unit 50.

On the other hand, a non-intra picture to be subjected to inter encoding is supplied from the image rearranging buffer 42 to the computing unit 43 and motion-prediction/motion-compensation unit 55.

The motion-prediction/motion-compensation unit 55 reads out from the frame memory 53 a decoded picture to be referenced at the time of performing motion prediction of the non-intra picture from the image rearranging buffer 42. Further, the motion-prediction/motion-compensation unit 55 uses the reference image from the frame memory 53 to detect motion vectors regarding the non-intra picture from the image rearranging buffer 42.

The motion-prediction/motion-compensation unit 55 then subjects the reference image to motion compensation following the motion vectors, thereby generating a prediction image for the non-intra picture, which is supplied to the computing units 43 and 51.

At the computing unit 43, the prediction image supplied from the intra prediction unit 54 is subtracted from the non-intra picture supplied from the image rearranging buffer 42, and thereafter, encoding is performed in the same way as with an intra picture.

Note that the intra prediction mode representing the mode in which the intra prediction unit 54 generates the prediction image is supplied from the intra prediction unit 54 to the lossless encoding unit 46. Also, the motion vectors obtained at the motion-prediction/motion-compensation unit 55, and the motion compensation prediction mode representing the mode in which the motion-prediction/motion-compensation unit 55 performs motion compensation, are supplied from the motion-prediction/motion-compensation unit 55 to the lossless encoding unit 46.

Further, the separate flag, vertical pattern flag, and arrange pattern flag supplied from the control unit 35 (FIG. 5) to the encoder 34 are also supplied to the lossless encoding unit 46.

At the lossless encoding unit 46, the intra prediction mode, motion vectors, motion compensation prediction mode, and other information necessary for decoding such as the picture type of the pictures, and so on, are subjected to lossless encoding, and included in the header of the encoded data.

Further, at the lossless encoding unit 46, the separate flag, vertical pattern flag, and arrange pattern flag are included in the encoded data by multiplexing therewith.

[Processing of Encoding Device]

Figure 7:
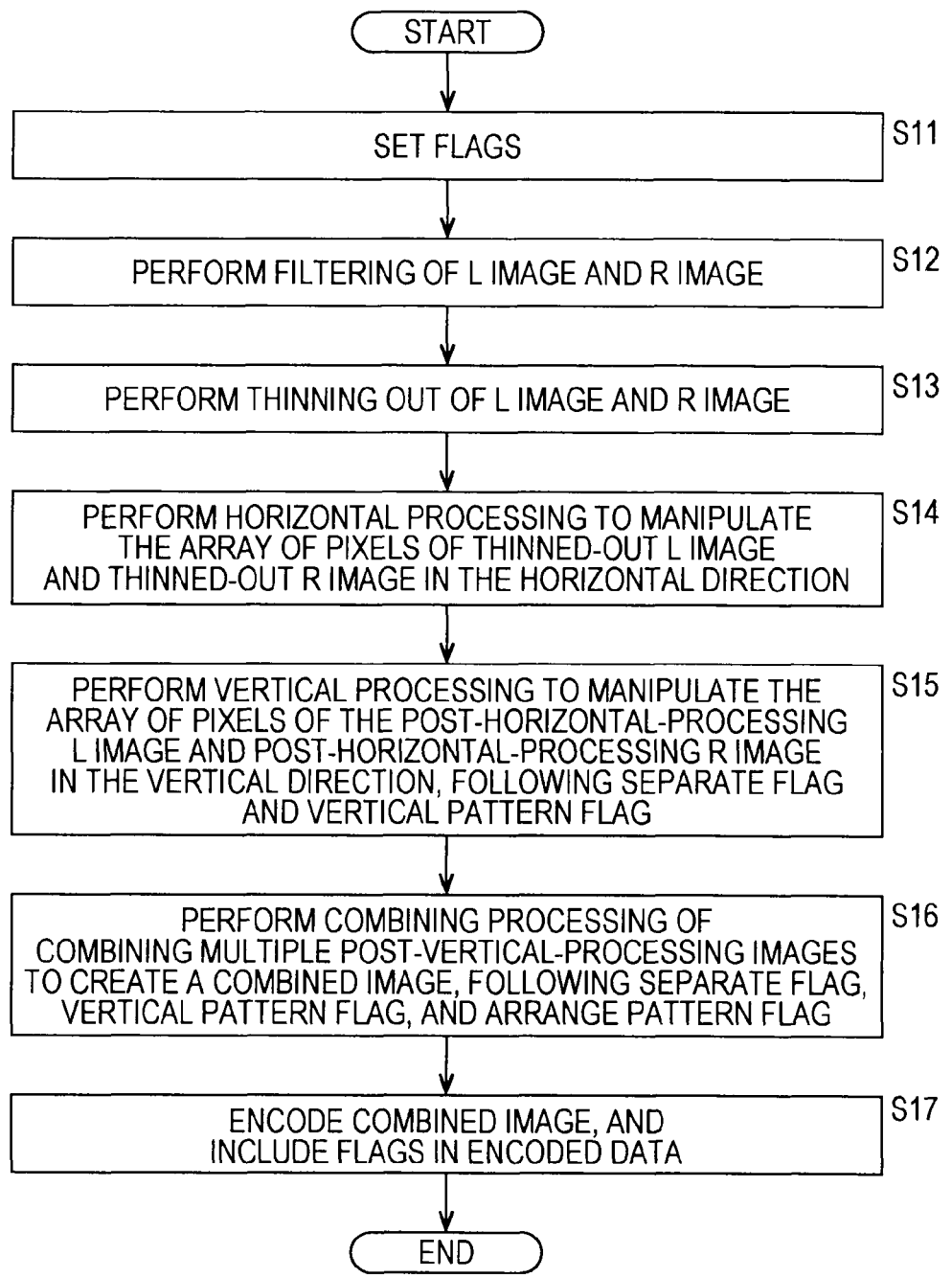
FIG. 7 is a flowchart for describing processing of the encoding device.

FIG. 7 is a flowchart for describing processing of the encoding device in FIG. 5 (image processing as encoding processing).

In step S11, the control unit 35 sets the separate flag, vertical pattern flag, and arrange pattern flag, and supplies to the combining unit 33 and encoder 34. Further, the control unit 35 supplies the separate flag, vertical pattern flag, and arrange pattern flag to the vertical processing unit 32, and the processing advances from step S11 to step S12.

In step S12, the filter unit 11 awaits for an L image and R image making up one screen of 3D image to be supplied thereto, and receives the L image and R image. The filter unit 11 performs filtering of each of the L image and R image, supplies these to the thinning out unit 12, and the processing advances from step S12 to step S13.

In step S13, the thinning out unit 12 performs thinning out of pixels from each of the L image and R image supplied from the filter unit 11, and supplies to the horizontal processing unit 31 the thinned out L image and thinned out R image of which the pixels are arrayed in checkerboard fashion.

Subsequently, the processing advances from step S13 to step S14, where the horizontal processing unit 31 subjects each of the thinned out L image and thinned out R image from the thinning out unit 12 to horizontal processing.

The horizontal processing unit 31 then supplies the post-horizontal-processing L image and post-horizontal-processing R image obtained as the result of horizontal processing to the vertical processing unit 32, and the processing advances from step S14 to step S15.

In step S15, the vertical processing unit 32 subjects the post-horizontal-processing L image and post-horizontal-processing R image from the horizontal processing unit 31 to vertical processing following the separate flag, vertical pattern flag, and arrange pattern flag supplied from the control unit 35, thereby generating multiple post-vertical-processing images.

The vertical processing unit 32 then supplies the multiple post-vertical-processing images to the combining unit 33, and the processing advances from step S15 to step S16.

In step S16, the combining unit 33 arrays the multiple post-vertical-processing images from the vertical processing unit 32 following the separate flag, vertical pattern flag, and arrange pattern flag from the control unit 35, thereby performing combining processing to generate a combined image with these multiple post-vertical-processing images combined.

Further, the combining unit 33 supplies the combined image to the encoder 34, and the processing advances from step S16 to step S17.

In step S17, the encoder 34 subjects the combined image output from the combining unit 33 to prediction encoding (encoding) following the MPEG2 format, H.264/AVC format, or the like, as an object of encoding.

Further, the encoder 34 includes the separate flag, vertical pattern flag, and arrange pattern flag supplied from the control unit 35 to the encoded data obtained as a result of the prediction encoding, and outputs.

The encoded data which the encoder 34 outputs is transmitted via a transmission medium, or recorded in a recording medium.

Note that the processing of step S11 through S17 is performed on L images and R images making up the screens of a 3D image.

Note that the setting of the separate flag, vertical pattern flag, and arrange pattern flag in step S11 may be set for just the first image of a 3D image serving as a content of one certain moving image, for example. In this case, processing following the separate flag, vertical pattern flag, and arrange pattern flag set regarding the first image is applied to all screens of the 3D image serving as the content.

[Horizontal Processing]

Figure 8:
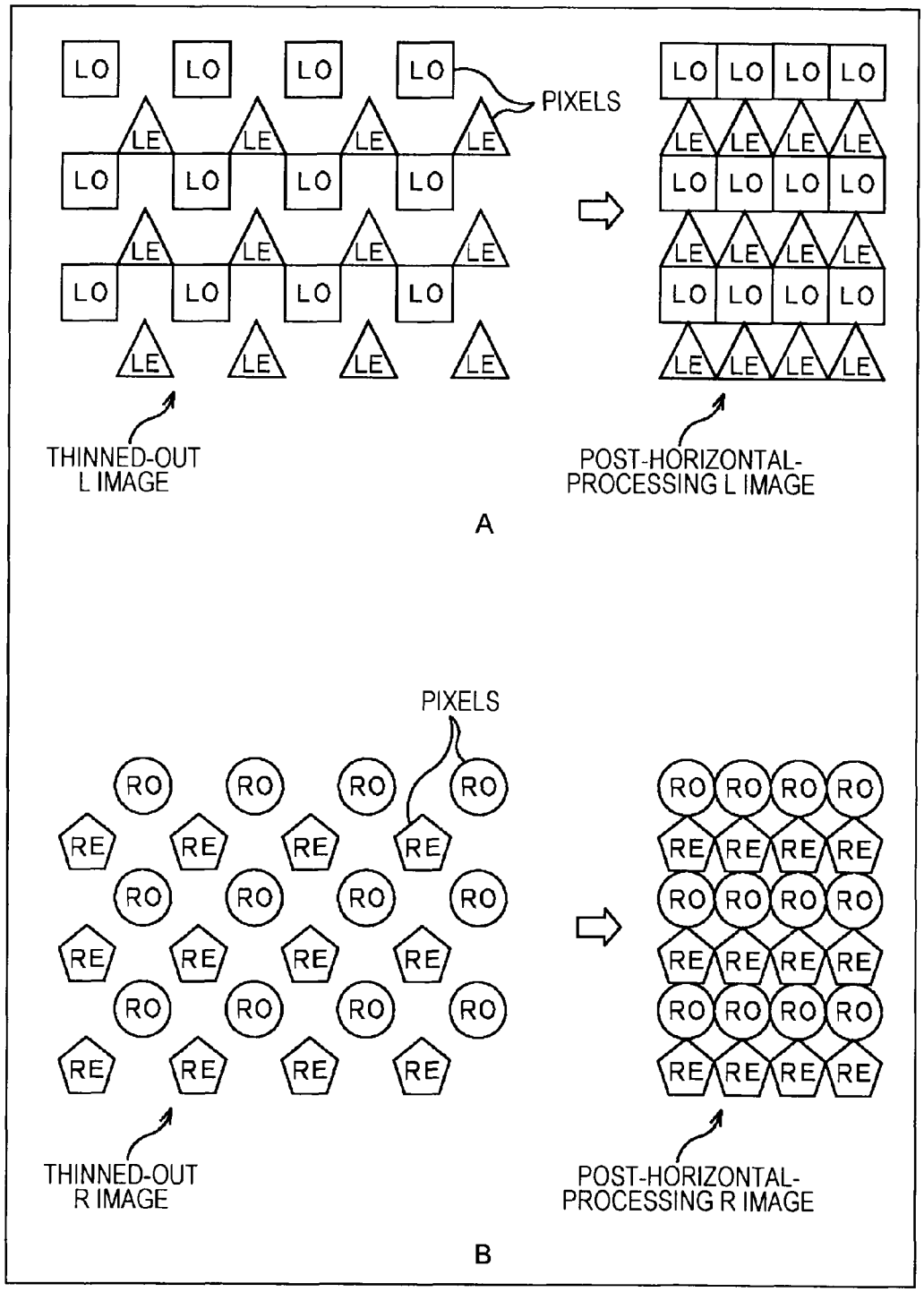
FIG. 8 is a diagram for describing parallel processing which a horizontal processing unit 31 performs.

FIG. 8 is a diagram for describing horizontal processing which the horizontal processing unit 31 in FIG. 5 performs.

As described above, the horizontal processing unit 31 performs horizontal packing, where the thinned out L image and thinned out R image with pixels arrayed in checkerboard fashion are packed in the horizontal direction, as processing for manipulating the array of pixels in the horizontal direction.

A in FIG. 8 illustrates horizontal processing on a thinned out L image.

Note that in FIG. 8, LO represents pixels in a thinned out L image (and by extension, an L image) that are in odd lines (odd (odd) numbered horizontal lines as counted from the top) thereof, and LE represents pixels in a thinned out L image that are in odd lines (even (even) numbered horizontal lines as counted from the top) thereof. This holds true in the following as well.

With the thinned out L image, pixels are arrayed in checkerboard fashion, and the pixels are arrayed with gaps therebetween, as compared with a 2D image of the same size.

With the horizontal processing as to the thinned out L image, an image with the pixels of the thinned out L image having been horizontally packed is generated as a post-horizontal-processing L image, by shifting the pixels of the thinned out L image in the horizontal direction, i.e., to the left in A in FIG. 8.

B in FIG. 8 illustrates horizontal processing on a thinned out R image.

Note that in FIG. 8, RO represents pixels in a thinned out R image (and by extension, an R image) that are in odd lines (odd horizontal lines as counted from the top) thereof, and RE represents pixels in a thinned out R image that are in odd lines (even horizontal lines as counted from the top) thereof. This holds true in the following as well.

With the thinned out R image, pixels are arrayed in checkerboard fashion, and the pixels are arrayed with gaps therebetween, as compared with a 2D image of the same size.

With the horizontal processing as to the thinned out R image, an image with the pixels of the thinned out R image having been horizontally packed is generated as a post-horizontal-processing R image, by shifting the pixels of the thinned out R image in the horizontal direction, i.e., to the left in B in FIG. 8.

[Processing Following Separate Flag, Vertical Pattern Flag, and Arrange Pattern Flag]

Figure 9:
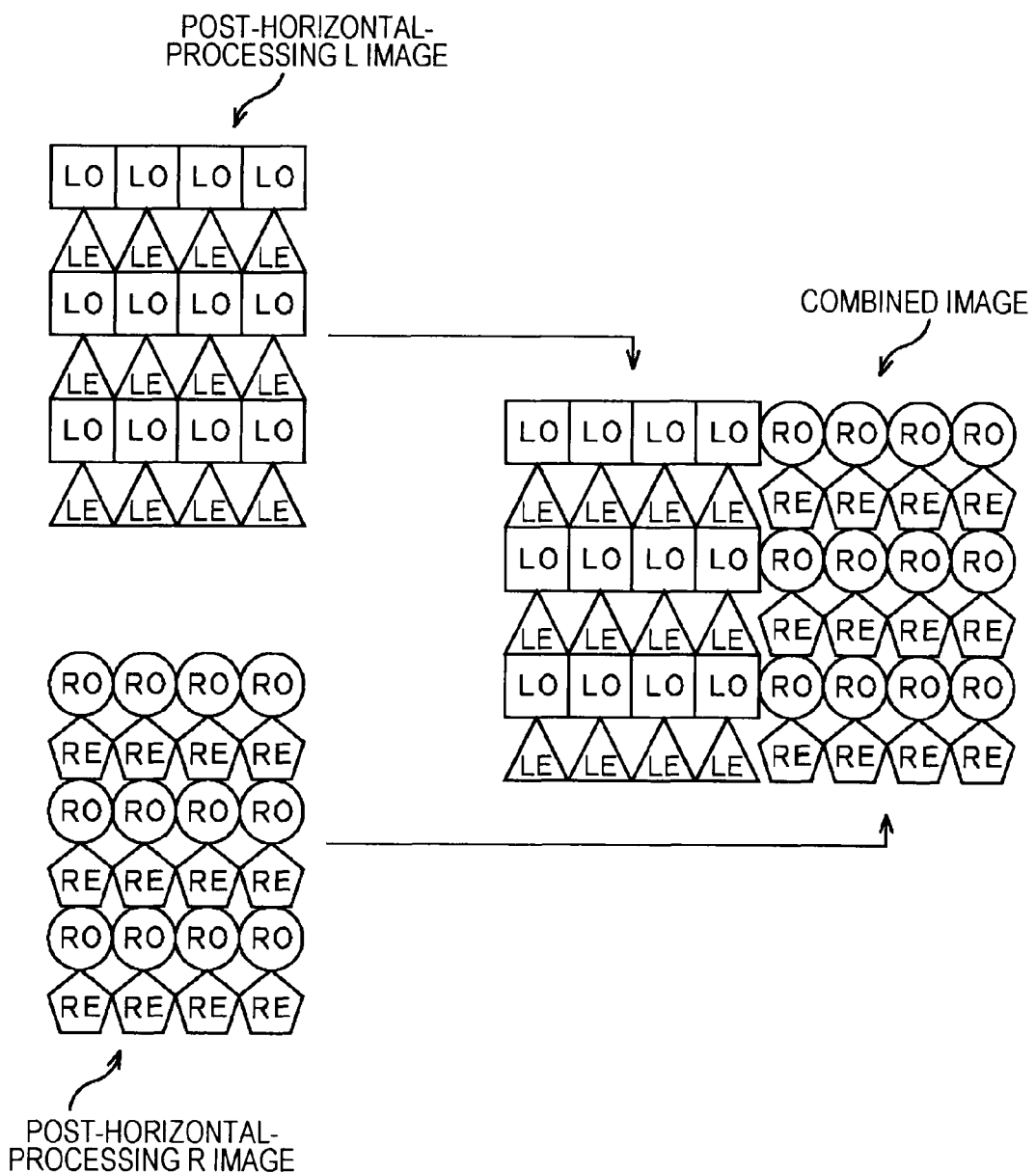
FIG. 9 is a diagram for describing encoding processing in the event that a separate flag indicates non-separation.

FIG. 9 illustrates the processing performed at the encoding device in FIG. 5 in the event that the separate flag indicates that the odd lines and even lines are not to be separated from the post-horizontal-processing L image and post-horizontal-processing R image (hereinafter also referred to as non-separation).

In the event that the separate flag indicates non-separation, the vertical processing unit 32 supplies the post-horizontal-processing L image and post-horizontal-processing R image generated at the horizontal processing unit 31 to the combining unit 33 as multiple post-vertical-processing images without change.

Further, in this case, the combining unit 33 generates a combined image by arranging the post-horizontal-processing L image and post-horizontal-processing R image supplied from the vertical processing unit 32 as multiple post-vertical-processing images, in a predetermined array.

That is to say, as shown in FIG. 9, the combining unit 33 places the post-horizontal-processing L image to the left side and places the post-horizontal-processing R image to the right side, thereby generating a combined image.

As described above, with a combined image generated in the event that the separate flag indicates non-separation, the post-horizontal-processing L image is placed to the left side and the post-horizontal-processing R image is placed to the right side.

The post-horizontal-processing L image is an image in a state of the pixels of the thinned out L image having been horizontally packed by being shifted in the horizontal direction so that there are no gaps between the pixels thereof. This is true for the post-horizontal-processing R image as well.

Accordingly, when focusing on the post-horizontal-processing L image or the post-horizontal-processing R image of the combined image, deterioration in correlation in the spatial direction and the temporal direction of the image can be prevented, and as a result, the encoding efficiency of prediction encoding of the combined image can be improved as compared to a case of an image where the pixels of the thinned out R image are fit into the thinned out L image into positions where the pixels of the thinned out L image are not arrayed, as described in FIG. 3.

That is to say, for example, in the event that there is an edge in an L image extending continuously in the horizontal direction, the continuity of that edge is still maintained in the post-horizontal-processing L image where pixels of the thinned out L image are horizontally packed. Accordingly, the correlation in the spatial direction and temporal direction of the image including the edge extending in the horizontal direction in the image is maintained, so deterioration of encoding efficiency can be prevented.

This holds the same for the R image, as well.

Also, with the encoding device in FIG. 5, by rotating the L image and R image by 90 degrees and the L image and R image following rotation are taken as the object of processing, in a case where an edge continuously extending in the vertical direction is in the original (before rotation) L image and R image, the correlation of the pixels in the spatial direction and temporal direction with the edge extending in the vertical direction can be maintained, and deterioration in encoding efficiency can be prevented.

Alternatively, even in a case where we read "horizontal" as "vertical" in the above-described processing and read "vertical" as "horizontal", in the event that there is an edge continuously extending in the vertical direction in the L image and R image, the correlation of the pixels in the spatial direction and temporal direction with the edge extending in the vertical direction can be maintained, and deterioration in encoding efficiency can be prevented.

Note that in FIG. 9, the post-horizontal-processing L image is placed to the left side and the post-horizontal-processing R image is placed to the right side to generate the combined image, but the post-horizontal-processing L image may be placed to the right side and the post-horizontal-processing R image to the left right side.

Also, whether to place the post-horizontal-processing L image and post-horizontal-processing R image to the left side or right side of the combined image can be controlled by preparing a flag other than the separate flag, vertical pattern flag, and arrange pattern flag, and using that flag. Note that in this case as well, that flag needs to be included in the encoded data as well.

Now, in the event of generating a combined image by arraying a post-horizontal-processing L image and post-horizontal-processing R image as multiple post-vertical-processing images as shown in FIG. 9, the continuity of an edge extending in the horizontal direction is maintained, by the continuity of an edge extending in the vertical direction will be lost.

Figure 10:
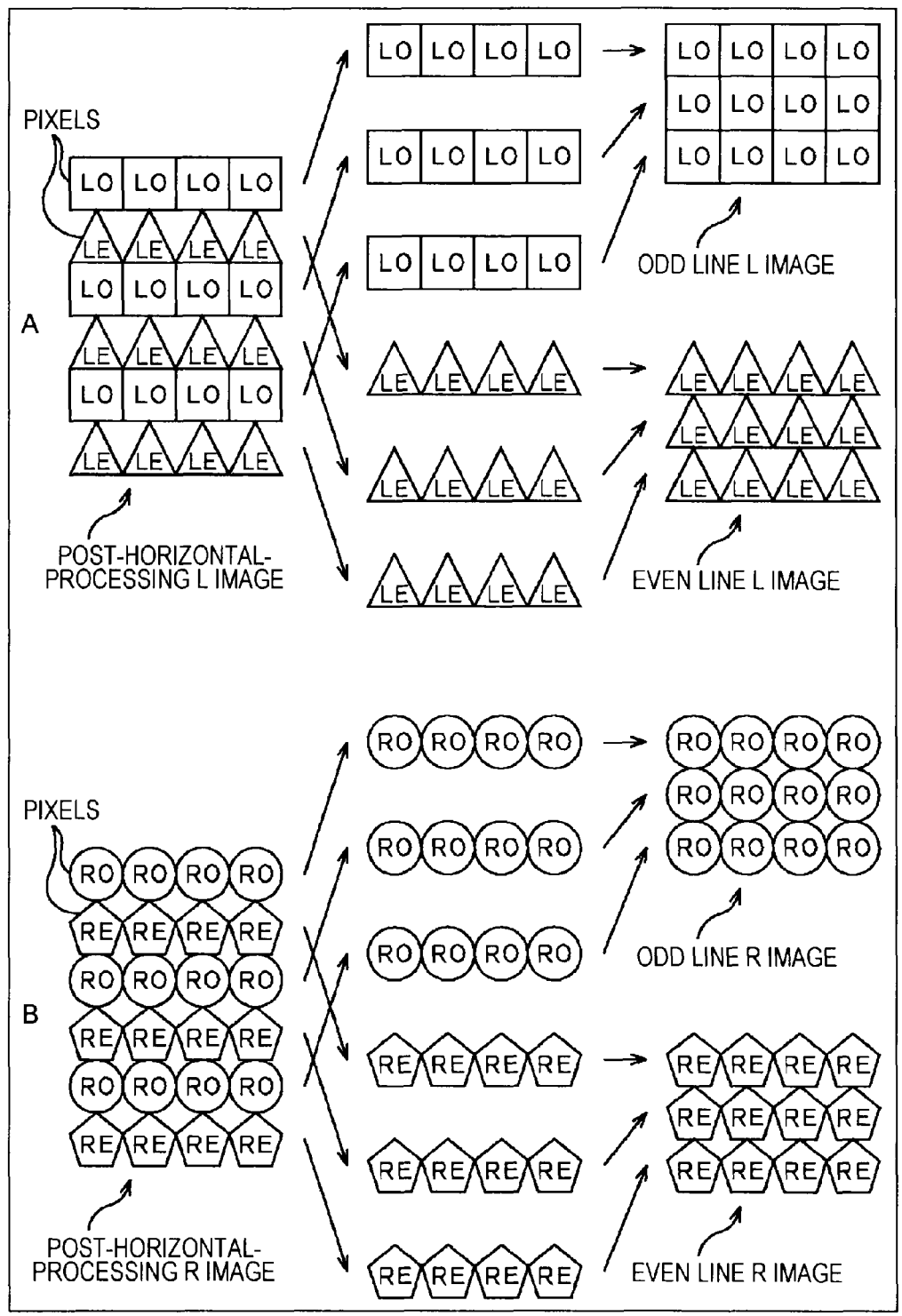
FIG. 10 is a diagram for describing vertical processing performed at a vertical processing unit 32.

Now, FIG. 10 is a diagram for describing the vertical processing performed at the vertical processing unit 32 in FIG. 5 in the event that the separate flag indicates that the odd lines and even lines are to be separated from the post-horizontal-processing L image and post-horizontal-processing R image (hereinafter also referred to as line separation).

That is to say, FIG. 10 is a diagram illustrating vertical processing in a case where the separate flag indicates line separation, and the vertical pattern flag indicates non-interleaved array for the array of the odd lines and even lines of the post-horizontal-processing L image and post-horizontal-processing R image of the multiple post-vertical-processing images.

Now, the array of the odd lines and even lines of the post-horizontal-processing L image and post-horizontal-processing R image of the multiple post-vertical-processing images which the vertical pattern flag indicates includes the two types of arrays of interleaved array and non-interleaved array. Non-interleaved array will be described with FIG. 10, and interleaved array will be described later.

In the event that the separate flag indicates line separation, the vertical processing unit 32 separates the odd lines and even lines from the post-horizontal-processing L image, and also separates the odd lines and even lines from the post-horizontal-processing R image.

Further, in the event that the separate flag indicates line separation, the vertical processing unit 32 references the vertical pattern flag.

In the event that the vertical pattern flag indicates non-interleaved array, the vertical processing unit 32 shifts in the vertical direction the odd lines and even lines separated from each of the post-horizontal-processing L image and post-horizontal-processing R image, thereby generating the four images of an odd L image, an even L image, an odd R image, and an even R image as multiple post-vertical-processing images.

That is to say, A in FIG. 10 is a diagram for describing vertical processing with the post-horizontal-processing L image as an object.

The vertical processing unit 32 extracts only the odd lines (LO) and also extracts only the even lines (LE) from the post-horizontal-processing L image, thereby separating the odd lines from the even lines.

The image made up of just odd lines extracted from the post-horizontal-processing L image is an image where there are gaps corresponding to the even lines. The image made up of just even lines extracted from the post-horizontal-processing L image also is an image where there are gaps corresponding to the odd lines.

The vertical processing unit 32 shifts in the vertical direction the odd lines of the image made up of the odd lines extracted from the post-horizontal-processing L image so as to pack the gaps corresponding to the even lines, thereby generating an image in the state of odd lines having been vertically packed, as an odd L image with only odd lines (LO) of the post-horizontal-processing L image arrayed.

Further, the vertical processing unit 32 shifts in the vertical direction the even lines of the image made up of the even lines extracted from the post-horizontal-processing L image so as to pack the gaps corresponding to the odd lines, thereby generating an image in the state of even lines having been vertically packed, as an even L image with only even lines (LE) of the post-horizontal-processing L image arrayed.

The vertical processing unit 32 subjects the post-horizontal-processing R image to the same vertical processing also.

That is to say, B in FIG. 10 is a diagram for describing vertical processing with the post-horizontal-processing R image as an object.

The vertical processing unit 32 extracts only the odd lines (RO) and also extracts only the even lines (RE) from the post-horizontal-processing R image, thereby separating the odd lines from the even lines.

Now, the image made up of just odd lines extracted from the post-horizontal-processing R image is an image where there are gaps corresponding to the even lines. The image made up of just even lines extracted from the post-horizontal-processing R image also is an image where there are gaps corresponding to the odd lines.

The vertical processing unit 32 shifts in the vertical direction the odd lines of the image made up of the odd lines extracted from the post-horizontal-processing R image so as to pack the gaps corresponding to the even lines, thereby generating an image in the state of odd lines having been vertically packed, as an odd R image with only odd lines (RO) of the post-horizontal-processing R image arrayed.

Further, the vertical processing unit 32 shifts in the vertical direction the even lines of the image made up of the even lines extracted from the post-horizontal-processing R image so as to pack the gaps corresponding to the odd lines, thereby generating an image in the state of odd lines having been vertically packed, as an even R image with only even lines (RE) of the post-horizontal-processing R image arrayed.

In the event that the separate flag indicates line separation, and the vertical pattern flag indicates non-interleaved array, the vertical processing unit 32 generates the four images of an odd line L image, even line L image, odd line R image, and even line R image, and supplies these to the combining unit 33 (FIG. 5) as multiple post-vertical-processing images.

Figure 11:
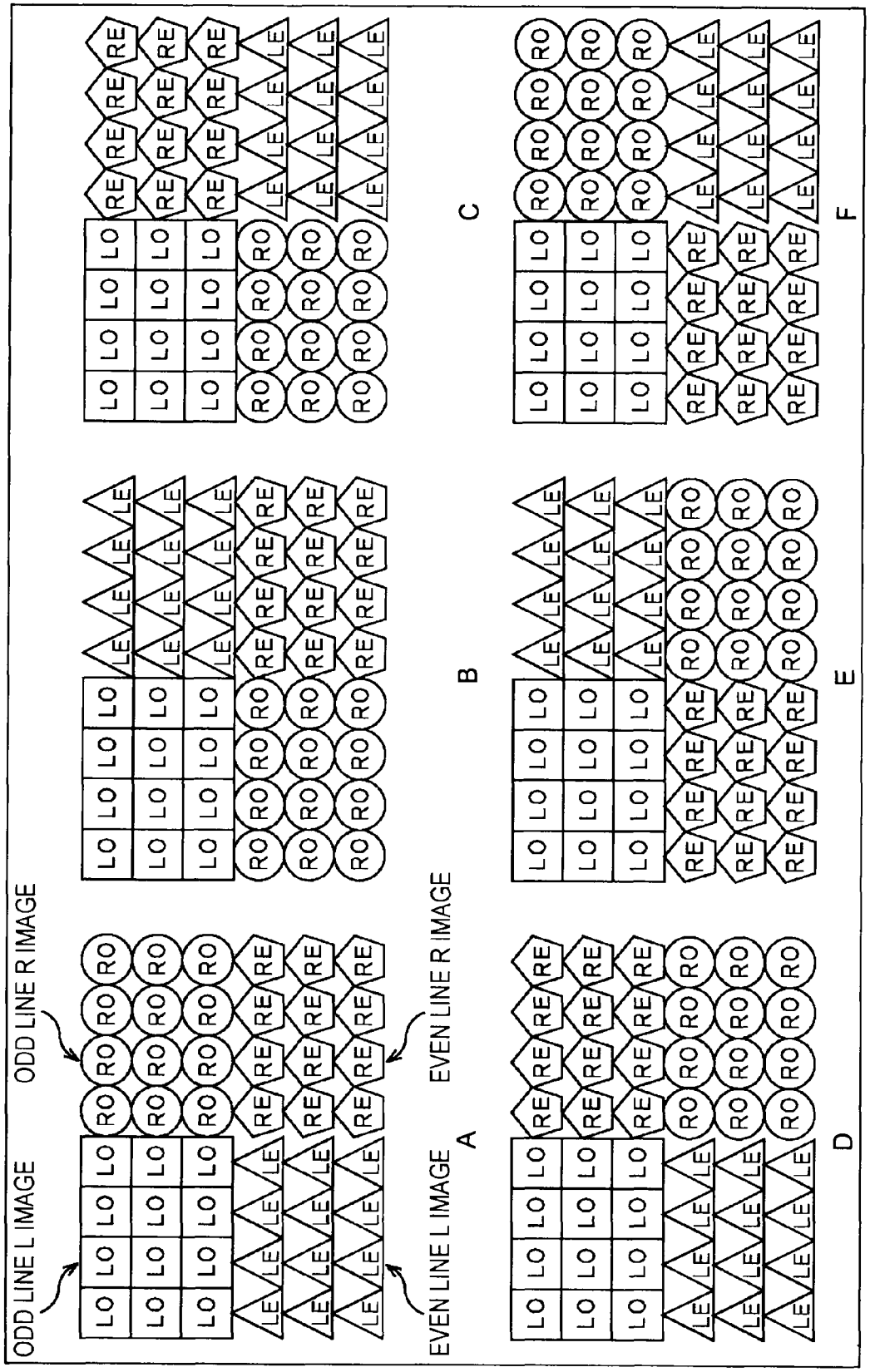
FIG. 11 is a diagram describing combining processing performed at a combining unit 33.

FIG. 11 is a drawing illustrating combining processing performed at the combining unit 33 in FIG. 5 in the event that the separate flag indicates line separation and the vertical pattern flag indicates non-interleaved processing.

In that the separate flag indicates line separation and the vertical pattern flag indicates non-interleaved processing, the four images of an odd line L image, even line L image, odd line R image, and even line R image, are supplied from the vertical processing unit 32 to the combining unit 33 as multiple post-vertical-processing images.

In this case, the combining unit 33 generates a combined image by arraying the four images of the odd line L image, even line L image, odd line R image, and even line R image, in the array of the array pattern which the arrange pattern flag indicates.

Examples of the array patterns which the arrange pattern flag indicates include the six patterns of pattern #0, #1, #2, #3, #4, and #5.

FIG. 11 illustrates the patterns #0 through #5 as array patterns which the arrange pattern flag indicates.

That is to say, A in FIG. 11 indicates pattern #0, B in FIG. 11 pattern #1, C in FIG. 11 pattern #2, D in FIG. 11 pattern #3, E in FIG. 11 pattern #4, and F in FIG. 11 pattern #5, respectively.

In the event that the arrange pattern flag indicates pattern #0, the combining unit 33 generates a combined image where the odd line L image (LO) is placed at the upper left, the even line L image (LE) at the lower left, the odd line R image (RO) at the upper right, and the even line R image (RE) at the lower right, respectively, as shown in A in FIG. 11.

In the event that the arrange pattern flag indicates pattern #1, the combining unit 33 generates a combined image where the odd line L image (LO) is placed at the upper left, the odd line R image (RO) at the lower left, even line L image (LE) at the upper right, and the even line R image (RE) at the lower right, respectively, as shown in B in FIG. 11.

In the event that the arrange pattern flag indicates pattern #2, the combining unit 33 generates a combined image where the odd line L image (LO) is placed at the upper left, the odd line R image (RO) at the lower left, even line R image (RE) at the upper right, and the even line R image (RE) at the lower right, respectively, as shown in C in FIG. 11.

In the event that the arrange pattern flag indicates pattern #3, the combining unit 33 generates a combined image where the odd line L image (LO) is placed at the upper left, the even line L image (LE) at the lower left, the even line R image (RE) at the upper right, and the odd line R image (RO) at the lower right, respectively, as shown in D in FIG. 11.

In the event that the arrange pattern flag indicates pattern #4, the combining unit 33 generates a combined image where the odd line L image (LO) is placed at the upper left, the even line R image (RE) at the lower left, the even line L image (LE) at the upper right, and the odd line R image (RO) at the lower right, respectively, as shown in E in FIG. 11.

In the event that the arrange pattern flag indicates pattern #5, the combining unit 33 generates a combined image where the odd line L image (LO) is placed at the upper left, the even line R image (RE) at the lower left, the odd line R image (RO) at the upper right, and the even line L image (LE) at the lower right, respectively, as shown in F in FIG. 11.

Now, the array patterns in the combined image of the odd line L image, even line L image, odd line R image, and even line R image, are not restricted to the six patterns shown in FIG. 11. That is to say, there are 24 (=4×3×2×1) combinations for the array patterns of the four images of the odd line L image, even line L image, odd line R image, and even line R image, so an optional pattern can be employed out of the 24 patterns as the array pattern in the combined image for the odd line L image, even line L image, odd line R image, and even line R image.

Note that in the event of generating a combined image with the odd line L image, even line L image, odd line R image, and even line R image arrayed, pixels of the same image are preferably placed nearby, from the perspective of encoding efficiency.

Accordingly, the odd line L image (LO) and even line L image (LE) obtained from the thinned out L image are preferably placed so as to be adjacent in the vertical direction or horizontal direction, rather than the oblique direction.

This holds true for the odd line R image and even line R image obtained from the thinned out R image, as well.

As described above, from the post-horizontal-processing L image, an odd line L image made up of just odd lines thereof and an even line L image made up of just odd lines thereof are generated, and from the post-horizontal-processing R image, an odd line R image made up of just odd lines thereof and an even line R image made up of just odd lines thereof are generated, and these odd line L image, even line L image, odd line R image, and even line R image are arrayed to generate a combined image, so at each of the portions of the odd line L image, even line L image, odd line R image, and even line R image making up the combined image, there is no occurrence of phase offset (where pixels positioned in a different row or column in the original L image or R image are arrayed in the same row or column in the odd line L image or the like).

Accordingly, a situation can be prevented in which the spatial direction and temporal direction correlation of the image deteriorates due to non-continuous edge portions appearing at the portions of each of the odd line L image, even line L image, odd line R image, and even line R image, and also motion of a constant speed appearing to be different motions depending on the pixels, so the encoding efficiency of prediction encoding of the combined image can be improved even in comparison with the case in FIG. 9, not to mention a case where the pixels of the thinned out R image are fit into the thinned out L image into positions where the pixels of the thinned out L image are not situated, such as described with FIG. 3.

That is to say, for example, with an odd line L image or the like for example, in the same way as with that described with FIG. 9, spatial direction and temporal direction correlation is maintained in pixels with an edge extending in the vertical direction, besides pixels with an edge extending in the horizontal direction.

Specifically, in the event that there is an edge extending in the vertical direction in three pixels LO arrayed in the first vertical direction from the left in the thinned-out L image shown in A in FIG. 8, the three pixels LO are three pixels LO arrayed in the first vertical direction from the left in the odd line L image shown in A in FIG. 10, so the continuity of the edge in the thinned-out L image in the combined image is maintained.

Accordingly, the correlation in the spatial direction and temporal direction of the pixels where the edge extending in the vertical direction is maintained, so deterioration of encoding efficiency can be prevented.

Note that according to simulations performed by the present inventor using a certain 3D image, it has been confirmed that the encoded data of the combined image made up of the odd line L image, even line L image, odd line R image, and even line R image, becomes approximately ¼ the data amount of the encoded data of the combined image shown in FIG. 3.

Figure 12:
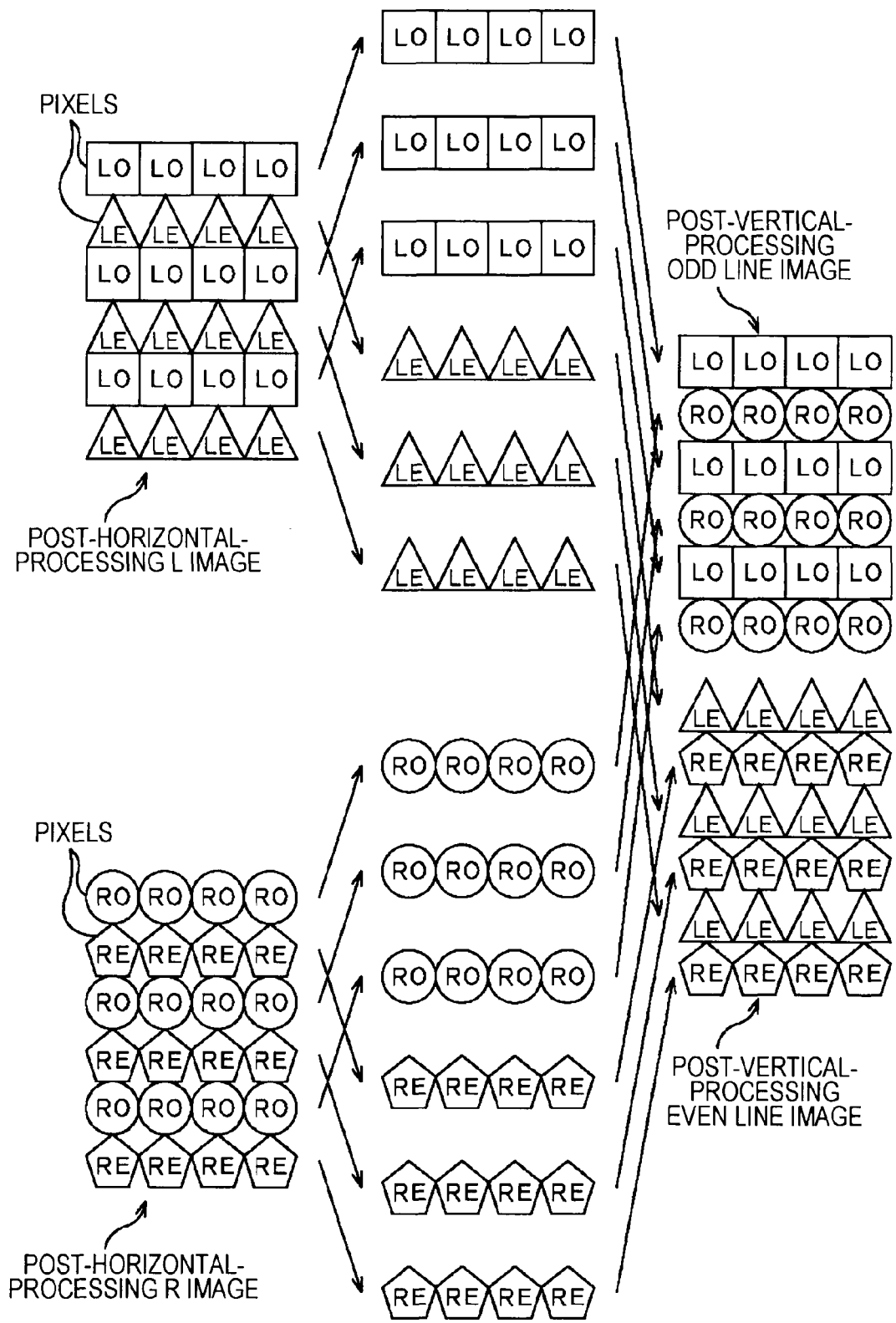
FIG. 12 is a diagram for describing vertical processing performed at the vertical processing unit 32.

FIG. 12 is a diagram for describing vertical processing in a case where the separate flag indicates line separation, and the vertical pattern flag indicates interleaving array for the placement of odd lines and even lines in the post-horizontal-processing L image and post-horizontal-processing R image in the multiple post-vertical processing images.

As described with FIG. 10, in the event that the separate flag indicates line separation, the vertical processing unit 32 separates odd lines and even lines from each of the post-horizontal-processing L image and post-horizontal-processing R image, and makes reference to the vertical pattern flag.

In the event that the vertical pattern flag indicates interleaved array, the vertical processing unit 32 arrays the odd lines and even lines separated from each of the post-horizontal-processing L image and post-horizontal-processing R image in an interleaved manner, thereby generating the two images of a post-vertical-processing odd line image and post-vertical-processing even line image as the multiple post-vertical processing images.

That is to say, in the same way as with that described with FIG. 10, the vertical processing unit 32 extracts just odd lines from the post-horizontal-processing L image and post-horizontal-processing R image, and also extracts just even lines, thereby separating the odd lines and even lines (FIG. 12).

As shown in FIG. 12, the vertical processing unit 32 arrays the odd lines of the post-horizontal-processing L image and the odd lines of the post-horizontal-processing R image in an interleaved manner, thereby generating a post-vertical-processing odd line image with the odd lines (LO) of the post-horizontal-processing L image and odd lines (RO) of the post-horizontal-processing R image alternately arrayed.

In the same way, the vertical processing unit 32 arrays the even lines of the post-horizontal-processing L image and the even lines of the post-horizontal-processing R image in an interleaved manner, thereby generating a post-vertical-processing even line image with the even lines (LE) of the post-horizontal-processing L image and even lines (RE) of the post-horizontal-processing R image alternately arrayed.

In the event that the separate flag indicates line separation, and the vertical pattern flag indicates interleaved array, the vertical processing unit 32 thus generates the two images of the post-vertical-processing odd line image and post-vertical-processing even line image, and supplies to the combining unit 33 (FIG. 5) as multiple post-vertical processing images.

Note that while FIG. 12 shows, in the post-vertical-processing odd line image, the odd lines (LO) of the post-horizontal-processing L image being situated at odd-numbered positions from the top and the odd lines (RO) of the post-horizontal-processing R image being situated at even-numbered positions from the top, but an arrangement may be made wherein the odd lines (LO) of the post-horizontal-processing L image are situated at even-numbered positions from the top and the odd lines (RO) of the post-horizontal-processing R image are situated at odd-numbered positions from the top.

In the same way, while FIG. 12 shows, in the post-vertical-processing even line image, the even lines (LE) of the post-horizontal-processing L image being situated at odd-numbered positions from the top and the even lines (RE) of the post-horizontal-processing R image being situated at even-numbered positions from the top, but an arrangement may be made wherein the even lines (LE) of the post-horizontal-processing L image are situated at even-numbered positions from the top and the even lines (RE) of the post-horizontal-processing R image are situated at odd-numbered positions from the top.

However, in the event of situating the odd lines (LO) of the post-horizontal-processing L image at the odd-numbered positions (or even-numbered positions) in the post-vertical-processing odd line image, the even lines (LE) of the post-horizontal-processing L image are preferably situated at the odd-numbered positions (or even-numbered positions) in the post-vertical-processing even line image. The same holds for the odd lines (RO) and even lines (RE) in the post-horizontal-processing R image.

Figure 13:
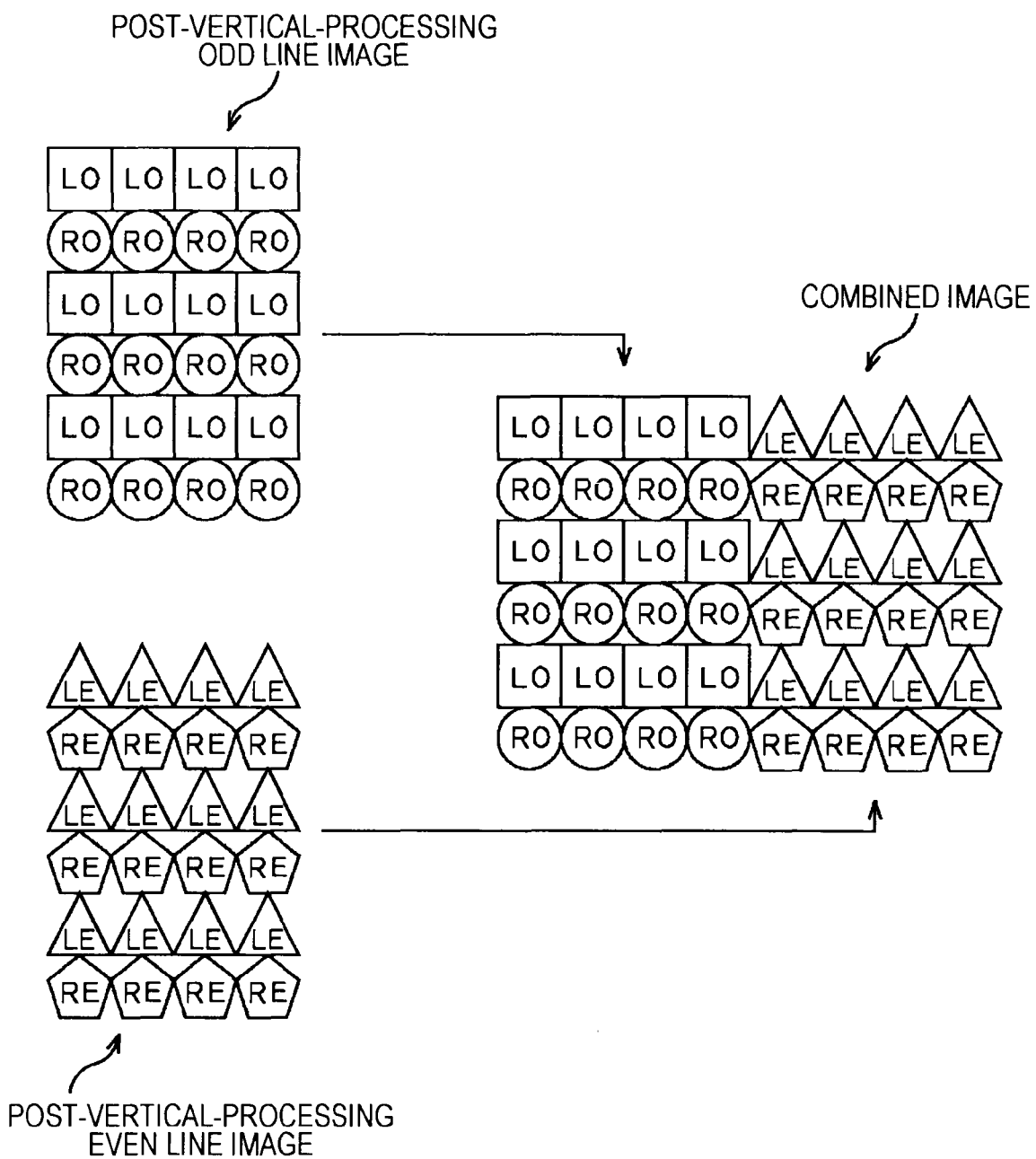
FIG. 13 is a diagram describing combining processing performed at the combining unit 33.

FIG. 13 is a diagram for describing combining processing performed at the combining unit 33 in FIG. 5 in the case that the separate flag indicates line separation, and the vertical pattern flag indicates interleaved array.

In the event that the separate flag indicates line separation, and the vertical pattern flag indicates interleaved array, the two images of the post-vertical-processing odd line image and post-vertical-processing even line image shown in FIG. 12 are supplied from the vertical processing unit 32 to the combining unit 33 as the multiple post-vertical processing images.

In this case, the combining unit 33 generates a combined image by arraying the post-vertical-processing odd line image and post-vertical-processing even line image, supplied from the vertical processing unit 32 as the multiple post-vertical processing images, in a predetermined array.

That is to say, as shown in FIG. 13 for example, the combining unit 33 situates the post-vertical-processing odd line image to the left side and situates the post-vertical-processing even line image to the right side, thereby generating a combined image.

As described above, in the event of generating a post-vertical-processing odd line image and post-vertical-processing even line image by arraying odd lines and even lines separated from each of a post-horizontal-processing L image and post-horizontal-processing R image in an interleaved manner, and the post-vertical-processing odd line image and post-vertical-processing even line image are arrayed to generate a combined image, the encoder 34 (FIG. 5) performs prediction encoding of the combined image, taking the combined image as an interlace format image.

That is to say, in the event that the separate flag indicates line separation and the vertical pattern flag indicates interleaved array, the encoder 34 performs prediction encoding of the combined image, taking the combined image as an interlace format image, even if the image is a progressive image.

In this case, we will say that the encoder 34 performs prediction encoding following the H.264/AVC format for example, and focusing on the even field of the odd field (field made up of odd lines) of a t'th frame at point-in-time t in the mixed image and even field (field made up of even lines), for example, at the time of prediction encoding of the even field of the t'th frame, the encoder 34 can reference one of the odd field of the t'th frame which is the same frame and the even field of the t−1'th frame one frame prior, for example, whichever yields smaller prediction error, in order to generate a prediction image of that even field.

Now, a combined image where the separate flag indicates line separation, and the vertical pattern flag indicates interleaved array is, as shown in FIG. 13, an image obtained by horizontally arraying the post-vertical-processing odd line image and post-vertical-processing even line image obtained by interleaved arraying the odd lines and even lines separated from the post-horizontal-processing L image and post-horizontal-processing R image.

Accordingly, with the odd field of the combined image, the odd lines (LO) and even lines (LE) of the thinned-out L image are arrayed in the horizontal direction, so the odd field of the combined image is an image with the odd line L image and even line L image shown in A in FIG. 10 being arrayed in the horizontal direction.

In the same way, with the even field of the combined image, the odd lines (RO) and even lines (RE) of the thinned-out R image are arrayed in the horizontal direction, so the even field of the combined image is an image with the odd line R image and even line R image shown in B in FIG. 10 being arrayed in the horizontal direction.

As a result, at the time of performing prediction encoding of the even field of the t'th field of the combined image, in the event that the even field of the t−1'th frame one frame prior is to be referenced, encoding effects the same as with a case of the combined image being configured of an odd line L image, even line L image, odd line R image, and even line R image, as shown in FIG. 11, can be realized.

Also, with the encoder 34, if referencing the odd field of the t'th frame can reduce the prediction error as compared to referencing the even field of the t−1'th frame one frame prior at the time of performing prediction encoding of the even field of the t'th field of the combined image, the odd field of the t'th frame can be referenced.

Accordingly, in the event that the separate flag indicates line separation and the vertical pattern flag indicates interleaved array, by the encoder 34 performing prediction encoding of the combined image with the combined image as an interlace format image, encoding efficiency can be realized which is the same as or greater than the encoding efficiency with the case of the combined image being configured of an odd line L image, even line L image, odd line R image, and even line R image, as shown in FIG. 11.

Note that in FIG. 13, a combined image is generated by situating the post-vertical-processing odd line image to the left side and situating the post-vertical-processing even line image to the right side, but in generating of the combined image, the post-vertical-processing odd line image may be situated to the right side and the post-vertical-processing even line image may be situated to the left side.

Also, a flag separate from the separate flag, vertical pattern flag, and arrange pattern flag may be prepared, with this flag controlling which of the left side and right side of the combined image to situate the post-vertical-processing odd line image and the post-vertical-processing even line image, respectively. Note however, in this case, this flag also needs to be included in the encoded data.

[Separate Flag, Vertical Pattern Flag, and Arrange Pattern Flag]

FIG. 14 is a diagram for describing the separate flag, vertical pattern flag, and arrange pattern flag.

The separate flag (separate_flag) indicates non-separation or line separation, i.e., whether or not to separate odd lines and even lines from the post-horizontal-processing L image and post-horizontal-processing R image.

In the event that the separate flag is 0, for example, this represents non-separation, and if 1, this represents line separation.

The vertical pattern (vertical_pattern) flag represents the array of the odd lines and even lines of the post-horizontal-processing L image and post-horizontal-processing R image in the multiple post-vertical processing images.

Arrays which the vertical pattern flag represent are non-interleaved array and interleaved array.

In the event that the vertical pattern flag is 0, for example, this represents non-interleaved array (FIG. 10), and if 1, this represents interleaved array (FIG. 12).

In the event that the separate flag is 1 which indicates line separation and the vertical pattern flag is 0 indicating non-interleaved array, the vertical processing unit 32 (FIG. 5) separates the odd lines and even lines from the post-horizontal-processing L image, and also separates the odd lines and even lines from the post-horizontal-processing R image, as described with FIG. 10.

Further, as described with FIG. 10, the vertical processing unit 32 shifts each of the odd lines and even lines separated from each of the post-horizontal-processing L image and post-horizontal-processing R image in the vertical direction, thereby generating the four images of the odd line L image, even line L image, odd line R image, and even line R image, as the multiple post-vertical processing images.

Also, in the event that the separate flag is 1 which indicates line separation and the vertical pattern flag is 1 indicating interleaved array, the vertical processing unit 32 separates the odd lines and even lines from the post-horizontal-processing L image, and also separates the odd lines and even lines from the post-horizontal-processing R image, as described with FIG. 12.

Further, as described with FIG. 12, the vertical processing unit 32 performs interleaved array of each of the odd lines and even lines separated from the post-horizontal-processing L image and post-horizontal-processing R image, thereby generating the two images of the post-vertical-processing odd line image and post-vertical-processing even line image as the multiple post-vertical processing images.

The arrange pattern flag (arrange_pattern) flag represents, in the event that the multiple post-vertical processing images are the four images of the odd line L image, even line L image, odd line R image, and even line R image, the array pattern of the four images in the combined image.

With the present embodiment, the arrange pattern flag assumes an integer value of 0 through 5. In the event that the arrange pattern flag is an integer value i, the combining unit 33 arrays the odd line L image, even line L image, odd line R image, and even line R image, so as to match the array of pattern #i in FIG. 11, thereby generating a combined image.

[Details of Vertical Processing and Combined Processing]

Figure 15:
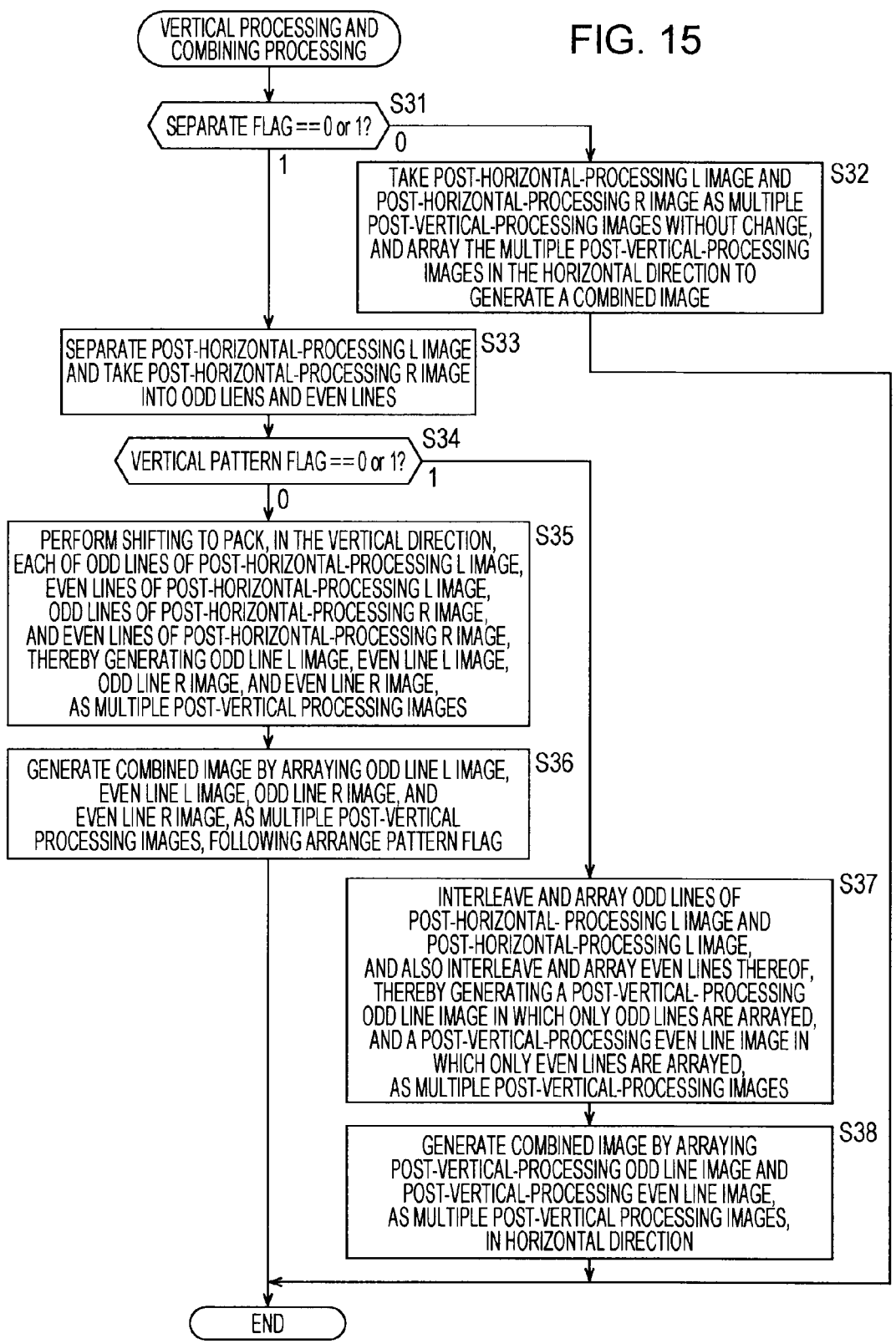
FIG. 15 is a flowchart for describing the details of vertical processing and combining processing performed following the separate flag, vertical pattern flag, and arrange pattern flag.

FIG. 15 is a flowchart for describing the details of the vertical processing of step S15 and the combining processing in step S16 of FIG. 7, performed following the separate flag, vertical pattern flag, and arrange pattern flag.

In step S31, the vertical processing unit 32 and combining unit 33 in FIG. 5 determine which of 0 and 1 the separate flag supplied from the control unit 35 is.

In step S31, in the event that determination is made that the separate flag is 0, the processing advances to step S32, where the vertical processing unit 32 supplies the post-horizontal-processing L image and post-horizontal-processing R image supplied from the horizontal processing unit 31 to the combining unit 33 without change, as multiple post-vertical processing images.

The combining unit 33 arrays the post-horizontal-processing L image and post-horizontal-processing R image supplied from the vertical processing unit 32 as the multiple post-vertical processing images, in the horizontal direction, as shown in FIG. 9.

On the other hand, in the event that determination is made in step S31 that the separate flag is 1, the processing advances to step S33, where the vertical processing unit 32 separates the odd lines and even lines from the post-horizontal-processing L image from the horizontal processing unit 31, and separates the odd lines and even lines from the post-horizontal-processing R image from the horizontal processing unit 31.

The processing then advances from step S33 to step S34, where the vertical processing unit 32 and combining unit 33 determine which of 0 and 1 the vertical pattern flag supplied from the control unit 35 is.

In step S34, in the event that determination is made that the vertical pattern flag is 0, the processing advances to step S35, where the vertical processing unit 32 shifts each of the odd lines and even lines separated from each of the post-horizontal-processing L image and post-horizontal-processing R image in the vertical direction, thereby generating the four images of the odd line L image, even line L image, odd line R image, and even line R image, as the multiple post-vertical processing images.

The vertical processing unit 32 then supplies the odd line L image, even line L image, odd line R image, and even line R image, to the combining unit 33 as the multiple post-vertical processing images, and the processing advances from step S35 to step S36.

In step S36, the combining unit 33 arrays the odd line L image, even line L image, odd line R image, and even line R image, which are the multiple post-vertical processing images from the vertical processing unit 32, in an array according to the array pattern which the arrange pattern flag supplied from the control unit 35 indicates, thereby generating the combined image described with FIG. 11.

On the other hand, in the event that determination has been made in step S34 that the vertical pattern flag is 1, the processing advances to step S37, where the vertical processing unit 32 performs interleaved array of each of the odd lines and even lines separated from the post-horizontal-processing L image and post-horizontal-processing R image, as described with FIG. 12, thereby generating the two images of a post-vertical-processing odd line image and post-vertical-processing even line image as the multiple post-vertical processing images.

The vertical processing unit 32 then supplies to the combining unit 33 the post-vertical-processing odd line image and post-vertical-processing even line image as the multiple post-vertical processing images, and the processing advances from step S37 to step S38.

In step S38, the combining unit 33 arrays the post-vertical-processing odd line image and post-vertical-processing even line image supplied from the vertical processing unit 32 as the multiple post-vertical processing images in a predetermined array, thereby generating the combined image described with FIG. 13.

The combined image generated in steps S32, S36, or S38, is supplied from the combining unit 33 to the encoder 34 (FIG. 5), and subjected to prediction encoded as described with step S17 in FIG. 7.

[Embodiment of Decoding Device]

Figure 16:
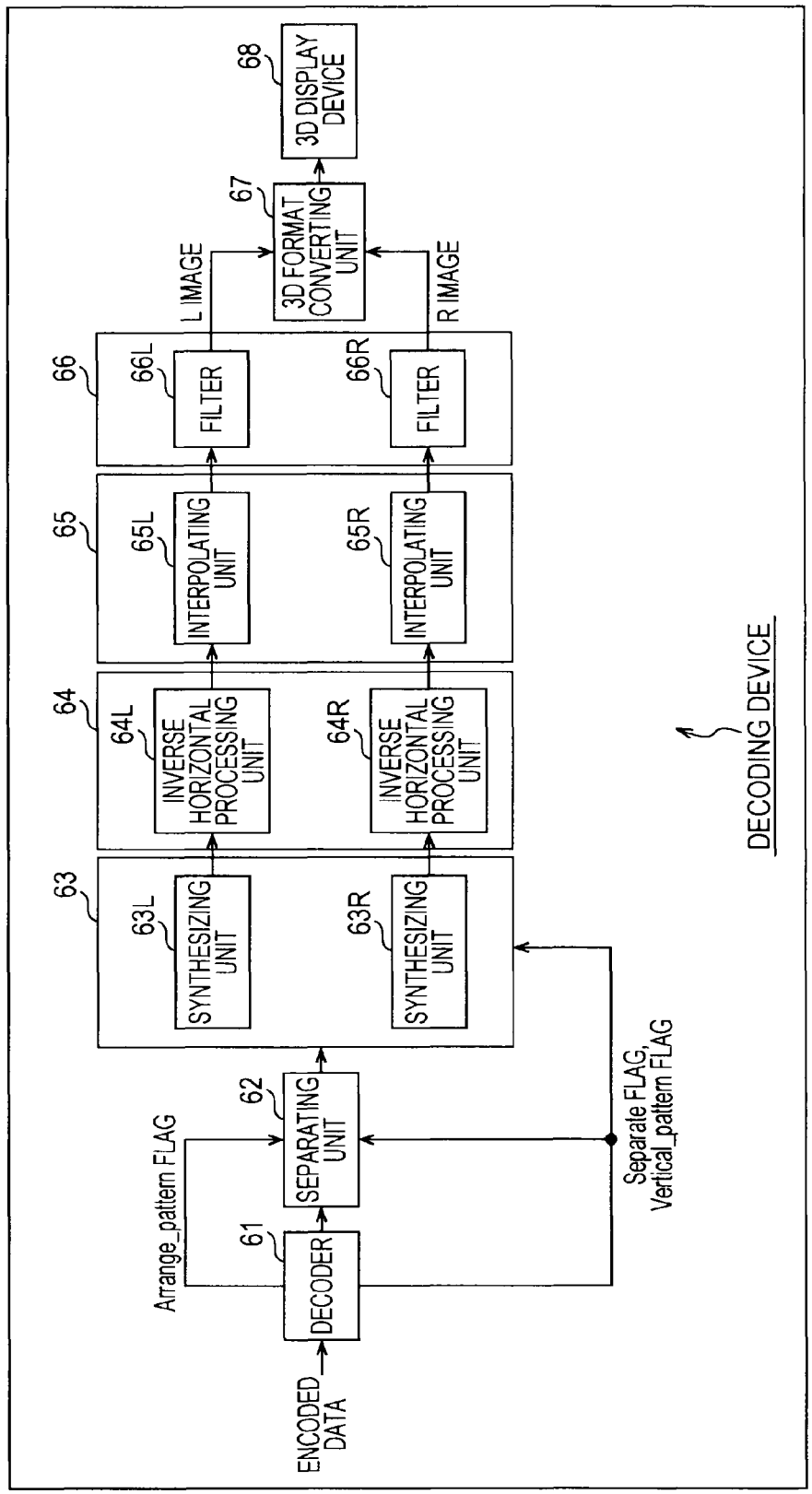
FIG. 16 is a block diagram illustrating a configuration example of an embodiment of a decoder to which the present invention has been applied.

FIG. 16 is a block diagram illustrating the configuration example of an embodiment of a decoding device to which the image processing device according to the present invention has been applied.

The encoded data output from the encoding device in FIG. 5 is supplied to a decoder 61 of the decoding device.

The decoder 61 accepts (receives) encoded data supplied thereto, extracts the separate flag, vertical pattern flag, and arrange pattern flag included in the encoded data, and supplies to a separating unit 62. Note that as described above, the encoded data, and the separate flag, vertical pattern flag, and arrange pattern flag, may be individually transmitted in some cases (including playing from a recording medium), in which case the decoder 61 accepts the individually-transmitted encoded data and separate flag, vertical pattern flag, and arrange pattern flag, and supplies the separate flag, vertical pattern flag, and arrange pattern flag to the separating unit 62.

Further, the decoder 61 supplies the separate flag, vertical pattern flag, and arrange pattern flag to an inverse vertical processing unit 63.

Also, the decoder 61 decodes the encoded data with the same format as the encoding format of the encoder 34, and supplies the combined image obtained as a result thereof to the separating unit 62.

The separating unit 62 follows the separate flag, vertical pattern flag, and arrange pattern flag to separate the combined image from the decoder 61 into the multiple post-vertical processing images, and supplies to the inverse orthogonal processing unit 63.

The inverse vertical processing unit 63 has synthesizing units 63L and 63R. The inverse vertical processing unit 63 performs inverse orthogonal transform to return the multiple post-vertical processing images from the separating unit 62 into the post-horizontal-processing L image and post-horizontal-processing R image, and supplies the post-horizontal-processing L image and post-horizontal-processing R image obtained as a result thereof, to an inverse horizontal processing unit 64.

Now, in the event that the separate flag included in the encoded data indicates non-separation, the combined image is an image where the post-horizontal-processing L image and post-horizontal-processing R image as the multiple post-vertical processing images have been arrayed in the horizontal direction as shown in FIG. 9.

Accordingly, in the event that the separate flag supplied from the decoder 61 indicates non-separation, the separating unit 62 separates the post-horizontal-processing L image and post-horizontal-processing R image as the multiple post-vertical processing images arrayed as shown in FIG. 9 from the combined image from the decoder 61, and supplies to the inverse vertical processing unit 63.

In the event that the separate flag supplied from the decoder 61 indicates non-separation, the inverse vertical processing unit 63 then supplies the post-horizontal-processing L image and post-horizontal-processing R image as the multiple post-vertical processing images supplied from the separating unit 62 to the inverse horizontal processing unit 64 as they are.

Also, in the event that the separate flag included in the encoded data indicates line separation and also the vertical pattern flag included in the encoded data indicates non-interleaved array, the combined image is an image where the four images of the odd line L image, even line L image, odd line R image, and even line R image, as the multiple post-vertical processing images, have been arrayed following the vertical pattern flag included in the encoded data, as described with FIG. 11.

Accordingly, in the event that the separate flag supplied from the decoder 61 indicates line separation and also the vertical pattern flag supplied from the decoder 61 indicates non-interleaved array, the separating unit 62 distinguishes and separates the odd line L image, even line L image, odd line R image, and even line R image arrayed as shown in FIG. 11 from the combined image from the decoder 61, and supplies to the inverse vertical processing unit 63, following the arrange pattern flag from the decoder 61 in the same way.

With the inverse vertical processing unit 63, the synthesizing unit 63L synthesizes the odd line L image and even line L image from the separating unit 62 and decodes the post-horizontal-processing L image.

That is to say, the synthesizing unit 63L arrays the lines (horizontal direction lines) of the odd line L image from the separating unit 62 at the odd lines of the post-horizontal-processing L image, and arrays the lines of the even line L image at the even lines of the post-horizontal-processing L image, thereby decoding the post-horizontal-processing L image.

Further, with the inverse vertical processing unit 63, the synthesizing unit 63R synthesizes the odd line R image and even line R image from the separating unit 62 and decodes the post-horizontal-processing R image.

That is to say, the synthesizing unit 63R arrays the lines of the odd line R image from the separating unit 62 at the odd lines of the post-horizontal-processing R image, and arrays the lines of the even line R image at the even lines of the post-horizontal-processing R image, thereby decoding the post-horizontal-processing R image.

Also, in the event that the separate flag included in the encoded data indicates line separation, and the vertical pattern flag included in the encoded data represents interleaved array, the combined image is an image wherein the two images of the post-vertical-processing odd line image and post-vertical-processing even line image as the multiple post-vertical processing images are arrayed in the horizontal direction, as described with FIG. 13.

Now, in the event that the separate flag supplied from the decoder 61 indicates line separation, and the vertical pattern flag supplied from the decoder 61 represents interleaved array, the separating unit 62 separates the post-vertical-processing odd line image and post-vertical-processing even line arrayed as shown in FIG. 13 from the combined image from the decoder 61, and supplies to the inverse vertical processing unit 63.

With the inverse vertical processing unit 63, the synthesizing unit 63L synthesizes a part of the post-vertical-processing odd line image and post-vertical-processing even line image from the separating unit 62, and decodes the post-horizontal-processing L image.

That is to say, from what has been described with FIG. 12, the post-vertical-processing odd line image includes the odd lines (LO) of the post-horizontal-processing L image, and the post-vertical-processing even line image includes the even lines (LE) of the post-horizontal-processing L image.

The synthesizing unit 63L extracts the odd lines (LO) and even lines (LE) of the post-horizontal-processing L image from the post-vertical-processing odd line image and post-vertical-processing even line image from the separating unit 62, and returns to odd lines (LO) and even lines (LE) to their original positions, thereby decoding the post-horizontal-processing L image.

Further, with the inverse vertical processing unit 63, the synthesizing unit 63R synthesizes the remaining lines of the post-vertical-processing odd line image and post-vertical-processing even line image from the separating unit 62, and decodes the post-horizontal-processing R image.

That is to say, from what has been described with FIG. 12, the post-vertical-processing odd line image includes the odd lines (RO) of the post-horizontal-processing R image, and the post-vertical-processing even line image includes the even lines (RE) of the post-horizontal-processing R image.

The synthesizing unit 63R extracts the odd lines (RO) and even lines (RE) of the post-horizontal-processing R image from the post-vertical-processing odd line image and post-vertical-processing even line image from the separating unit 62, and returns to odd lines (RO) and even lines (RE) to their original positions, thereby decoding the post-horizontal-processing R image.

The inverse horizontal processing unit 64 performs inverse horizontal processing to return the post-horizontal-processing L image and post-horizontal-processing R image from the inverse vertical processing unit 63 to the thinned-out L image and thinned-out R image.

That is to say, the inverse horizontal processing unit 64 is configured of inverse horizontal processing units 64L and 64R.

The inverse horizontal processing unit 64L shifts the pixels of the post-horizontal-processing L image from the inverse vertical processing unit 63 in the opposite direction as with the horizontal processing unit 31L in FIG. 5, thereby decoding the thinned-out L image, which is supplied to an interpolating unit 65.

The inverse horizontal processing unit 64R shifts the pixels of the post-horizontal-processing R image from the inverse vertical processing unit 63 in the opposite direction as with the horizontal processing unit 31R in FIG. 5, thereby decoding the thinned-out R image, which is supplied to the interpolating unit 65.

The interpolating unit 65 is configured of interpolating units 65L and 65R.

The interpolating unit 65L performs interpolation on the thinned-out L image supplied from the inverse horizontal processing unit 64, of pixels thinned out by the thinning-out unit 12L in FIG. 5, and supplies a post-interpolation image (hereinafter also referred to as interpolated L image) to a filter unit 66.

The interpolating unit 65R performs interpolation on the thinned-out R image supplied from the inverse horizontal processing unit 64, of pixels thinned out by the thinning-out unit 12R in FIG. 5, and supplies a post-interpolation image (hereinafter also referred to as interpolated R image) to a filter unit 66.

The filter unit 66 is configured of filters 66L and 66R which are low-pass filters.

The filter 66L performs filtering of the interpolated L image from the interpolating unit 65, thereby decoding the L image, and supplying to a 3D format converting unit 67.

The filter 66R performs filtering of the interpolated R image from the interpolating unit 65, thereby decoding the R image, and supplying to a 3D format converting unit 67.

The 3D format converting unit 67 converts (the image data of) the L image and R image from the filter unit 66 into signals of a format corresponding to a downstream 3D display device 68 displaying 3D images, and supplies this to the 3D display device 68.

The 3D display device 68 displays the 3D image in accordance with signals from the 3D format converting unit 67.

Figure 4:
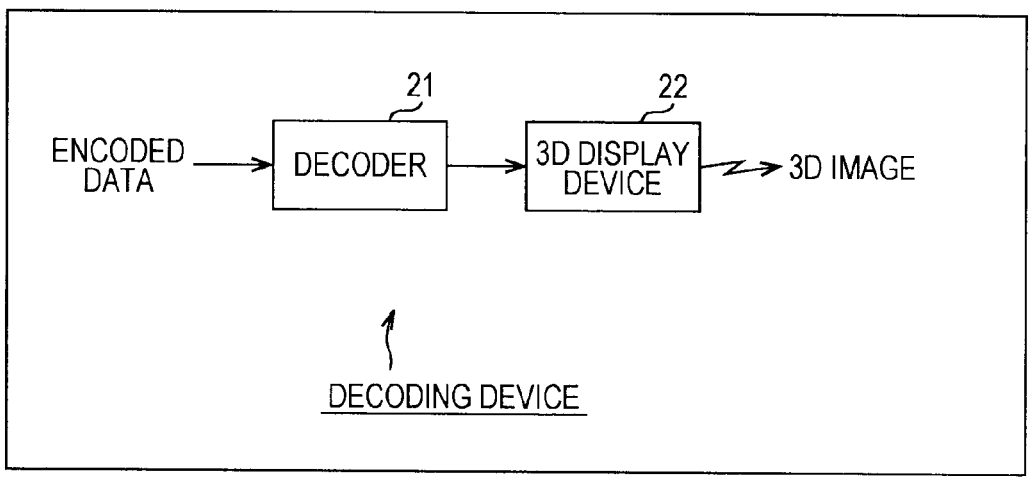
FIG. 4 is a block diagram illustrating the configuration of an example of a conventional decoding device.

Now, in the event that the 3D display device 68 is a stereoscopy device handling 3D display of a combined image in which pixels $L_{x, y}$ of the thinned out L image and the pixels $R_{x, y}$ of the thinned out R image are arrayed in checkerboard fashion, as shown in B in FIG. 3, as with the 3D display device 22 in FIG. 4, the 3D format converting unit 67 performs the same processing as with the filter unit 11, thinning-out unit 12, and combining unit 13 in FIG. 2 for example, whereby the L image and R image from the filter unit 66 are converted into signals of a format corresponding to displaying a 3D image at the 3D display device 68.

[Configuration Example of Decoder 61]

Figure 17:
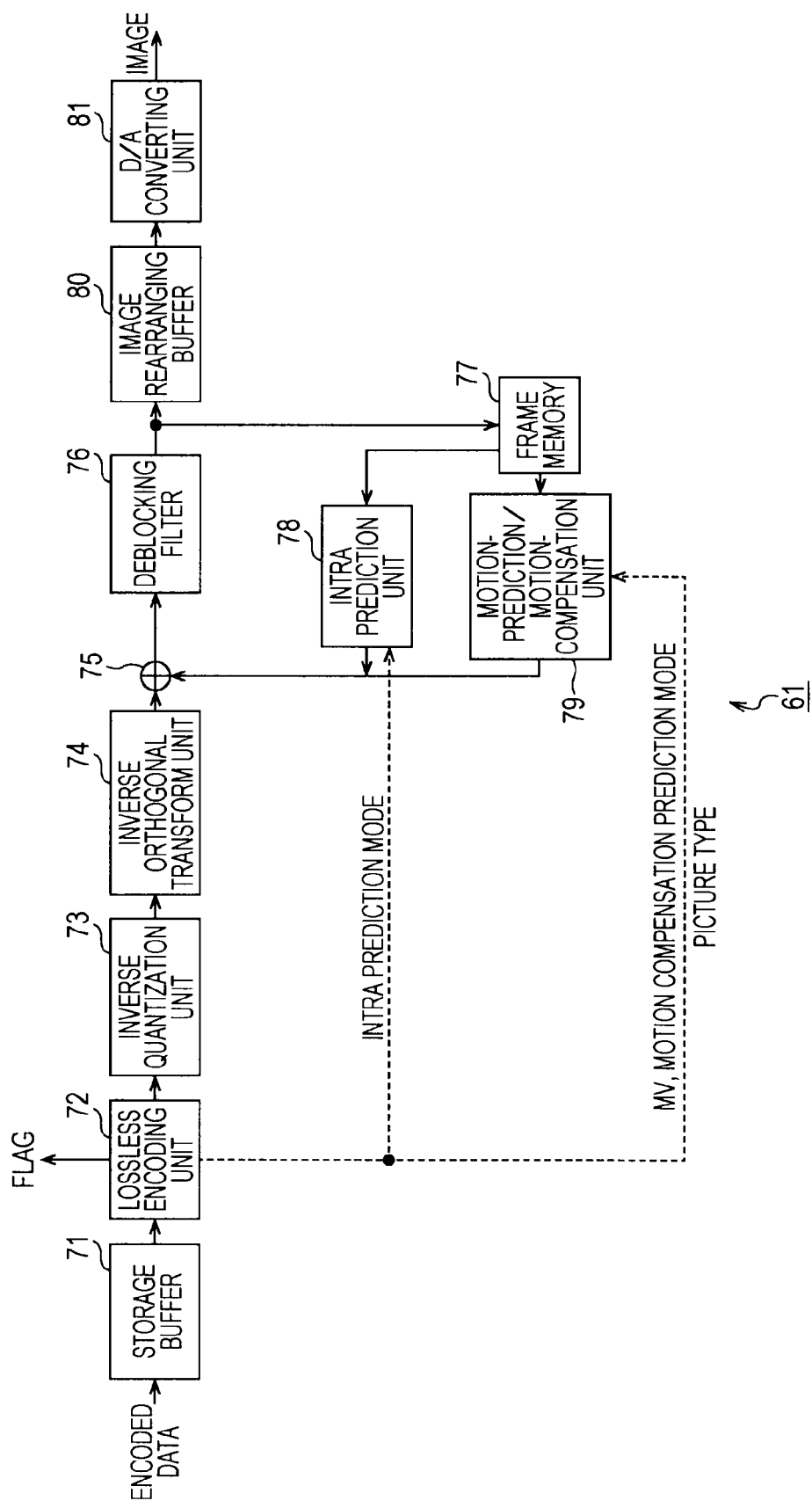
FIG. 17 is a block diagram illustrating a configuration example of a decoder 61.

FIG. 17 is a block diagram illustrating a configuration example of the decoder 61 in FIG. 16.

The decoder 61 is an image information decoding device for decoding encoded data obtained with an encoder 34 (FIG. 6) which is an image information encoding device which realizes image compression by orthogonal transform such as discrete cosine transform or Karhunen-Louève transform and motion compensation, for example.

The decoder 61 is supplied with encoded data output from the encoding device in FIG. 5, as encoded data to be decoded.

The encoded data to be decoded is stored in a storage buffer 71. The storage buffer 71 temporarily stores the encoded data supplied thereto, and supplies this to a lossless decoding unit 72.

The lossless decoding unit 72 subjects the encoded data from the storage buffer 71 to processing such as variable length decoding, arithmetic decoding, and so forth, based on the format of the encoded data, thereby decoding information necessary for decoding the image, such as quantization value, intra prediction mode included in the header of the encoded data, motion vector, motion compensation prediction mode, and so forth.

The quantization value obtained at the lossless decoding unit 72 is supplied to an inverse quantization unit 73, and supplied to an intra prediction unit 78 in the case of the intra prediction mode. Also, the motion vector (MV), motion compensation prediction mode, and picture type, obtained at the lossless decoding unit 72, are supplied to a motion-prediction/motion-compensation unit 79.

Further, the lossless decoding unit 72 extracts the separate flag, vertical pattern flag, and arrange pattern flag from the encoded data, and supplies this to the separating unit 62 (FIG. 16). Also, the lossless decoding unit 72 supplies the separate flag and vertical pattern flag to the inverse vertical processing unit 63 (FIG. 16).

The inverse quantization unit 73, inverse orthogonal transform unit 74, computing unit 75, deblocking filter 76, frame memory 77, intra prediction unit 78, and motion-prediction/motion-compensation unit 79 each perform the same processing as with the inverse quantization unit 49, inverse orthogonal transform unit 50, computing unit 51, deblocking filter 52, frame memory 53, intra prediction unit 54, and motion-prediction/motion-compensation unit 55, thereby decoding the image (a decoded image is obtained).

That is to say, the inverse quantization unit 73 performs inverse quantization of the quantization values from the lossless decoding unit 72 into transform coefficients, and supplies to the inverse orthogonal transform unit 74.

The inverse orthogonal transform unit 74 performs inverse orthogonal transform of the transform coefficients from the inverse quantization unit 73, and supplies to the computing unit 75.

Of the data supplied from the inverse orthogonal transform unit 74, with regard to the intra picture data, the computing unit 75 adds the pixel values of the prediction image supplied from the intra prediction unit 78 thereto as necessary, thereby obtaining a decoded image of the intra picture. Also, of the data supplied from the inverse orthogonal transform unit 74, with regard to non-intra-picture data, the computing unit 75 adds pixel values of the prediction image supplied from the motion-prediction/motion-compensation unit 79 thereto, thereby obtaining a decoded image of the non-intra picture.

The decoded image obtained at the computing unit 75 is supplied to the deblocking filter 76.

The deblocking filter 76 subjects the decoded image from the computing unit 75 to filtering processing the same as with the deblocking filter 52 in FIG. 6, supplies to the frame memory 77 as necessary, and supplies to an image rearranging buffer 80.

The frame memory 77 temporarily stores the decoded image supplied from the computing unit 75 via the deblocking filter 76, and as necessary, supplies the decoded images to the intra prediction unit 78 and motion-prediction/motion-compensation unit 79 as a reference image to be used for generating a prediction image.

In the event that the data which is to be processed at the computing unit 75 is intra picture data, the intra prediction unit 78 uses the decoded image serving as the reference image from the frame memory 77 to generate a prediction image of that intra picture as necessary, and supplies to the computing unit 75.

That is to say, the intra prediction unit 78 follows the intra prediction mode from the lossless decoding unit 72 to generate a prediction image from, of the pixels nearby the portion (block) which is to be processed by the computing unit 75, the pixels already stored in the frame memory 77, and supplies to the computing unit 75.

On the other hand, in the event that the data to be processed by processing at the computing unit 75 is non-intra-picture data, the motion-prediction/motion-compensation unit 79 generates a prediction image for that non-intra picture, and supplies to the computing unit 75.

That is to say, the motion-prediction/motion-compensation unit 79 reads in a picture of the decoded image to be used for generating of the prediction image from the frame memory 77, following the picture type from lossless decoding unit 72, as a reference image. Further, the motion-prediction/motion-compensation unit 79 subjects the reference image from the frame memory 77 to motion compensation following the motion vector and from the lossless decoding unit 72 and the motion compensation prediction mode thereof, thereby generating a prediction image which is supplied to the computing unit 75.

At the computing unit 75, the prediction image supplied from the intra prediction unit 78 or motion-prediction/motion-compensation unit 79 as described above is added to the data supplied from the inverse orthogonal transform unit 74, thereby decoding (the pixel values of) the picture.

The image rearranging buffer 80 temporarily stores and reads out the pictures from the computing unit 75 supplied via the deblocking filter 76 (decoded images), thereby rearranging the order of pictures into the original order (display order), and supplying to a D/A (Digital/Analog) converter 81.

In the event that there is a need to output the decoded image from the image rearranging buffer 80 as analog signals, the D/A converter 81 subjects the decoded image to D/A conversion and outputs.

[Processing of Decoding Device]

Figure 18:
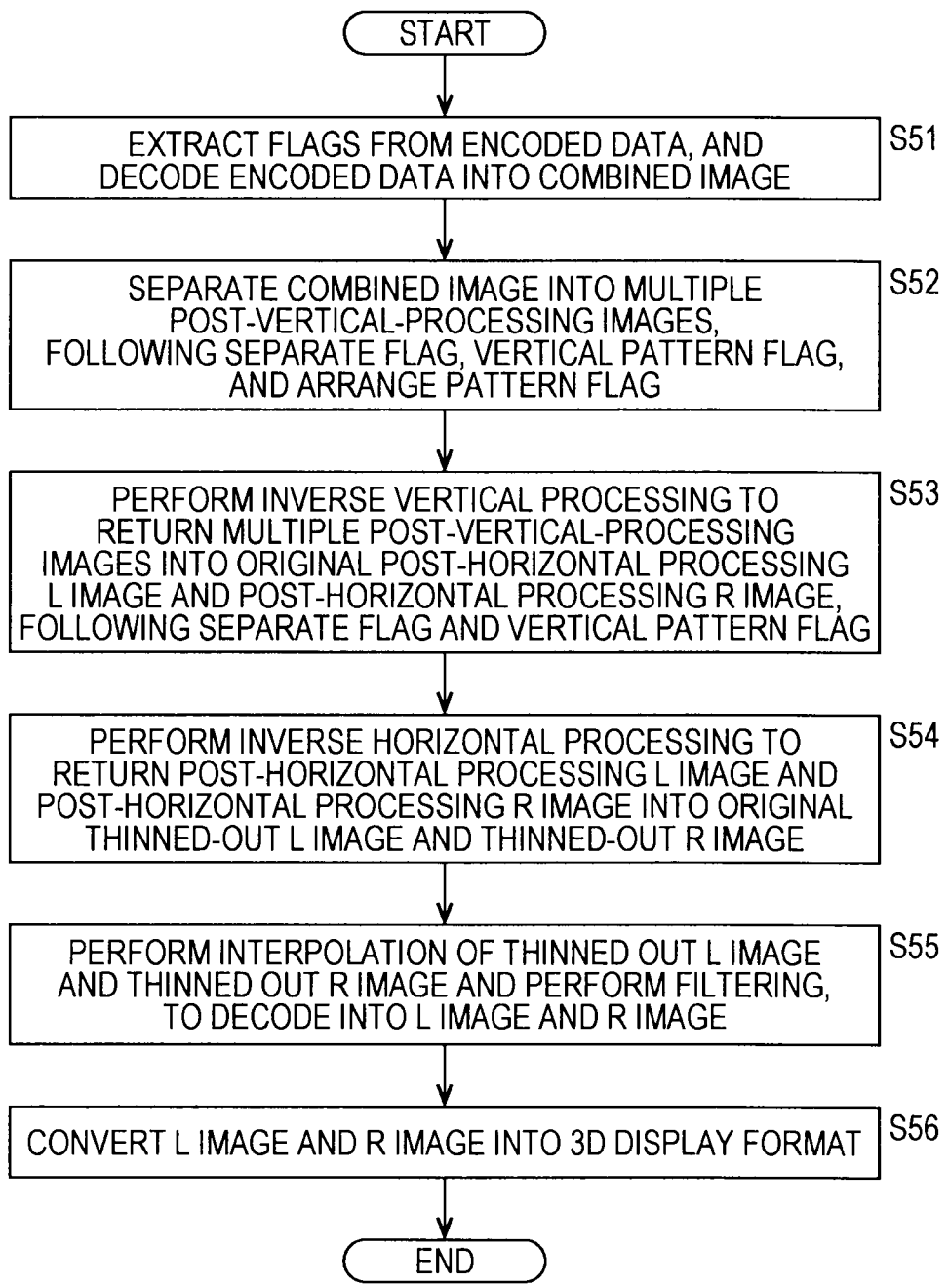
FIG. 18 is a flowchart for describing processing of the decoding device.

FIG. 18 is a flowchart for describing the processing of the decoding device in FIG. 16 (image processing as decoding processing).

Note that the processing following the flowchart in FIG. 18 is processing performed as to encoded data of one screen of 3D image.

In step S51, the decoder 61 awaits for encoded data for one screen of 3D image to be supplied thereto, and receives that encoded data. The decoder 61 then extracts the separate flag, vertical pattern flag, and arrange pattern flag from the encoded data, and supplies to the separating unit 62.

Further, the decoder 61 supplies the separate flag and vertical pattern flag to the inverse vertical processing unit 63.

Further, the decoder 61 decodes (decodes) the encoded data, and supplies the combined image obtained as the result thereof to the separating unit 62, and the processing advances from step S51 to step S52.

In step S52, the separating unit 62 follows the separate flag, vertical pattern flag, and arrange pattern flag to separate the combined image from the decoder 61 into the multiple post-vertical processing images, supplies to the inverse vertical processing unit 63, and the processing advances to step S53.

In step S53, the inverse vertical processing unit 63 follows the separate flag and vertical pattern flag from the decoder 61 to perform inverse vertical processing to return the multiple post-vertical processing images from the separating unit 62 into the post-horizontal-processing L image and post-horizontal-processing R image.

Further, in step S53, the inverse vertical processing unit 63 supplies the post-horizontal-processing L image and post-horizontal-processing R image obtained by the inverse vertical processing to the inverse horizontal processing unit 64, and the processing advances to step S54.

In step S54, the inverse horizontal processing unit 64 performs inverse horizontal processing to return the post-horizontal-processing L image and post-horizontal-processing R image from the inverse vertical processing unit 63 into the thinned-out L image and thinned-out R image.

Further, in step S54, the inverse horizontal processing unit 64 supplies the thinned-out L image and thinned-out R image obtained by the inverse horizontal processing to the interpolating unit 65, and the processing advances to step S55.

In step S55, the interpolating unit 65 performs interpolation of the pixels of the thinned-out L image and thinned-out R image supplied from the inverse horizontal processing unit 64, and supplies to the filter unit 66.

The filter unit 66 performs filtering of the image from the interpolating unit 65, thereby decoding the L image and R image, and supplies to the 3D format converting unit 67, and the processing advances from step S55 to step S56.

In step S56, the 3D format converting unit 67 converts the L image and R image from the filter unit 66 into signals of a format for displaying a 3D image at the 3D display device 68, and supplies to the 3D display device 68.

Subsequently, at the 3D display device 68, a 3D image is displayed in accordance with the signals from the 3D format converting unit 67.

Note that the decoding device in FIG. 16 can be configured without the 3D display device 68, and further, without the 3D format converting unit 67.

Also, the decoding device in FIG. 16 may be configured without included the interpolating unit 65 and filter unit 66, besides not including the 3D display device 68 and 3D format converting unit 67.

Figure 1:
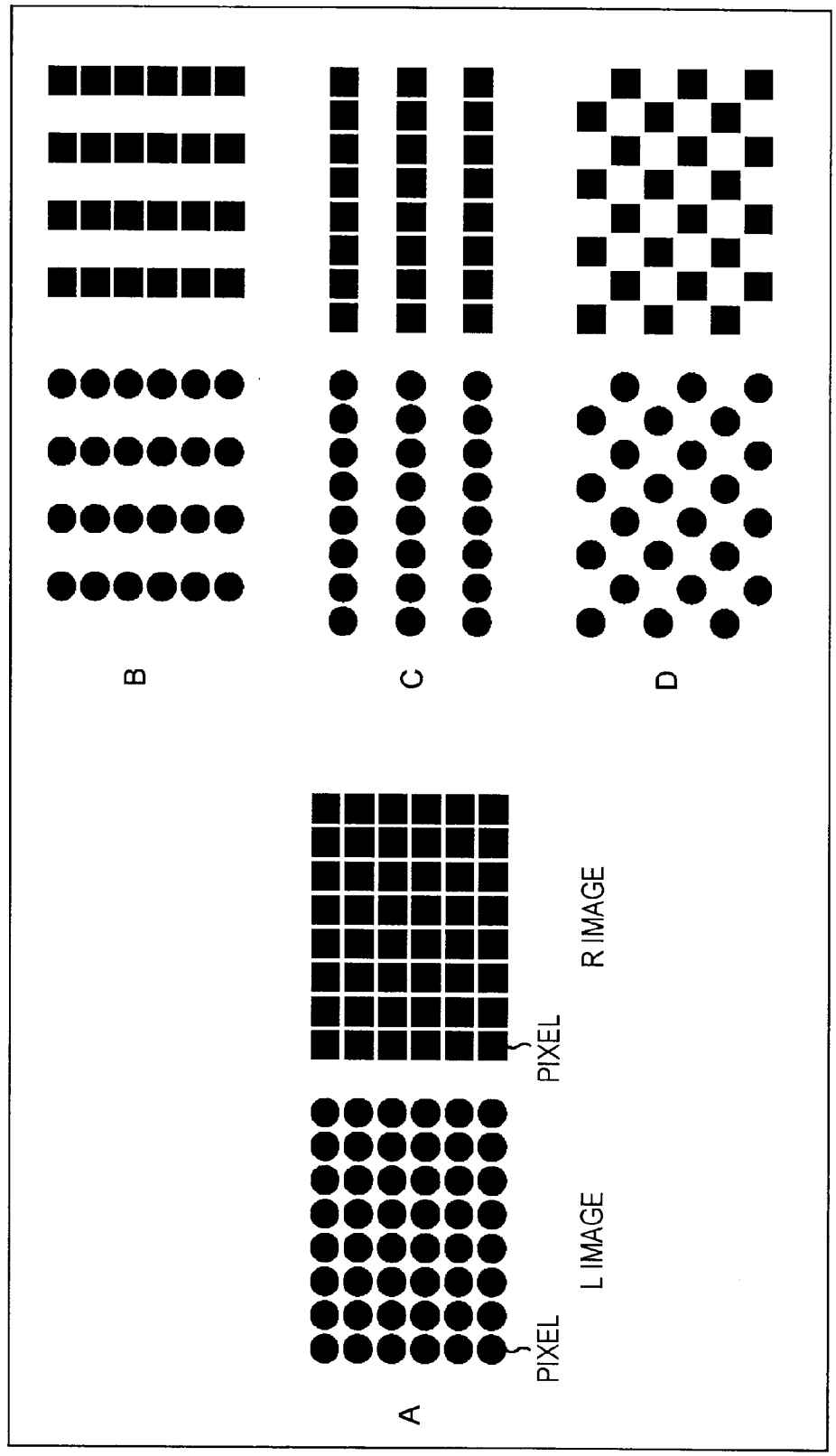
FIG. 1 is a diagram describing methods for thinning out an L image and an R image making up a 3D image.

Further, the encoding device in FIG. 5 and the decoding device in FIG. 16 is applicable to not only a thinned-out L image and thinned-out R image arrayed in checkerboard fashion, but also an image where the spatial resolution in the horizontal direction has been changed to ½ that of the original as shown in B in FIG. 1, and an image where the spatial resolution in the vertical direction has been changed to ½ that of the original (and rotated by 90 degrees) as shown in C in FIG. 1.

Second Embodiment

[Another Embodiment of Encoding Device]

Figure 19:
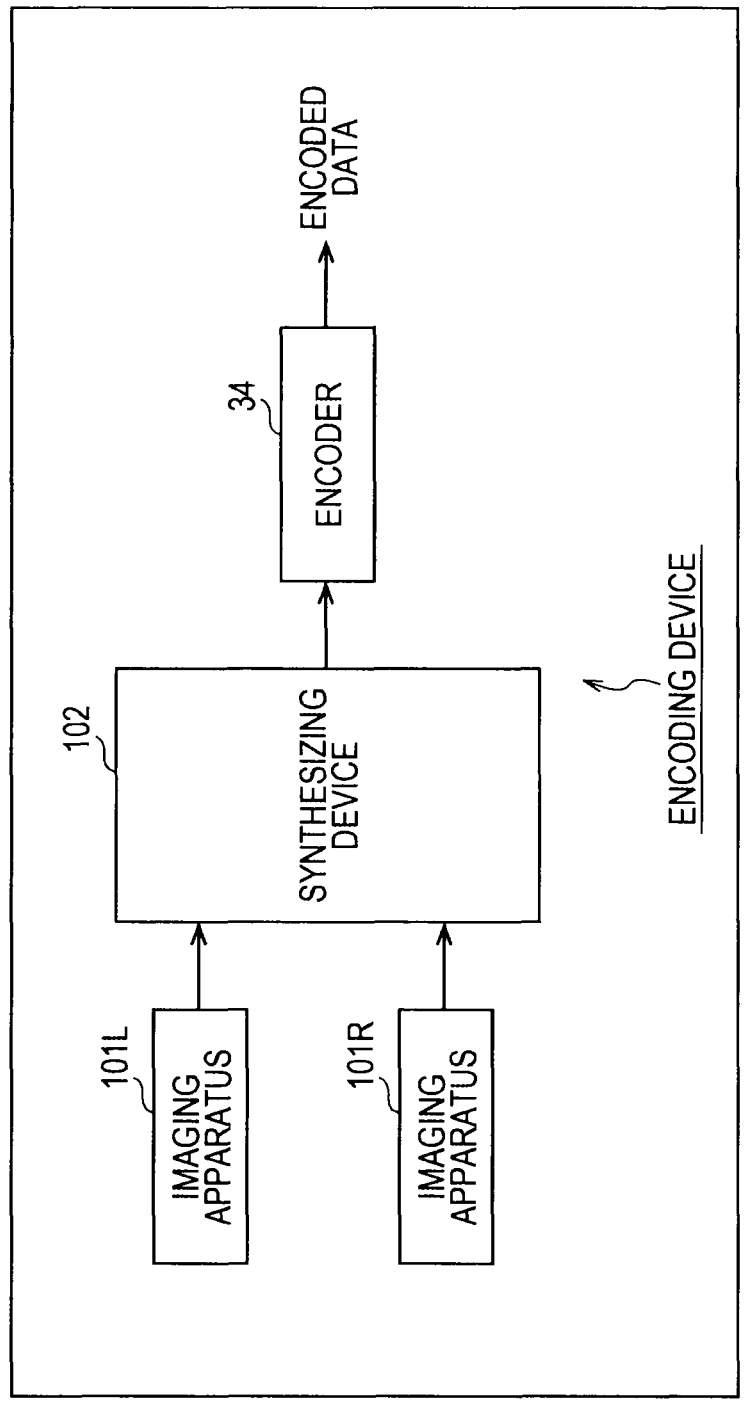
FIG. 19 is a block diagram illustrating a configuration example of another embodiment of an encoding device to which the present invention has been applied.

FIG. 19 is a block diagram illustrating a configuration example of another embodiment of an encoding device to which the image processing device according to the present invention has been applied.

In FIG. 19, portions corresponding to the encoding device in FIG. 5 are denoted with the same reference numerals, and description thereof will be omitted as appropriate.

That is to say, the encoding device 19 has in common with the case in FIG. 5 in the point of having an encoder 34.

Note however, that the encoding device in FIG. 19 differs from the case in FIG. 5 in the point of having imaging apparatuses 101L and 101R. Further, the encoding device in FIG. 19 differs from the case in FIG. 5 in the point of having a synthesizing unit 102 instead of the filter unit 11, thinning-out unit 12, horizontal processing unit 31, vertical processing unit 32, combining unit 33, and control unit 35.

With the encoding device in FIG. 5 described above, encoding can be performed regardless of whether the L image and R image are progressive (non-interlace format) images or interlace format images, but in the case of interlace format images, the encoding device in FIG. 19 is suitable encoding L images and R images which are interlace format images.

The imaging apparatuses 101L and 101R are video cameras for imaging interlace format images, whereby images with disparity are imaged, and supplied to the synthesizing unit 102.

That is to say, the imaging apparatus 101L images interlace format images which are to be L images, and supplies to the synthesizing unit 102.

The imaging apparatus 101R images interlace format images which are to be R images synchronously with the imaging of L images with the imaging apparatus 101L, and supplies to the synthesizing unit 102.

The synthesizing unit 102 performs thinning out of pixels of the L image from the imaging apparatus 101L and performs later-described pre-processing, thereby generating a thinned-out L image, and performs thinning out of pixels of the R image from the imaging apparatus 101R and performs later-described pre-processing, thereby generating a thinned-out R image.

Further, the synthesizing unit 102 subjects the thinned-out L image and thinned-out R image to processing the same as the horizontal processing, vertical processing, and combining processing, which the horizontal processing unit 31, vertical processing unit 32, and combining unit 33 in FIG. 5 perform in the event that the separate flag, vertical pattern flag, and arrange pattern flag are all 1, thereby generating a combined image, which is supplied to the encoder 34.

Now, in the event that the separate flag is 1 which indicates line separation, and the vertical pattern flag is 1 which indicates interleaved array, at the encoding device in FIG. 5, as described with FIG. 12 and FIG. 14, after horizontal processing at the horizontal processing unit 31, in the vertical processing the vertical processing unit 32 separates the odd lines and even lines from the post-horizontal-processing L image and also separates the odd lines and even lines from the post-horizontal-processing R image, and arrays in an interleaved manner the odd lines and even lines separated from the post-horizontal-processing L image and post-horizontal-processing R image, thereby generating a post-vertical-processing odd line image and post-vertical-processing even line image.

The combining unit 33 then arrays the post-vertical-processing odd line image and post-vertical-processing even line image, generating a combined image.

As described above, in the case that both of the separate flag and vertical pattern flag are 1, the horizontal processing, vertical processing, and combining processing, performed at each of the horizontal processing unit 31, vertical processing unit 32, and combining unit 33 in FIG. 5 will hereinafter be referred to collectively as interleaved combining processing.

[Configuration Example of Synthesizing Device 102]

Figure 20:
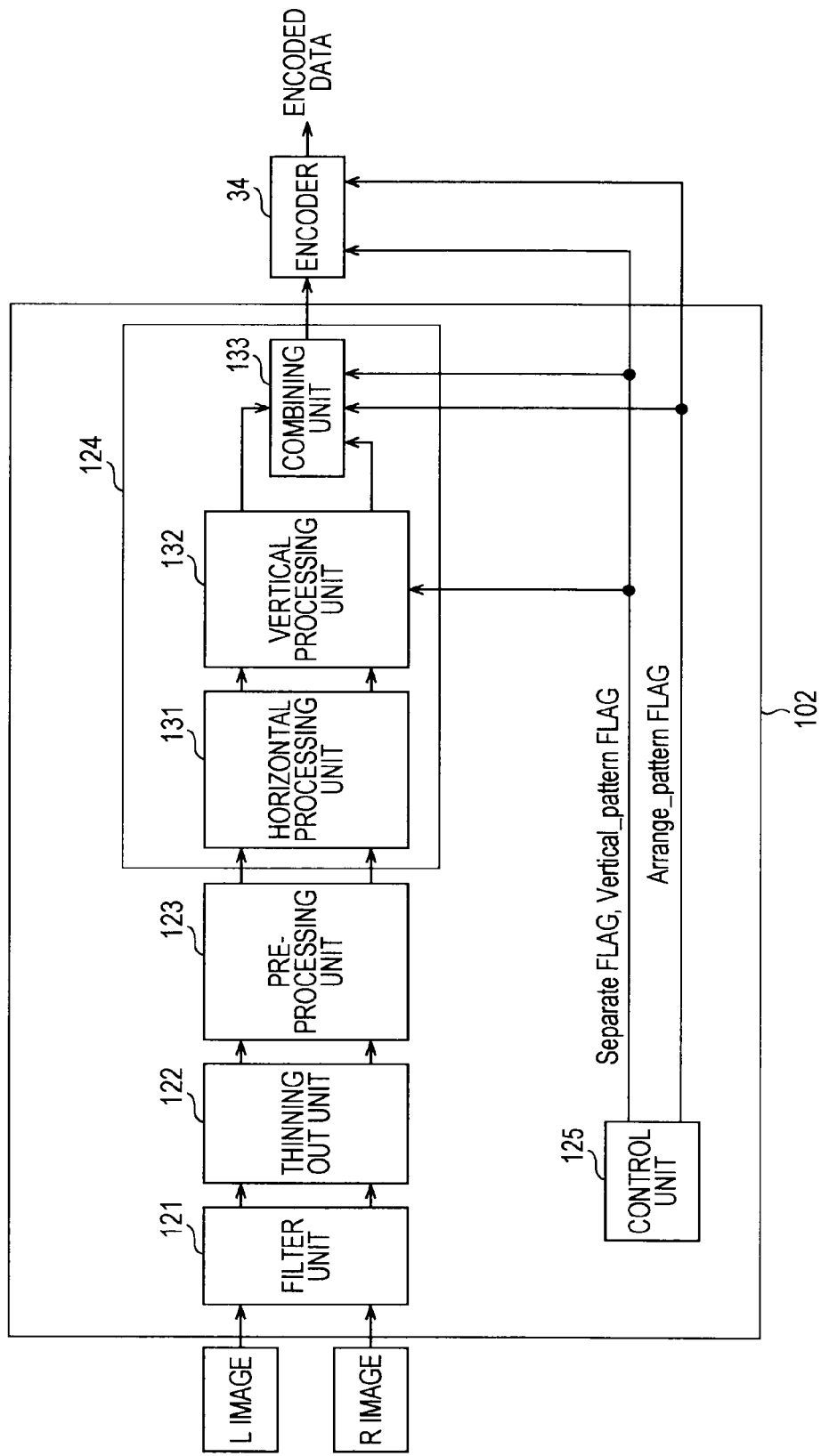
FIG. 20 is a block diagram illustrating a configuration example of a synthesizing device 102.

FIG. 20 is a block diagram illustrating a configuration example of the synthesizing unit 102 in FIG. 19.

The synthesizing unit 102 includes a filter unit 121, a thinning out unit 122, a pre-processing unit 123, an interleaved combining processing unit 124, and a control unit 125.

L images from the imaging apparatus 101L and R images from the imaging apparatus 101R are supplied to the filter unit 121.

In the same way as with the filter unit 11 in FIG. 5, the filter unit 121 performs filtering to cut out high-band components of the L image and R image in order to prevent aliasing from occurring in the thinned-out L image and thinned-out R image where pixels have been thinned out from the L image and R image.

Now, with the thinning out unit 122 downstream from the filter unit 121, pixels are thinned out in the oblique direction in the same way as with the thinning out unit 12 in FIG. 5, so at the filter unit 121, filtering for cutting out the oblique direction high frequency components is performed.

Also, the filter unit 121 performs filtering of interlace format L images and R images, on each of the odd files and even fields making up the frames of the L image and R image.

That is to say, an odd field and an even field making up a frame of an interlace format image have been imaged at different points-in-time.

Accordingly, if filtering is performed on frames configured of such odd fields and even fields, filtering of pixels of one field of the odd field and even field (e.g., product-sum operation with a digital filter) is performed using pixels of the other field imaged at a different point-in-time as that field, and due to the effects of these pixels, the pixels obtained by filtering are blurred as compared with a case of using only pixels of one field.

Accordingly, with the filter unit 121, filtering of interlace format L images and R images is performed with frames divided into constituent odd fields and even fields.

The filter unit 121 supplies, to the thinning out unit 122, the filtering results of the odd field and even field making of the frame of the L image, and the odd field and even field making of the frame of the R image.

Now, the odd field and even field making of the frame of the L image and the odd field and even field making of the frame of the R image will also be called the L odd field, L even field, R odd field, and R even field.

In the same way as the thinning out unit 12 in FIG. 5 thinning out the pixels of the L image, the thinning out unit 122 thins out every other line of the pixels of the L odd field in the oblique direction, thereby converting the L odd field into a field where the pixels have been arrayed in checkerboard fashion (hereinafter also referred to as thinned-out L odd field).

Further, in the same way as the thinning out unit 12 in FIG. 5 thinning out the pixels of the L image, the thinning out unit 122 thins out every other line of the pixels of the L even field in the oblique direction, thereby converting the L even field into a field where the pixels have been arrayed in checkerboard fashion (hereinafter also referred to as thinned-out L even field).

Also, in the same way as the thinning out unit 12 in FIG. 5 thinning out the pixels of the R image, the thinning out unit 122 thins out every other line of the pixels of the L odd field and the R even field in the oblique direction, thereby converting the R odd field and the R even field into fields where the pixels have been arrayed in checkerboard fashion.

Now, the fields obtained by the R odd field and R even field having pixels thinned out at the thinning out unit 122 will also be referred to as thinned-out R odd field and thinned-out R even field.

The thinning out unit 122 supplies the thinned-out L odd field and thinned-out L even field, and the thinned-out R odd field and thinned-out R even field, to the pre-processing unit 123.

The pre-processing unit 123 uses the thinned-out L odd field and thinned-out L even field, and the thinned-out R odd field and thinned-out R even field, supplied from the thinning out unit 122, to pre-processing for configuring the frames of the thinned-out L image and thinned-out R image.

That is to say, the pre-processing unit 123 performs, as pre-processing, processing for configuring an image in which is arrayed a thinned-out L odd field (first thinned-out odd field) and thinned-out L even field (first thinned-out even field) obtained by thinning out the pixels of each of an odd field and even field making up a frame of an interlace format L image imaged by the imaging apparatus 101L every other line in the oblique direction, as a thinned-out L image (first thinned-out image).

Further, the pre-processing unit 123 performs, as pre-processing, processing for configuring an image in which is arrayed a thinned-out R odd field (second thinned-out odd field) and thinned-out R even field (second thinned-out even field) obtained by thinning out the pixels of each of an odd field and even field making up the thinned-out R odd field and thinned-out R even field from the thinning out unit 122, i.e., a frame of an interlace format R image imaged by the imaging apparatus 101R every other line in the oblique direction, as a thinned-out R image (second thinned-out image).

The pre-processing unit 123 then supplies the thinned-out L image and thinned-out R image obtained as a result of the pre-processing to the interleaved combining processing unit 124.

The interleaved combining processing unit 124 has a horizontal processing unit 131, a vertical processing unit 132, and a combining unit 133, and performs interleaved combining processing.

That is to say, (the frames of) the thinned-out L image and thinned-out R image are supplied from the pre-processing unit 123 to the horizontal processing unit 131.

In the same way as with the horizontal processing unit 31 in FIG. 5, the horizontal processing unit 131 subjects (the frames of) the thinned-out L image and thinned-out R image from the pre-processing unit 123 each to horizontal processing, and supplies the post-horizontal-processing L image and post-horizontal-processing R image obtained as a result thereof to the vertical processing unit 132.

In addition to the post-horizontal-processing L image and post-horizontal-processing R image supplied from the horizontal processing unit 131, the vertical processing unit 132 is also supplied with a separate flag indicating line separation and a vertical pattern flag indicating interleaved array from the control unit 125.

In the same way as with the vertical processing unit 32 in FIG. 5, the vertical processing unit 132 follows the separate flag and vertical pattern flag to subject the post-horizontal-processing L image and post-horizontal-processing R image from the horizontal processing unit 131 to vertical processing.

That is to say, the vertical processing unit 132 follows the separate flag indicating line separation from the control unit 125 to separate the odd lines and even lines from (the frames of) the post-horizontal-processing L image and post-horizontal-processing R image from the horizontal processing unit 131.

Further, the vertical processing unit 132 follows the vertical pattern flag from the control unit 125 indicating interleaved array, to generate the two images of a post-vertical-processing odd line image obtained by arraying the odd lines of the post-horizontal-processing L image and post-horizontal-processing R image in an interleaved manner, and a post-vertical-processing even line image obtained by arraying the even lines of the post-horizontal-processing L image and post-horizontal-processing R image in an interleaved manner, as multiple post-vertical processing images, which are supplied to the combining unit 133.

The combining unit 133 is supplied with the post-vertical-processing odd line image and post-vertical-processing even line image as multiple post-vertical processing images from the vertical processing unit 132, and also a separate flag, vertical pattern flag, and arrange pattern flag from the control unit 125.

In the same say as with the combining unit 33 in FIG. 5, the combining unit 133 follows the separate flag, vertical pattern flag, and arrange pattern flag from the control unit 125 to array the multiple post-vertical processing images from the vertical processing unit 132, thereby generating a combined image with the multiple post-vertical processing images mixed, which is output to the encoder 34 as an image to be subjected to prediction encoding.

Now, as described above, here, the separate flag from the control unit 125 indicates line separation, and the vertical pattern flag indicates interleaved array.

Accordingly, in the same way as with the combining unit 33 in FIG. 5, the combining unit 133 follows the separate flag indicating line separation and the vertical pattern flag indicating interleaved array, recognition is made that the images supplied from the vertical processing unit 132 as the multiple post-vertical processing images are the two images of the post-vertical-processing odd line image and post-vertical-processing even line image, and the post-vertical-processing odd line image and post-vertical-processing even line image are arrayed so as to be situated as determined beforehand, regardless of the arrange pattern flag, thereby generating a combined image.

The control unit 125 sets the separate flag to 1 which indicates line separation, the vertical pattern flag to 1 which indicates interleaved array, and the vertical pattern flag to an arbitrary value (or default value) respectively, and supplies to the combining unit 133 and encoder 34. Further, the control unit 125 supplies the separate flag and vertical pattern flag to the vertical processing unit 132.

[Processing of Synthesizing Device 102]

Figure 21:
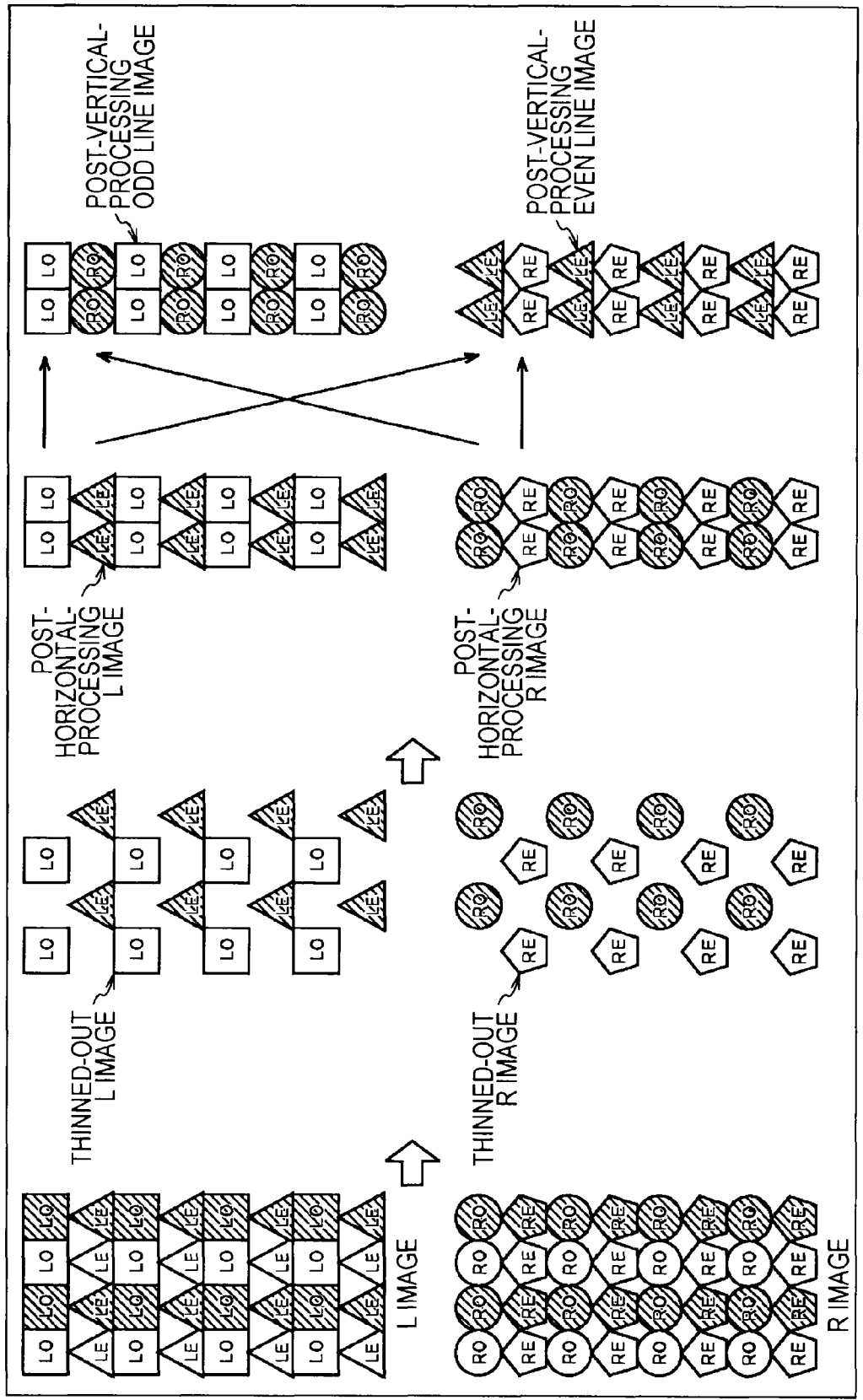
FIG. 21 is a diagram for describing processing of the synthesizing device 102.

FIG. 21 is a diagram for describing processing of the synthesizing unit 102 in FIG. 20 in the event that the L image and R image are progressive images.

Note that, as described in FIG. 8, in FIG. 21 LO represents pixels of the odd lines of (he frame of) the L image, LE represents pixels of the even lines of the L image, RO represents pixels of the odd lines of (he frame of) the R image, and RE represents pixels of the even lines of the R image, respectively.

Further, in FIG. 21, the pixels which are indicated by hatching represent pixels of even-numbered columns from the left, and the pixels which are not hatched represent pixels of odd-numbered columns from the left. This is true for the following drawings as well.

In the event that the L image and R image are progressive images, the filter unit 121 (FIG. 20) performs filtering of the progressive L image and R image, as to the frames of the L image and R image, and supplies to the thinning out unit 122.

The thinning out unit 122 (FIG. 20) thins out the frames of the L image and R image from the filter unit 121, every other line in the oblique direction as shown in FIG. 21, thereby converting the frames of the L image and R image into a thinned-out L image and thinned-out R image with pixels arrayed in checkerboard fashion, which are supplied to the pre-processing unit 123.

In the event that the L image and R image are progressive, the pre-processing unit 123 (FIG. 20) does not perform pre-processing, and supplies the frames of the thinned-out L image and thinned-out R image from the thinning out unit 122 to the horizontal processing unit 131 of the interleaved combining processing unit 124 without change.

The horizontal processing unit 131 (FIG. 20) performs horizontal packing to shift the pixels of each of the thinned-out L image and thinned-out R image from the pre-processing unit 123 with the pixels thereof arrayed in checkerboard fashion, in the horizontal direction as horizontal processing, thereby generating (the frames of) the post-horizontal-processing L image and post-horizontal-processing R image shown in FIG. 21, which are supplied to the vertical processing unit 132.

The vertical processing unit 132 (FIG. 20) separates the odd lines and even lines from each of the post-horizontal-processing L image and post-horizontal-processing R image from the horizontal processing unit 131.

Further, as shown in FIG. 21, the vertical processing unit 132 performs interleaved array of odd lines (LO) of the post-horizontal-processing L image odd lines (RO) of the post-horizontal-processing R image, thereby generating (a frame of) a post-vertical-processing odd line image where the odd lines (LO) of the post-horizontal-processing L image odd lines (RO) of the post-horizontal-processing R image are arrayed in an alternating manner.

Also, as shown in FIG. 21, the vertical processing unit 132 performs interleaved array of even lines (LE) of the post-horizontal-processing L image and even lines (RE) of the post-horizontal-processing R image, thereby generating (a frame of) a post-vertical-processing even line image where the even lines (LE) of the post-horizontal-processing L image and even lines (RE) of the post-horizontal-processing R image are arrayed in an alternating manner.

The vertical processing unit 132 then supplies the post-vertical-processing odd line image and post-vertical-processing even line image to the combining unit 133.

As described with FIG. 13 for example, the combining unit 133 (FIG. 20) situates the post-vertical-processing odd line image to the left side and the post-vertical-processing even line image to the right side, thereby generating (a frame of) a combined image, which is supplied to the encoder 34.

Accordingly, in the event that the L image and R image are progressive images, at the post-vertical-processing odd line image which is the left half of the combined image, the odd field (odd lines) is configured of just pixels of the odd lines (LO) of the L image, and the even field (even lines) is configured of just pixels of the odd lines (RO) of the R image.

Also, at the post-vertical-processing even line image which is the right half of the combined image, the odd field is configured of just pixels of the even lines (LE) of the L image, and the even field is configured of just pixels of the even lines (RE) of the R image.

Accordingly, by performing prediction processing with the combined image as an interlace format image, high encoding efficiency can be realized as described in FIG. 13.

Figure 22:
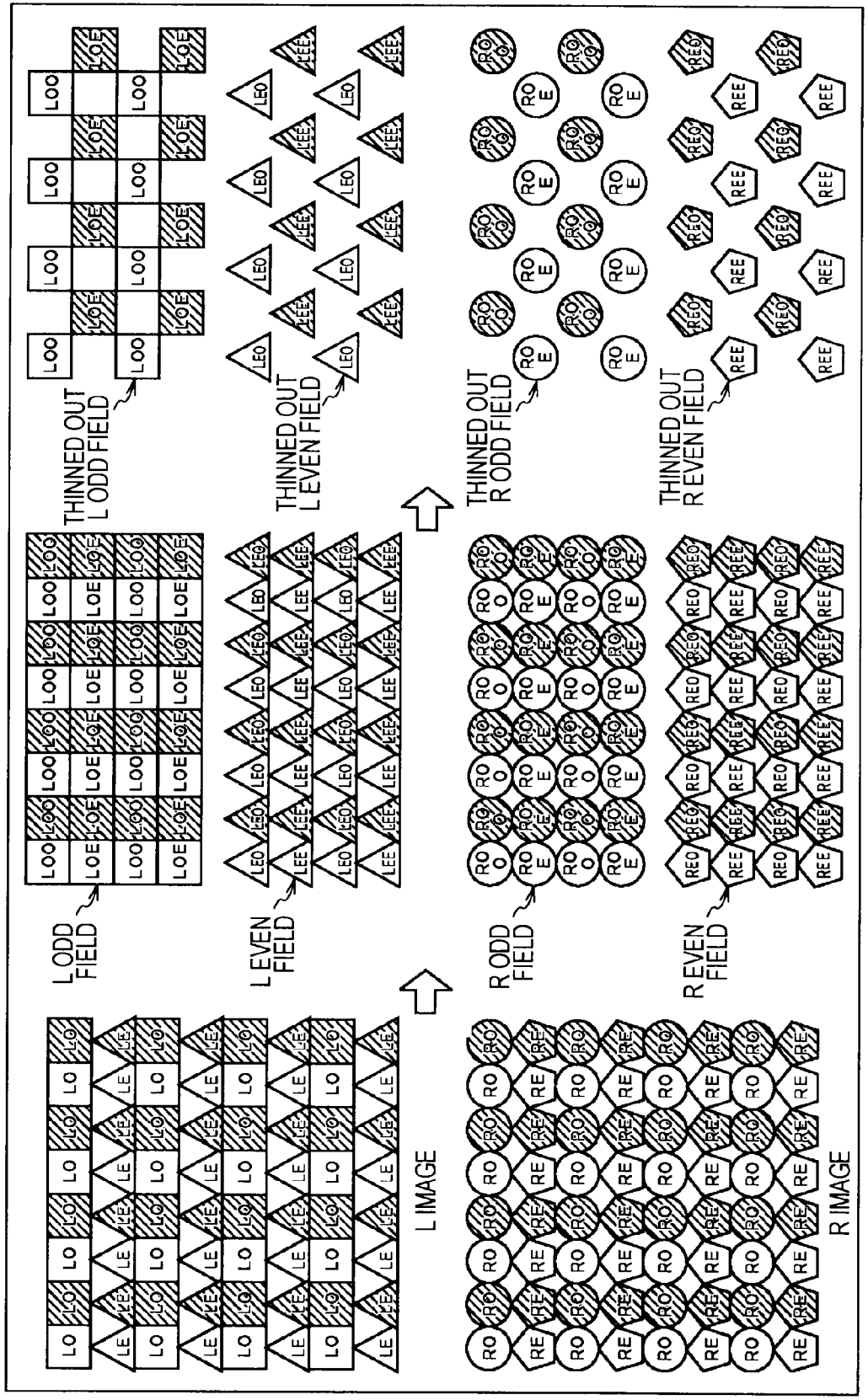
FIG. 22 is a diagram for describing processing of a filter unit 121 and a thinning out unit 122 in the event that the L image and R image are interlace format images.
Figure 23:
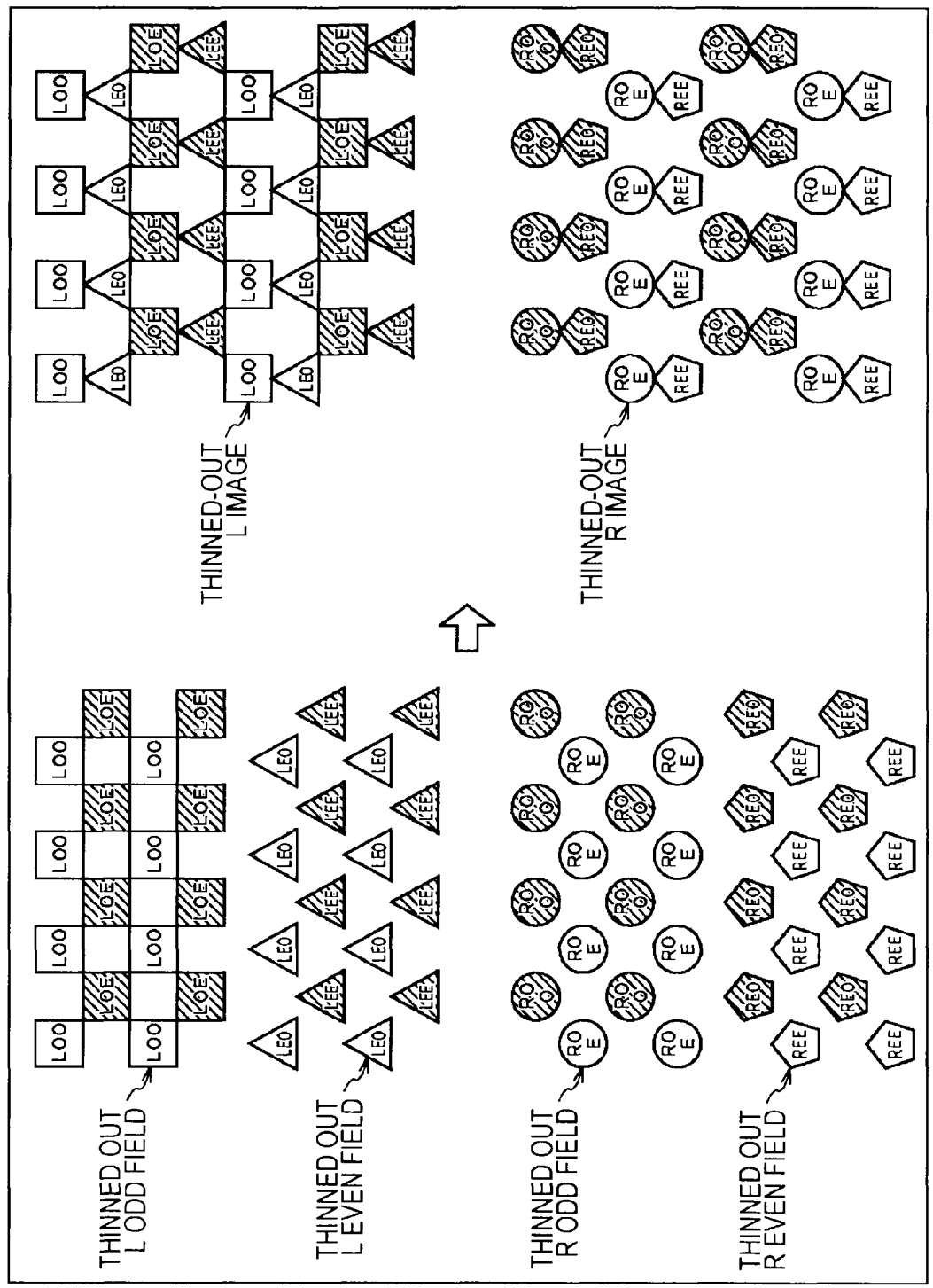
FIG. 23 is a diagram for describing processing of the filter unit 121 and thinning out unit 122 in the event that the L image and R image are interlace format images and also pre-processing is not performed.
Figure 24:
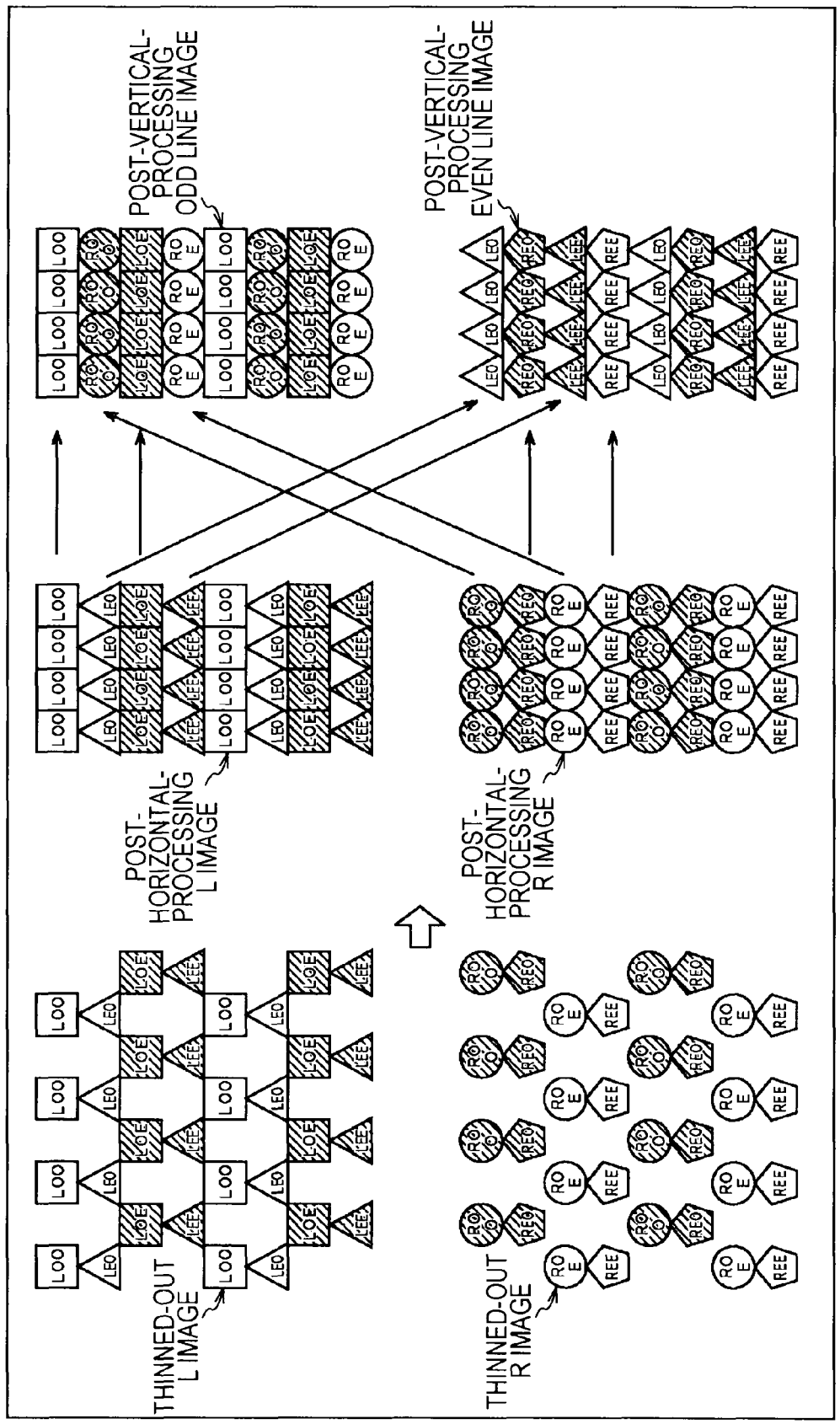
FIG. 24 is a diagram for describing horizontal processing and vertical processing.

FIG. 22 through FIG. 24 are diagrams for describing processing of the synthesizing unit 102 in FIG. 20 in the event that the L image and R image are interlace format images.

That is to say, FIG. 22 is a diagram for describing the processing of the filter unit 121 and thinning out unit 122 in the event that the L image and R image are interlace format images.

Note that in FIG. 22, LOO indicates the odd field (L odd field) of (the frame of) the L image, LOE the even lines of the L odd field, LEO the odd lines of the even field of the L image (L even field), LEE the even lines of the L even field, ROO indicates the odd field (R odd field) of (the frame of) the R image, ROE the even lines of the R odd field, REO the odd lines of the even field of the R image (R even field), REE the even lines of the R even field, respectively. This holds for the following drawings as well.

In the event that the L image and R image are interlace format images, the filter unit 121 (FIG. 20) performs filtering of the interlace format L image and R image as to the fields of the L image and R image, and supplies to the thinning out unit 122.

That is to say, as shown in FIG. 22, the filter unit 121 performs filtering of each of the L odd field and L even field making up the frame of the L image, and the R odd field and R even field making up the frame of the R image, and supplies to the thinning out unit 122.

The thinning out unit 122 (FIG. 20) thins out the pixels of each of the L odd field and L even field, and the R odd field and R even field, from the filter unit 121, every other row in the oblique direction as shown in FIG. 22, thereby converting the L odd field and L even field, and the R odd field and R even field, into a thinned-out L odd field and thinned-out L even field, and thinned-out R odd field and thinned-out R even field, respectively, with the pixels arrayed in checkerboard fashion, which are supplied to the pre-processing unit 123.

Now, in the event that the L image and R image are progressive images, the pre-processing unit 123 does not performed pre-processing, as described with FIG. 21, and supplies the thinned-out L image and thinned-out R image from the thinning out unit 122 to the horizontal processing unit 131 of the interleaved combining processing unit 124 without change.

Now, description will be made regarding a combined image obtained by interleaved combining processing by the interleaved combining processing unit 124 in a case where we will say that, in the same way as with a case where the L image and R image are progressive images, the pre-processing unit 123 does not perform pre-processing and supplies the thinned-out L odd field and thinned-out L even field, and the thinned-out R odd field and thinned-out R even field, from the thinning out unit 122 to (the horizontal processing unit 131 of) the interleaved combining processing unit 124 without change.

FIG. 23 is a diagram illustrating frames of a thinned-out L image and thinned-out R image supplied from the pre-processing unit 123 to the horizontal processing unit 131 of the interleaved combining processing unit 124, in a case where the L image and R image are interlace format images and also the pre-processing unit 123 does not perform pre-processing.

The frame of the thinned-out L image is a frame which has the thinned-out L odd field as the odd field, and the thinned-out L even field as the even field. Also, the frame of the thinned-out R image is a frame which has the thinned-out R odd field as the odd field, and the thinned-out R even field as the even field.

Accordingly, in this case, at the frame of the thinned-out L image, two pixels are arrayed in the vertical (vertical direction) direction every two pixels as shown in FIG. 23, and the pixels are not arrayed in checkerboard fashion.

Also, at the frame of the thinned-out L image, there coexist in the odd field lines configured of only pixels of the L-odd-field odd lines (LOO) and lines configured of only pixels of the L-odd-field even lines (LOE), and there coexist in the even field lines configured of only pixels of the L-even-field odd lines (LEO) and lines configured of only pixels of the L-even-field even lines (LEE).

That is to say, with the frame of the thinned-out L image, the 4n+1'th lines (the 4n+1 (n=0, 1, 2, ... )'th horizontal lines) are configured of pixels of the L-odd-field odd lines (LOO) alone, the 4n+2'th lines pixels of L-even-field odd lines (LEO) alone, the 4n+3'th lines pixels of L-odd-field even lines (LOE) alone, and the 4n+4'th lines pixels of L-even-field even lines (LEE) alone, respectively.

In the same way, at the frame of the thinned-out R image, two pixels are arrayed in the vertical direction every two pixels as shown in FIG. 23, and the pixels are not arrayed in checkerboard fashion.

Also, at the frame of the thinned-out R image, as shown in FIG. 23, there coexist in the odd field lines configured of only pixels of the R-odd-field odd lines (ROO) and lines configured of only pixels of the R-odd-field even lines (ROE), and there coexist in the even field lines configured of only pixels of the R-even-field odd lines (REO) and lines configured of only pixels of the R-even-field even lines (REE).

That is to say, with the frame of the thinned-out R image, the 4n+1'th lines (the 4n+1 (n=0, 1, 2, ... )'th horizontal lines) are configured of pixels of the R-odd-field odd lines (ROO) alone, the 4n+2'th lines pixels of R-even-field odd lines (REO) alone, the 4n+3'th lines pixels of R-odd-field even lines (ROE) alone, and the 4n+4'th lines pixels of R-even-field even lines (REE) alone, respectively.

FIG. 24 is a diagram for describing the horizontal processing and vertical processing performed at the horizontal processing unit 131 and vertical processing unit 132 in FIG. 20 respectively, on the thinned-out L image and thinned-out R image in FIG. 23.

The horizontal processing unit 131 (FIG. 20) performs horizontal packing to pack the pixels from the thinned-out L image and thinned-out R image from the pre-processing unit 123 in the horizontal direction, as horizontal processing, thereby generating (the frames of) the post-horizontal-processing L image and post-horizontal-processing R image shown in FIG. 24, which are supplied to the vertical processing unit 132.

Now, as described above, with the frame of the thinned-out L image, the 4n+1'th lines are configured of pixels of the L-odd-field odd lines (LOO) alone, the 4n+2'th lines pixels of L-even-field odd lines (LEO) alone, the 4n+3'th lines pixels of L-odd-field even lines (LOE) alone, and the 4n+4'th lines pixels of L-even-field even lines (LEE) alone, respectively.

Also, with the frame of the thinned-out R image, the 4n+1'th lines are configured of pixels of the R-odd-field odd lines (ROO) alone, the 4n+2'th lines pixels of R-even-field odd lines (REO) alone, the 4n+3'th lines pixels of R-odd-field even lines (ROE) alone, and the 4n+4'th lines pixels of R-even-field even lines (REE) alone, respectively.

Accordingly, with the post-horizontal-processing L image as well, the 4n+1'th lines are configured of pixels of the L-odd-field odd lines (LOO) alone, the 4n+2'th lines pixels of L-even-field odd lines (LEO) alone, the 4n+3'th lines pixels of L-odd-field even lines (LOE) alone, and the 4n+4'th lines pixels of L-even-field even lines (LEE) alone, respectively.

In the same way, with the post-horizontal-processing R image as well, the 4n+1'th lines are configured of pixels of the R-odd-field odd lines (ROO) alone, the 4n+2'th lines pixels of R-even-field odd lines (REO) alone, the 4n+3'th lines pixels of R-odd-field even lines (ROE) alone, and the 4n+4'th lines pixels of R-even-field even lines (REE) alone, respectively.

The vertical processing unit 132 (FIG. 20) separates the odd lines and even lines from each of the post-horizontal-processing L image and post-horizontal-processing R image from the horizontal processing unit 131.

Further, as shown in FIG. 24, the vertical processing unit 132 arrays the odd lines of the frame of the post-horizontal-processing L image and the odd lines of the frame of the post-horizontal-processing R image in an interleaved manner, thereby generating (the frame of) the post-vertical-processing odd line image.

The odd lines of the post-horizontal-processing L image include the 4n+1'th lines and 4n+3'th lines, and as described above, the 4n+1'th line is configured of only pixels of the L-odd-field odd lines (LOO), and the 4n+3'th lines only of pixels of the L-odd-field even lines (LOE), respectively.

Also, the odd lines of the post-horizontal-processing R image include the 4n+1'th lines and 4n+3'th lines, and as described above, the 4n+1'th line is configured of only pixels of the R-odd-field odd lines (ROO), and the 4n+3'th lines only of pixels of the R-odd-field even lines (ROE), respectively.

Accordingly, with the frame of the post-vertical-processing odd line image generated by arraying the odd lines of such a post-horizontal-processing L image and the odd lines of such a post-horizontal-processing R image in an interleaved manner, as shown in FIG. 24, the 4n+1'th lines are configured of only pixels of the L-odd-field odd lines (LOO), the 4n+2'th lines of only pixels of the R-odd-field odd lines (ROO), the 4n+3'th lines of only pixels of the L-odd-field even lines (LOE), and the 4n+4'th lines of only pixels of the R-odd-field even lines (ROE), respectively.

Also, as shown in FIG. 24, the pre-processing unit 123 arrays the even lines of the frame of the post-horizontal-processing L image and the even lines of the frame of the post-horizontal-processing R image in an interleaved manner, thereby generating (the frame of) the post-vertical-processing even line image.

The even lines of the post-horizontal-processing L image include the 4n+2'th lines and 4n+4'th lines, and as described above, the 4n+2'th line is configured of only pixels of the L-even-field odd lines (LEO), and the 4n+3'th lines only of pixels of the L-even-field even lines (LEE).

Also, the even lines of the post-horizontal-processing R image include the 4n+2'th lines and 4n+4'th lines, and as described above, the 4n+2'th line is configured of only pixels of the R-even-field odd lines (REO), and the 4n+4'th lines only of pixels of the R-even-field even lines (REE).

Accordingly, with the frame of the post-vertical-processing even line image generated by arraying the even lines of such a post-horizontal-processing L image and the even lines of such a post-horizontal-processing R image in an interleaved manner, as shown in FIG. 24, the 4n+1'th lines are configured of only pixels of the L-even-field odd lines (LEO), the 4n+2'th lines of only pixels of the R-even-field odd lines (REO), the 4n+3'th lines of only pixels of the L-even-field even lines (LEE), and the 4n+4'th lines of only pixels of the R-even-field even lines (REE), respectively.

The vertical processing unit 132 supplies such a post-vertical-processing odd line image and post-vertical-processing even line image to the combining unit 133.

As described with FIG. 13, the combining unit 133 (FIG. 20) situates the post-vertical-processing odd line image to the left side and situates the post-vertical-processing even line image to the right side, thereby generating (a frame of) a combined image, which is supplied to the encoder 34.

Accordingly, in the event that the L image and R image are interlace format images and the pre-processing unit 123 does not perform pre-processing, the L-odd-field odd lines (LOO) and L-odd-field even lines (LOE) alternate in the odd field (odd lines) of the post-vertical-processing odd line image which is the left half of the combined image.

Further, the R-odd-field odd lines (ROO) and R-odd-field even lines (ROE) alternate in the even field (even lines) of the post-vertical-processing odd line image which is the left half of the combined image.

In FIG. 24, of the L-odd-field odd lines (LOO) and L-odd-field even lines (LOE) making up the odd field of the post-vertical-processing odd line image, the pixels of the L-odd-field odd lines (LOO) are not hatched, so as described in FIG. 21, these are the pixels of the odd-numbered columns in the L odd field, and the pixels of the L-odd-field even lines (LOE) are hatched, so as described in FIG. 21, these are the pixels of the even-numbered columns in the L odd field.

Accordingly, the pixels of the L-odd-field odd lines (LOO) and even lines (LOE) making up the odd field of the post-vertical-processing odd line image are pixels of which the phase (position) in the horizontal direction (horizontal direction) is offset by one pixel worth, so (spatial) correlation is low (change in pixel values is not continuous, and high-frequency components occur).

In the same way, the pixels of the R-odd-field odd lines (ROO) and even lines (ROE) making up the even field of the post-vertical-processing odd line image are pixels of which the phase in the horizontal direction is offset by one pixel worth, so correlation is low.

Further, this is the same with the post-vertical-processing even line image which is the right half of the combined image.

That is to say, in the event that the L image and R image are interlace format images and the pre-processing unit 123 does not perform pre-processing, the L-even-field odd lines (LEO) and L-even-field even lines (LEE) alternate in the odd field of the post-vertical-processing even line image which is the right half of the combined image, and the R-even-field odd lines (REO) and R-even-field even lines (REE) alternate in the even field.

Thus, the pixels of the L-even-field odd lines (LEO) and L-even-field even lines (LEE) making up the odd field of the post-vertical-processing odd line image which is the right half of the combined image are low in correlation, and the pixels of the R-even-field odd lines (REO) and R-even-field even lines (REE) making up the even field are also low.

Accordingly, even if prediction encoding is performed with a combined image as an interlace format image, realizing high encoding efficiency is difficult.

Also, as shown in FIG. 23, with frames of a thinned-out L image and thinned-out R image, two pixels are arrayed every two pixels in the vertical direction, and the pixels are not arrayed in checkerboard fashion, so spatial resolution deteriorates as comparison with a case in which pixels are arrayed in checkerboard fashion.

Accordingly, in the event that the L image and R image are interlace format images, the synthesizing unit 102 (FIG. 20) performs pre-processing at the pre-processing unit 123.

[Pre-Processing]

Figure 25:
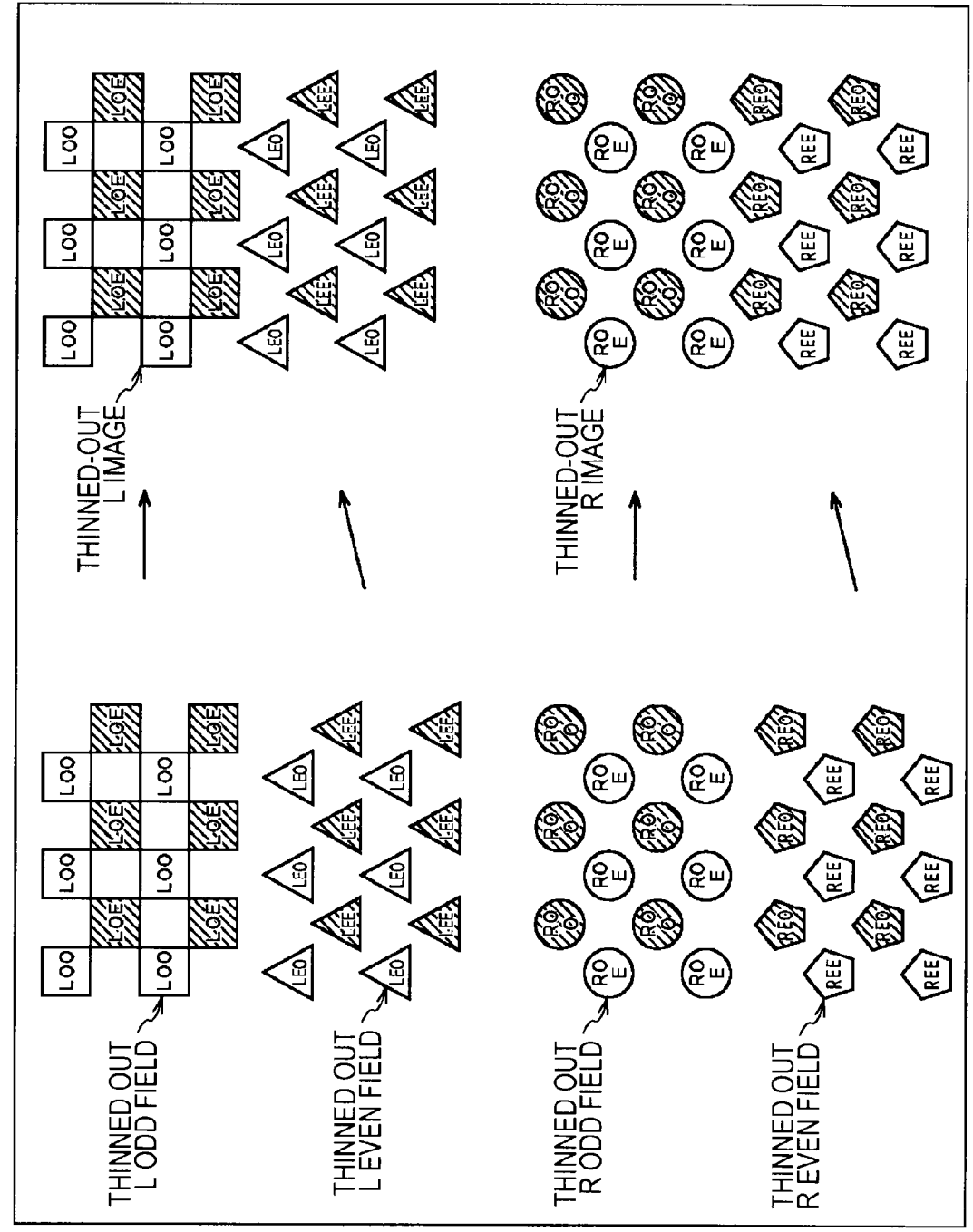
FIG. 25 is a diagram for describing pre-processing.

FIG. 25 is a diagram for describing pre-processing which the pre-processing unit 123 performs.

As shown in FIG. 25, the pre-processing unit 123 performs processing to configure an image where the thinned-out L odd field and the thinned-out L even field are arrayed in the vertical direction for example, as the frame of the thinned-out L image, as the pre-processing.

Further, as shown in FIG. 25, the pre-processing unit 123 performs processing to configure an image where the thinned-out R odd field and the thinned-out R even field are arrayed in the vertical direction for example, as the frame of the thinned-out R image, as the pre-processing.

The pre-processing unit 123 then supplies the thinned-out L image and thinned-out R image obtained as a result of the pre-processing to the interleaved combining processing unit 124.

At the thinned-out L image frame in FIG. 25, the thinned-out L odd field is situated at the upper side (upper half) and the thinned-out L even field is situated at the lower side (lower half). In the same way, at the thinned-out R image frame, the thinned-out R odd field is situated at the upper side (upper half) and the thinned-out R even field is situated at the lower side (lower half).

Figure 26:
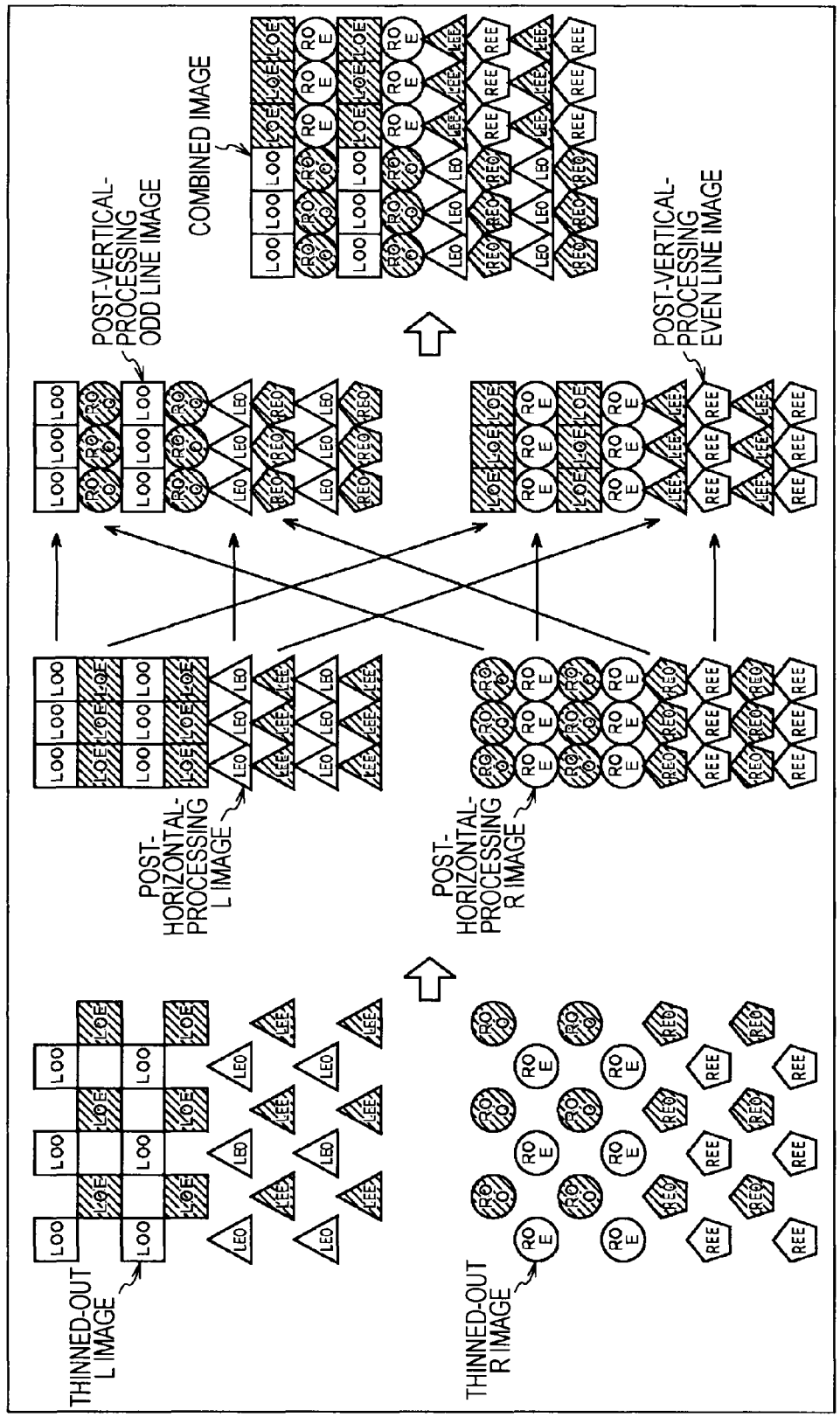
FIG. 26 is a diagram for describing horizontal processing, vertical processing, and combining processing, which are interleaved combining processing.

FIG. 26 is a diagram for describing horizontal processing, vertical processing, and combining processing which is the interleaved combining processing performed at the interleaved combining processing unit 124 in FIG. 20 as processing on the thinned-out L image and thinned-out R image in FIG. 25.

The horizontal processing unit 131 (FIG. 20) performs horizontal packing to pack the pixels from the thinned-out L image and thinned-out R image from the pre-processing unit 123 in the horizontal direction, as horizontal processing, thereby generating (the frames of) the post-horizontal-processing L image and post-horizontal-processing R image shown in FIG. 26, which are supplied to the vertical processing unit 132.

Now, as described above, with the frame of the thinned-out L image obtained by the pre-processing, the thinned-out L odd field is situated at the upper side and the thinned-out L even field at the lower side, and with the frame of the thinned-out R image obtained by the pre-processing, the thinned-out R odd field is situated at the upper side and the thinned-out R even field at the lower side.

Accordingly, as shown in FIG. 26, at the frame of the post-horizontal-processing L image, L-odd-field odd lines (LOO) and even lines (LOE) alternate at the upper side, and L-even-field odd lines (LEO) and even lines (LEE) alternate at the lower side.

That is to say, at the upper side of the post-horizontal-processing L image, the odd lines are the L-odd-field odd lines (LOO), and the even lines are the L-odd-field even lines (LOE).

Also, at the lower side of the post-horizontal-processing L image, the odd lines are the L-even-field odd lines (LEO) and the even lines are the even lines (LEE).

Also, as shown in FIG. 26, at the frame of the post-horizontal-processing R image, R-odd-field odd lines (ROO) and even lines (ROE) alternate at the upper side, and R-even-field odd lines (REO) and even lines (REE) alternate at the lower side.

That is to say, at the upper side of the post-horizontal-processing R image, the odd lines are the R-odd-field odd lines (ROO), and the even lines are the R-odd-field even lines (ROE).

Also, at the lower side of the post-horizontal-processing R image, the odd lines are the R-even-field odd lines (REO) and the even lines are the even lines (REE).

The vertical processing unit 132 (FIG. 20) separates the odd lines and even lines from each of the post-horizontal-processing L image and post-horizontal-processing R image from the horizontal processing unit 131.

Further, as shown in FIG. 26, the vertical processing unit 132 arrays the odd lines of the frame of the post-horizontal-processing L image (LOO and LEO), and the odd lines of the frame of the post-horizontal-processing R image (ROO and REO), in an interlaced manner, so as to generate (a frame of) a post-vertical-processing odd line image, and also arrays the even lines of the frame of the post-horizontal-processing L image (LOE and LEE), and the odd lines of the frame of the post-horizontal-processing R image (ROE and REE), in an interlaced manner, so as to generate (a frame of) a post-vertical-processing even line image.

Accordingly, as shown in FIG. 26, with the post-vertical-processing odd line image, the L-odd-field odd lines (LOO) and R-odd-field odd lines (ROO) alternate at the upper side, and the L-even-field odd lines (LEO) and R-even-field odd lines (REO) alternate at the lower side.

That is to say, at the upper side of the frame of the post-vertical-processing odd line image, the odd lines are the L-odd-field odd lines (LOO), and the even lines are the R-odd-field odd lines (ROO).

Further, at the lower side of the frame of the post-vertical-processing odd line image, the odd lines are the L-even-field odd lines (LEO), and the even lines are the R-even-field odd lines (REO).

On the other hand, as shown in FIG. 26, with the post-vertical-processing even line image, the L-odd-field even lines (LOE) and R-odd-field even lines (ROE) alternate at the upper side, and the L-even-field even lines (LEE) and R-even-field even lines (REE) alternate at the lower side.

That is to say, at the upper side of the frame of the post-vertical-processing even line image, the odd lines are the L-odd-field even lines (LOE), and the even lines are the R-odd-field even lines (ROE).

Further, at the lower side of the post-vertical-processing even line image, the odd lines are the L-even-field even lines (LEE), and the even lines are the R-even-field even lines (REE).

The vertical processing unit 132 supplies the post-vertical-processing odd line image and post-vertical-processing even line image such as above to the combining unit 133.

The combining unit 133 (FIG. 20) situates the post-vertical-processing odd line image to the left side as shown in FIG. 26, in the same way as with the case of FIG. 13, and also situates the post-vertical-processing even line image to the right side, thereby generating (the frame of) a combined image, which is supplied to the encoder 34.

Accordingly, in the event that the L image and R image are interlace format images, in the event of performing pre-processing at the pre-processing unit 123, at the upper side of the post-vertical-processing odd line image which is the left half of the combined image, i.e., at the upper left ¼ region of the combined image, the odd lines are the L-odd-field odd lines (LOO) and the even lines are the R-odd-field odd lines (ROO), as shown in FIG. 26.

Also, at the lower side of the post-vertical-processing odd line image which is the left half of the combined image, i.e., at the lower left ¼ region of the combined image, the odd lines are the L-even-field odd lines (LEO) and the even lines are the R-even-field odd lines (REO), as shown in FIG. 26.

Further, at the upper side of the post-vertical-processing even line image which is the right half of the combined image, i.e., at the upper right ¼ region of the combined image, the odd lines are the L-odd-field even lines (LOE) and the even lines are the R-odd-field even lines (ROE), as shown in FIG. 26.

Also, at the lower side of the post-vertical-processing even line image which is the right half of the combined image, i.e., at the lower right ¼ region of the combined image, the odd lines are the L-even-field even lines (LEE) and the even lines are the R-even-field even lines (REE), as shown in FIG. 26.

Accordingly, of the odd field (odd lines) of the combined image, the upper left ¼ region is configured only of pixels of the L-odd-field odd lines (LOO), the lower left ¼ region only of pixels of the L-even-field odd lines (LEO), the upper right ¼ region only of pixels of the L-odd-field even lines (LOE), and the lower right ¼ region only of pixels of the L-even-field even lines (LEE), respectively.

Also, of the even field (even lines), the upper left ¼ region is configured only of pixels of the R-odd-field odd lines (ROO), the lower left ¼ region only of pixels of the R-even-field odd lines (RED), the upper right ¼ region only of pixels of the R-odd-field even lines (ROE), and the lower right ¼ region only of pixels of the R-even-field even lines (REE), respectively.

As described above, the odd field and even field of the combined image are divided into four regions of upper left, lower left, upper right, and lower right, with pixels of the same lines (odd lines or even lines) of the same field (odd field or even field) of one of the L image and R image being concentrated, so by performing prediction encoding with the combined image as an interlace format image, high encoding efficiency can be realized.

Note that in FIG. 25, an arrangement has been made wherein an image with the thinned-out L odd field and thinned-out L even field arrayed in the vertical direction is configured as a thinned-out L image frame, and an image with the thinned-out R odd field and thinned-out R even field arrayed in the vertical direction is configured as a thinned-out R image frame, but an arrangement may be employed wherein the thinned-out L odd field and thinned-out L even field are arrayed in the horizontal direction and taken as a thinned-out L image frame, and an image with the thinned-out R odd field and thinned-out R even field are arrayed in the vertical direction and taken as a thinned-out R image frame.

However, in this case, at the combining unit 133, the combined image is not generated by arraying the post-vertical-processing odd line image and post-vertical-processing even line image in the horizontal direction (situating the post-vertical-processing odd line image to the left side, and the post-vertical-processing even line image to the right side), but rather generating a combined image by arraying the post-vertical-processing odd line image and post-vertical-processing even line image in the vertical direction to generate the combined image.

Also, an arrangement may be made at the pre-processing unit 123 where, for example, the thinned-out L odd field and thinned-out L even field are arrayed in the vertical direction to configure (the frame of) a thinned-out L image, and the thinned-out R odd field and thinned-out R even field are arrayed in the vertical direction to configure a thinned-out R image.

Further, with the pre-processing unit 123, an arrangement may be made wherein the eight images of an L-odd field odd line image in which is collected only the thinned-out L-odd-field odd lines (LOO), an L-odd field even line image in which is collected only the thinned-out L-odd-field even lines (LOE), an L-even field odd line image in which is collected only the thinned-out L-even-field odd lines (LEO), an L-even field even line image in which is collected only the thinned-out L-even-field even lines (LEE), an R-odd field odd line image in which is collected only the thinned-out R-odd-field odd lines (ROO), an R-odd field even line image in which is collected only the thinned-out R-odd-field even lines (ROE), an R-even field odd line image in which is collected only the thinned-out R-even-field odd lines (REO), an R-even field even line image in which is collected only the thinned-out R-even-field even lines (REE), are configured, and these eight images are used to configure the thinned-out L image and thinned-out R image.

Now, the pre-processing of generating the thinned-out L image by arraying the thinned-out L odd field and thinned-out L even field in the vertical direction and arraying the thinned-out R odd field and thinned-out R even field in the vertical direction will be also referred to as pre-processing of the first method.

Also, the pre-processing of configuring the eight images of an L-odd field odd line image, L-odd field even line image, L-even field odd line image, L-even field even line image, R-odd field odd line image, R-odd field even line image, R-even field odd line image, and R-even field even line image, and configuring the thinned-out L image and thinned-out R image using the eight images, will be also referred to as pre-processing of the second method.

Figure 27:
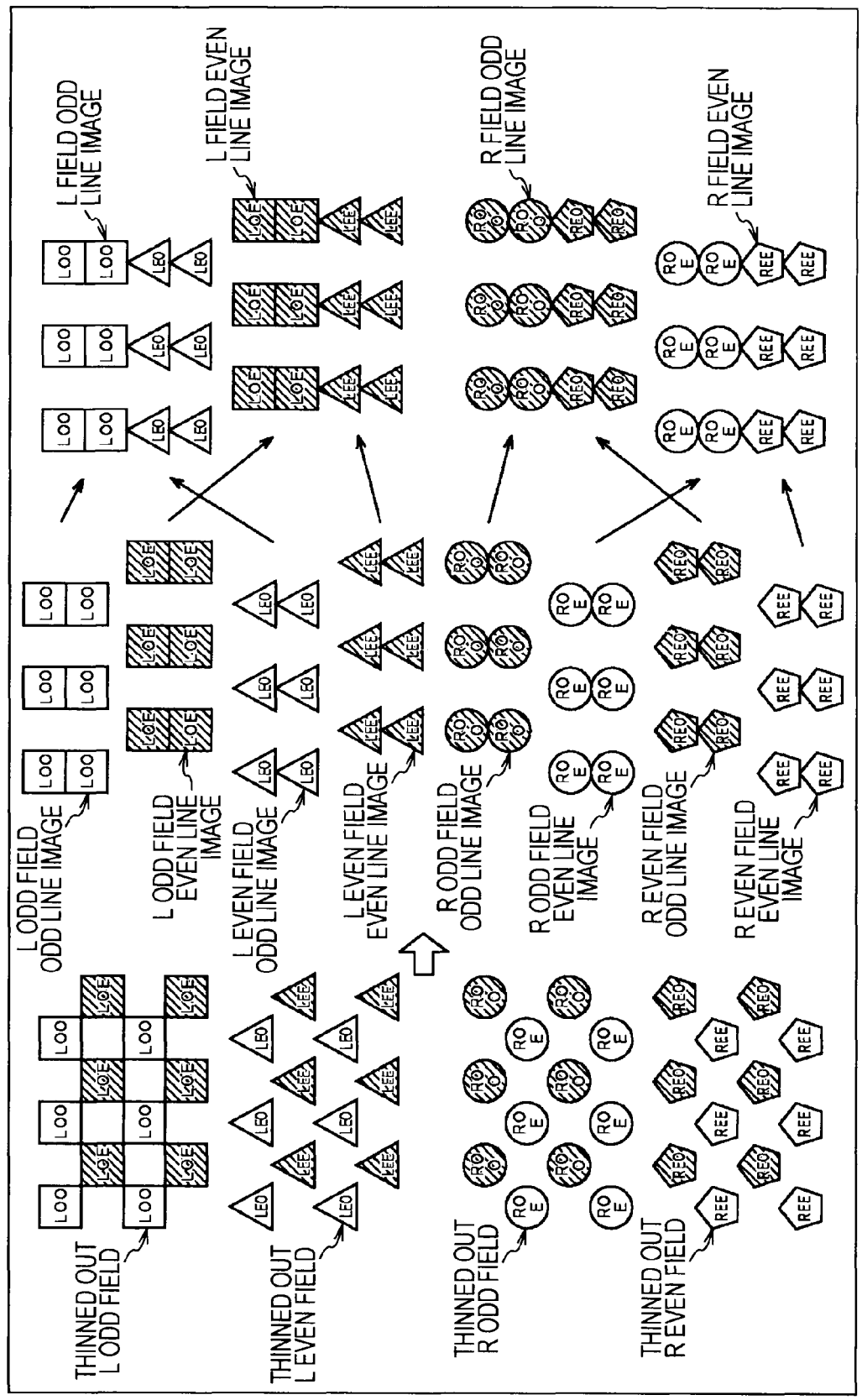
FIG. 27 is a diagram for describing pre-processing of a second format.

FIG. 27 is a diagram for describing pre-processing of the second method.

With the pre-processing of the second method, the pre-processing unit 123 collects only the thinned-out L-odd-field odd lines (LOO) to configure an L-odd field odd line image, and collects only the L-odd-field even lines (LOE) to configure an L-odd field even line image.

Also, the pre-processing unit 123 collects only the L-even-field odd lines (LEO) to configure an L-even field odd line image, and collects only the L-even-field even lines (LEE) to configure an L-even field even line image.

Also, the pre-processing unit 123 collects only the R-odd-field odd lines (ROO) to configure an R-odd field odd line image, and collects only the R-odd-field even lines (ROE) to configure an R-odd field even line image.

Also, the pre-processing unit 123 collects only the R-even-field odd lines (REO) to configure an R-even field odd line image, and collects only the R-even-field even lines (REE) to configure an R-even field even line image.

The pre-processing unit 123 then arrays the L-odd-field odd lines (LOO) and L-even-field odd lines (LEO) in the vertical direction to configure an L-field odd-line image in which are arrayed only the odd lines of the thinned-out L odd field and thinned-out L even field.

The pre-processing unit 123 further arrays the L-odd-field even lines (LOE) and L-even-field even lines (LEE) in the vertical direction to configure an L-field even-line image in which are arrayed only the even lines of the thinned-out L odd field and thinned-out L even field.

The pre-processing unit 123 then arrays the R-odd-field odd lines (ROO) and R-even-field odd lines (REO) in the vertical direction to configure an R-field odd-line image in which are arrayed only the odd lines of the thinned-out R odd field and thinned-out R even field.

The pre-processing unit 123 further arrays the R-odd-field even lines (ROE) and R-even-field even lines (REE) in the vertical direction to configure an R-field even-line image in which are arrayed only the even lines of the thinned-out R odd field and thinned-out R even field.

Thus, the pre-processing unit 123 configures an L-field odd-line image (first odd line field) in which are arrayed only the odd lines of the thinned-out L odd field and thinned-out L even field, an L-field even-line image (first even line field) in which are arrayed only the even lines of the thinned-out L odd field and thinned-out L even field, an R-field odd-line image (second odd line field) in which are arrayed only the odd lines of the thinned-out R odd field and thinned-out R even field, an R-field even-line image (second even line field) in which are arrayed only the even lines of the thinned-out R odd field and thinned-out R even field, and then configures the thinned-out L image and thinned-out R image using these L-field odd-line image, L-field even-line image, R-field odd-line image, and R-field even-line image.

Figure 28:
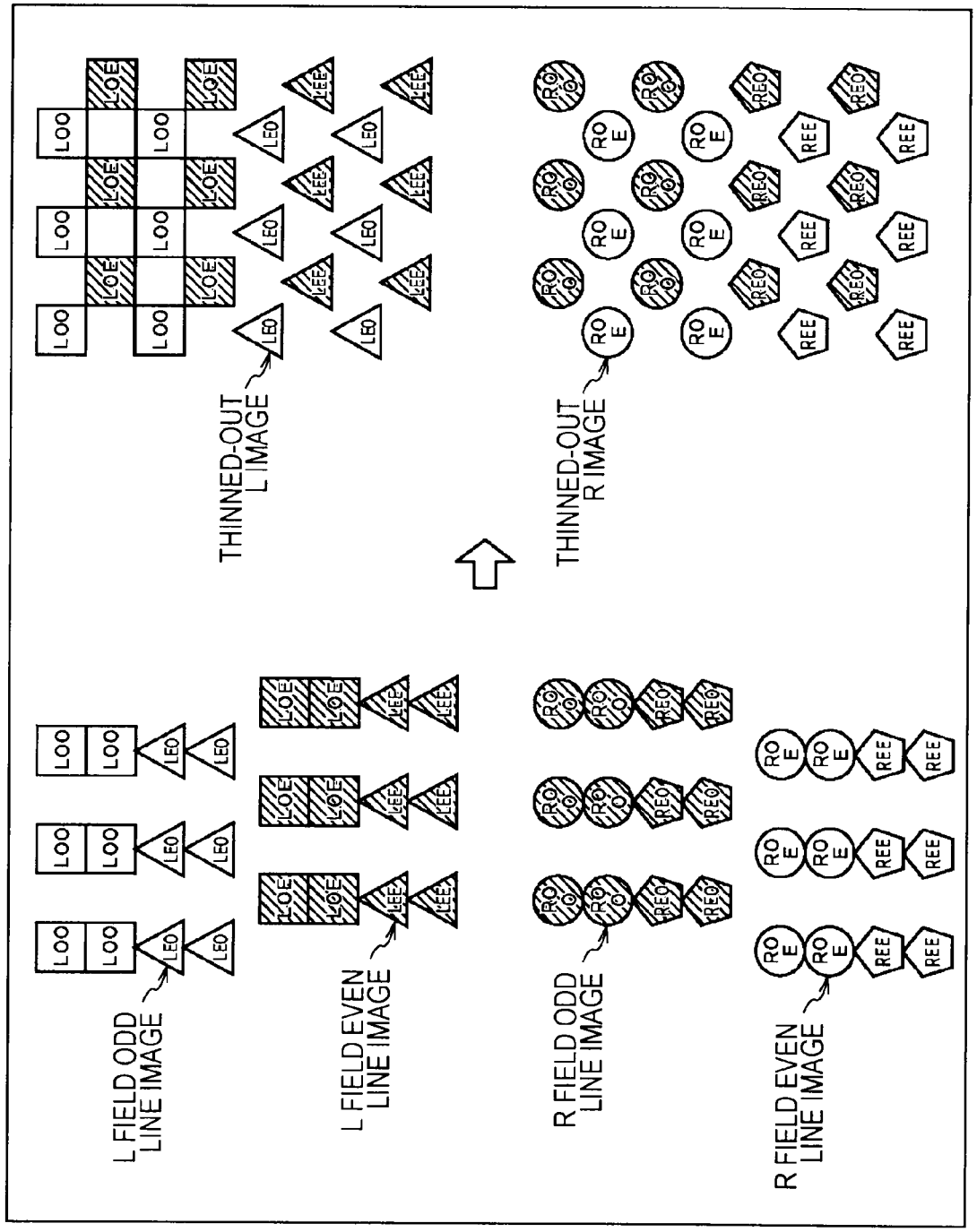
FIG. 28 is a diagram for describing a method for configuring a thinned out L image and thinned out R image using an L-field odd-line image and L-field even-line image, and an R-field odd-line image and R-field even-line image.

That is to say, FIG. 28 is a diagram for describing a method for configuring the thinned-out L image and thinned-out R image using the L-field odd-line image, L-field even-line image, R-field odd-line image, and R-field even-line image.

The pre-processing unit 123 configures a frame wherein the L-field odd-line image is the odd field and the L-field even-line image is the even field, thereby configuring the image in which the thinned-out L odd field and thinned-out L even field have been arrayed (FIG. 25) as (the frame of) the thinned-out L image.

Further, the pre-processing unit 123 configures a frame wherein the R-field odd-line image is the odd field and the R-field even-line image is the even field, thereby configuring the image in which the thinned-out R odd field and thinned-out R even field have been arrayed (FIG. 25) as (the frame of) the thinned-out R image.

Figure 29:
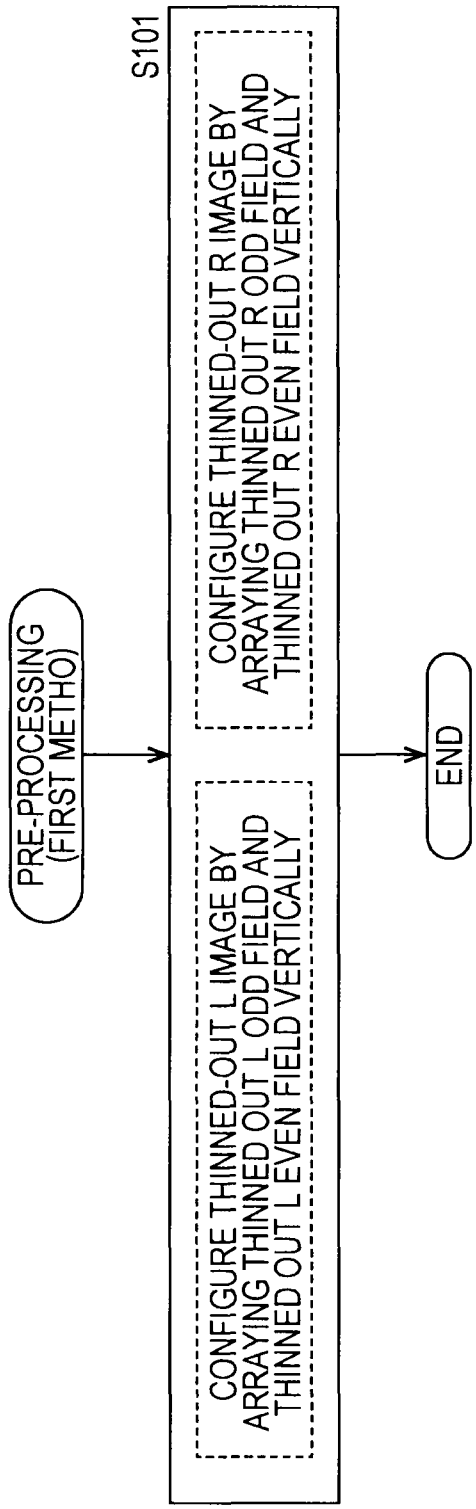
FIG. 29 is a flowchart for describing pre-processing of a first format.

FIG. 29 is a flowchart for describing pre-processing of the first method.

Upon being supplied from the thinning out unit 122 with the thinned-out L odd field and thinned-out L even field, and the thinned-out R odd field and thinned-out R even field, in step S101 the pre-processing unit 123 (FIG. 20) arrays the thinned-out L odd field and thinned-out L even field in the vertical direction, thereby configuring (the frame of) a thinned-out L image.

Also, in step S101, the pre-processing unit 123 arrays the thinned-out R odd field and thinned-out R even field from the thinning out unit 122 in the vertical direction, thereby configuring (the frame of) a thinned-out R image, as shown in FIG. 25.

The pre-processing unit 123 then supplies the thinned-out L image and thinned-out R image to the interleaved combining processing unit 124.

Figure 30:
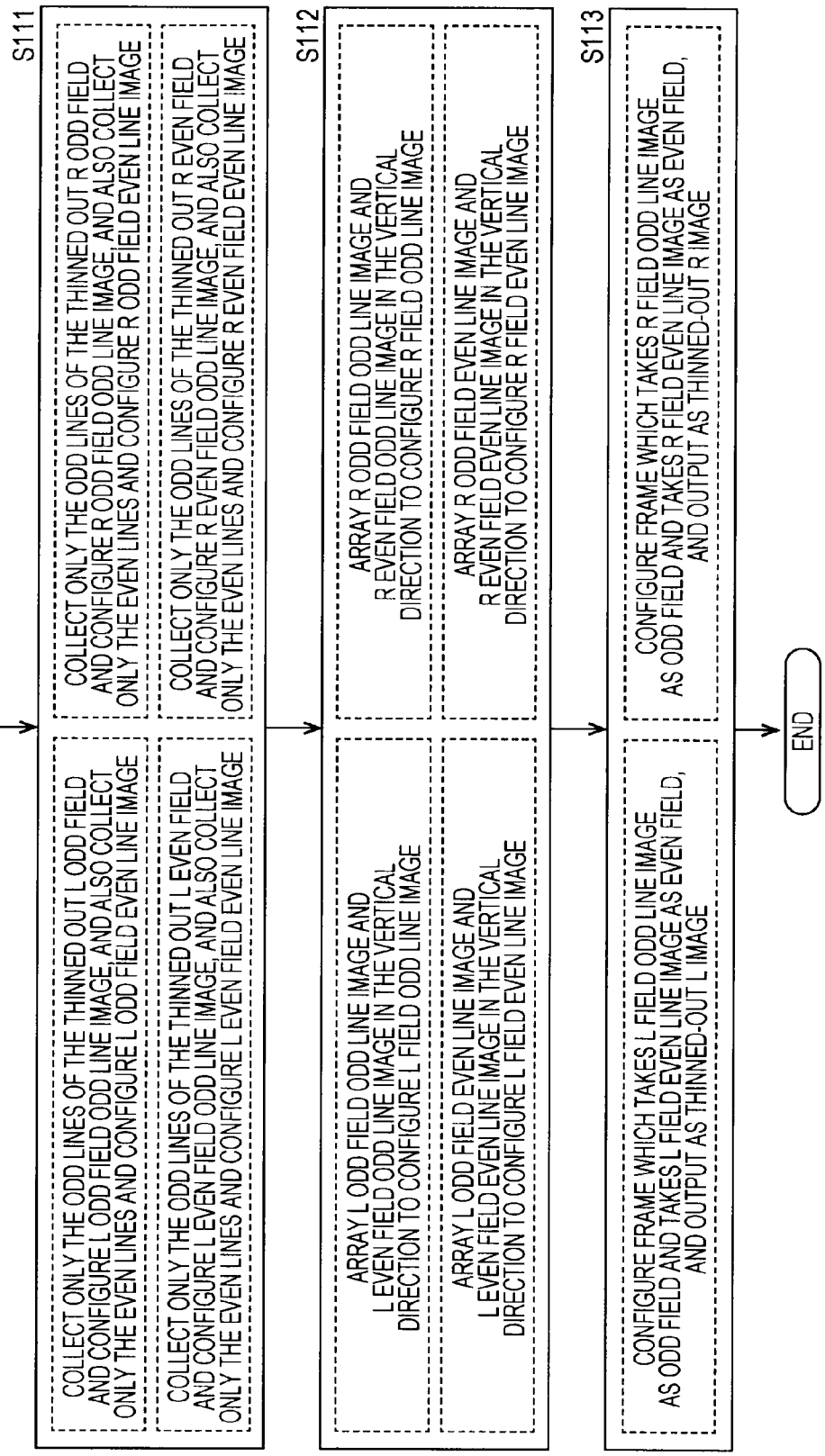
FIG. 30 is a flowchart for describing pre-processing of the second format.

FIG. 30 is a flowchart for describing pre-processing of the second method.

Upon being supplied from the thinning out unit 122 with the thinned-out L odd field and thinned-out L even field, and the thinned-out R odd field and thinned-out R even field, in step S111 the pre-processing unit 123 (FIG. 20) collects just the thinned-out L odd field odd lines (LOO) to configure the L-odd-field odd-line image (LOO), and also collects just the thinned-out L odd field even lines (LOE) to configure the L-odd-field even-line image (LOE), as shown in FIG. 27.

Further, the pre-processing unit 123 collects just the thinned-out L even field odd lines (LEO) to configure the L-even-field odd-line image (LEO), and also collects just the thinned-out L even field even lines (LEE) to configure the L-even-field even-line image (LEE), as shown in FIG. 27.

Also, the pre-processing unit 123 (FIG. 20) collects just the thinned-out R odd field odd lines (ROO) to configure the thinned-out R-odd-field odd-line image (ROO), and also collects just the thinned-out R odd field even lines (ROE) to configure the R-odd-field even-line image (ROE), as shown in FIG. 27.

Further, the pre-processing unit 123 collects just the thinned-out R even field odd lines (REO) to configure the R-even-field odd-line image (REO), and also collects just the thinned-out R even field even lines (REE) to configure the R-even-field even-line image (REE), as shown in FIG. 27, and the processing advances from step S111 to step S112.

In step S112, as shown in FIG. 27, the pre-processing unit 123 configures an L-field odd-line image by arraying the L-odd-field odd lines (LOO) and L-even-field odd lines (LEO) in the vertical direction.

Further, as shown in FIG. 27, the pre-processing unit 123 configures an L-field even-line image by arraying the L-odd-field even lines (LOE) and L-even-field even lines (LEE) in the vertical direction.

Also, as shown in FIG. 27, the pre-processing unit 123 configures an R-field odd-line image by arraying the R-odd-field odd lines (ROO) and R-even-field odd lines (REO) in the vertical direction.

Further, as shown in FIG. 27, the pre-processing unit 123 configures an R-field even-line image by arraying the R-odd-field even lines (ROE) and R-even-field even lines (REE) in the vertical direction, and the flow advances from step S112 to S113.

In step S113, as shown in FIG. 28, the pre-processing unit 123 configures a frame with the L-field odd-line image as the odd field and with the L-field even-line image as the even field, thereby configuring an image (FIG. 25) where the thinned-out L odd field and thinned-out L even field are arrayed, as the frame of the thinned-out L image.

Further, as shown in FIG. 28, the pre-processing unit 123 configures a frame with the R-field odd-line image as the odd field and with the R-field even-line image as the even field, thereby configuring an image (FIG. 25) where the thinned-out R odd field and thinned-out R even field are arrayed, as the frame of the thinned-out R image.

The pre-processing unit 123 then supplies the thinned-out L image and the thinned-out R image to the interleaved combining processing unit 124 (FIG. 20).

[Another Embodiment of Decoding Device]

Figure 31:
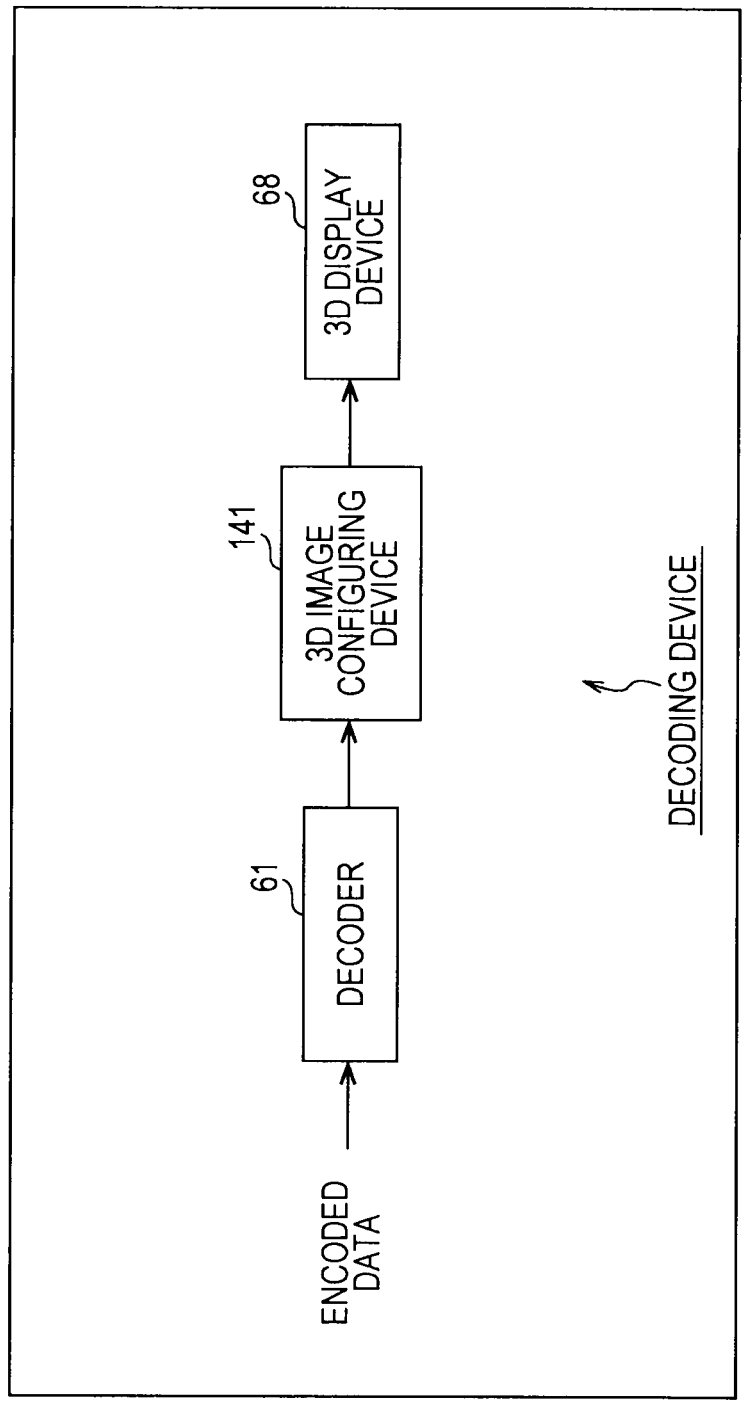
FIG. 31 is a block diagram illustrating a configuration example of another embodiment of a decoding device to which the present invention has been applied.

FIG. 31 is a block diagram illustrating a configuration example of another embodiment of a decoding device to which the image processing device according to the present invention has been applied.

In FIG. 31, the portions corresponding to the decoding device in FIG. 16 are denoted with the same reference numerals, and hereinafter the description thereof will be omitted as appropriate.

That is to say, the decoding device in FIG. 31 has in common with the case in FIG. 16 the point of having the decoder 61 and 3D display device 68.

However, the decoding device in FIG. 31 differs from the case in FIG. 16 with regard to the point of having a 3D image configuring device 141 instead of the separating unit 62, inverse vertical processing unit 63, inverse horizontal processing unit 64, interpolating unit 65, filter unit 66, and 3D format converting unit 67.

Encoded data which the encoding device in FIG. 18 outputs is supplied to the decoder 61 of the decoding device, with the decoder 61 decoding the encoded data into a combined image, which is output to the 3D image configuring device 141.

The 3D image configuring device 141 configures a 3D image made up of an L image and R image, from the combined image from the decoder 61, and supplies this to the 3D display device 68.

[Configuration Example of 3D Image Configuring Device 141]

Figure 32:
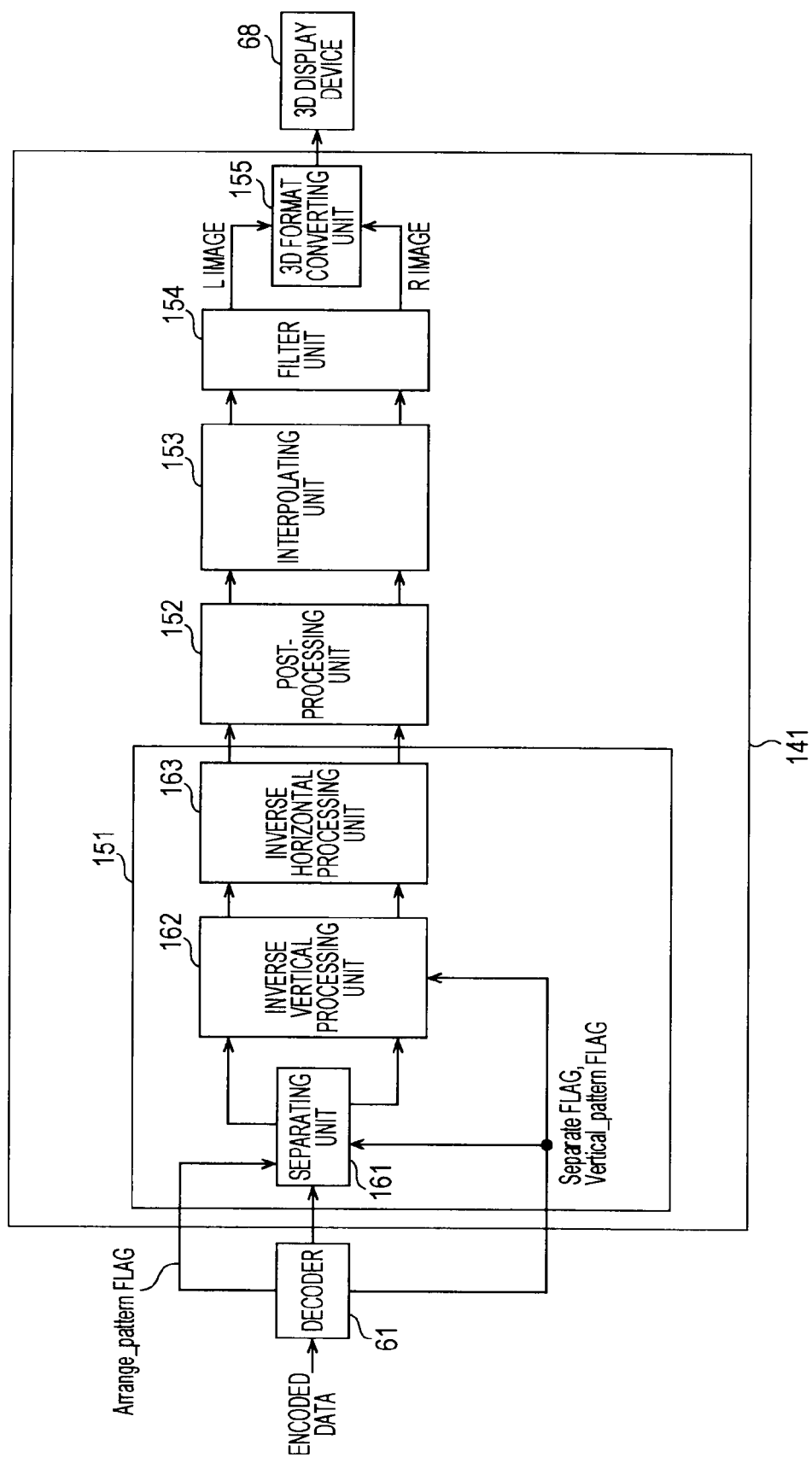
FIG. 32 is a block diagram illustrating a configuration example of a 3D image configuration device 141.

FIG. 32 is a block diagram illustrating a configuration example of the 3D image configuring device 141.

The 3D image configuring device 141 includes a separating unit 151, a post-processing unit 152, a interpolating unit 153, a filter unit 154, and a 3D format converting unit 155.

The separating unit 151 includes a separating unit 161, an inverse orthogonal processing unit 162, and inverse estimation processing unit 163, and separates the combined image from the decoder 61 that is obtained by the interleaved combining processing of the interleaved combining processing unit 124 in FIG. 20 into a thinned-out L image and thinned-out R image.

That is to say, the decoder 61 extracts the separate flag, vertical pattern flag, and arrange pattern flag included in the encoded data supplied thereto, and supplies this to the separating unit 161.

Also, the decoder 61 supplies the separate flag and vertical pattern flag to the inverse vertical processing unit 162.

Also, the decoder 61 decodes the encoded data with the same format as the format of encoding with the encoder 34 (FIG. 19), and supplies the combined image obtained as a result thereof, i.e., the combined image obtained by the interleaved combining processing of the interleaved combining processing unit 124 in FIG. 20, to the separating unit 161.

In the same as with the separating unit 62 in FIG. 16, the separating unit 161 performs separating processing for separating the combined image from the decoder 61 into multiple post-vertical processing images following the separate flag, vertical pattern flag, and arrange pattern flag, and supplies the multiple post-vertical processing images obtained as a result thereof to the inverse vertical processing unit 162.

In the same way as with the inverse vertical processing unit 63 in FIG. 16, the inverse vertical processing unit 162 performs inverse vertical processing to return the multiple post-vertical processing images into the post-horizontal-processing L image and post-horizontal-processing R image, and supplies the post-horizontal-processing L image and post-horizontal-processing R image obtained as a result thereof to the inverse horizontal processing unit 163.

Now, as described above, the separate flag and vertical pattern flag included in the encoded data from the encoding device in FIG. 19 represent line separation and interleaved array respectively, and the combined image is an image wherein two images of the post-vertical-processing odd line image and post-vertical-processing even line image serving as the multiple post-vertical processing images are arrayed in the horizontal direction, as described with FIG. 26.

In this case, the separating unit 161 follows the separate flag and vertical pattern flag supplied from the decoder 61 to separate the post-vertical-processing odd line image and post-vertical-processing even line image arrayed as shown in FIG. 26 out of the combined image from the decoder 61, which are supplied to the inverse vertical processing unit 162.

The inverse vertical processing unit 162 synthesizes a part of the lines of the post-vertical-processing odd line image and post-vertical-processing even line image from the separating unit 161 to decode a post-horizontal-processing L image, and also decodes the remaining lines of the post-vertical-processing odd line image and post-vertical-processing even line image from the separating unit 161 to decode a post-horizontal-processing R image.

That is to say, as described with FIG. 26, the post-vertical-processing odd line image is an image where the odd lines of the post-horizontal-processing L image (LOO and LEO) and the off lines of the post-horizontal-processing R image (ROO and REO) are arrayed in an interleaved manner.

In the same way, the post-vertical-processing even line image is an image where the even lines of the post-horizontal-processing L image (LOE and LEE) and the even lines of the post-horizontal-processing R image (ROE and REE) are arrayed in an interleaved manner.

The inverse vertical processing unit 162 extracts, from the post-vertical-processing odd line image and post-vertical-processing even line image from the separating unit 161, the odd lines (LOO and LEO) and even lines (LOE and LEE) from the post-horizontal-processing L image, respectively, and returns the odd lines (LOO and LEO) and even lines (LOE and LEE) to their original positions, thereby decoding (the frame of) the post-horizontal-processing L image.

Further, the inverse vertical processing unit 162 extracts, from the post-vertical-processing odd line image and post-vertical-processing even line image from the separating unit 161, the odd lines (ROO and REO) and even lines (ROE and REE) from the post-horizontal-processing R image, respectively, and returns the odd lines (ROO and REO) and even lines (ROE and REE) to their original positions, thereby decoding (the frame of) the post-horizontal-processing R image.

In the same way as with the inverse horizontal processing unit 64 in FIG. 16, the inverse horizontal processing unit 163 performs inverse horizontal processing to return the post-horizontal-processing L image and post-horizontal-processing R image from the inverse vertical processing unit 162 to the thinned-out L image and thinned-out R image, and supplies the thinned-out L image and thinned-out R image obtained as a result thereof to the post-processing unit 152.

Now, the separation processing inverse vertical processing, and inverse horizontal processing performed at the separating unit 161, inverse vertical processing unit 162, and inverse horizontal processing unit 163, as described above, in the event that the separate flag and vertical pattern flag indicate line separation and interleaved array, respectively, will hereinafter also be referred to as interleave separating processing.

As described with FIG. 25, (the frame of) the thinned-out L image obtained as the result of the interleave separating processing at (the separating unit 161, inverse vertical processing unit 162, and inverse horizontal processing unit 163) of the separating unit 151 is an image where the thinned-out L odd field is situated at the upper side and the thinned-out L even field is situated at the lower side.

Also, (the frame of) the thinned-out R image obtained as the result of the interleave separating processing is an image where the thinned-out R odd field is situated at the upper side and the thinned-out R even field is situated at the lower side.

The post-processing unit 152 performs processing of returning (the frame of) the thinned-out L image from (the inverse horizontal processing unit 163 of) the separating unit 151 into the thinned-out L odd field and thinned-out L even field, and performs processing of returning (the frame of) the thinned-out R image from the separating unit 151 into the thinned-out R odd field and thinned-out R even field.

Note that as for the post-processing which the post-processing unit 152 performs, there are post-processing of the first method which is inverse processing, so as to say, of the pre-processing of the first method, and post-processing of the second method which is inverse processing of the pre-processing of the second method.

The post-processing unit 152 supplies the thinned-out L odd field and thinned-out L even field, and thinned-out R odd field and thinned-out R even field, obtained by post processing, to the interpolating unit 153.

The interpolating unit 153 performs compensation of the pixels thinned out by the thinning out unit 122 in FIG. 20 for each of the thinned-out L odd field and thinned-out L even field, and thinned-out R odd field and thinned-out R even field, from the post-processing unit 152, and supplies the images obtained as a result thereof to the filter unit 154, as an interpolated L odd field and interpolated L even field, and interpolated R odd field and interpolated R even field.

As with the filter unit 66 in FIG. 16, the filter unit 154 performs filtering of each of the an interpolated L odd field and interpolated L even field, and interpolated R odd field and interpolated R even field, thereby decoding the L odd field and L even field, and R odd field and R even field (FIG. 22).

The filter unit 154 then supplies, to the 3D format converting unit 155, an interlace format L image of which the L odd field and L even field are the odd field and even field respectively, and an interlace format R image of which the R odd field and R even field are the odd field and even field respectively.

In the same way as with the 3D format converting unit 67 in FIG. 16, the 3D format converting unit 155 converts (the image data of) the L image and R image from the filter unit 154 into signals of a format for the downstream 3D display device 68 to display 3D images, and supplies to the 3D display device 68.

[Post Processing]

Figure 33:
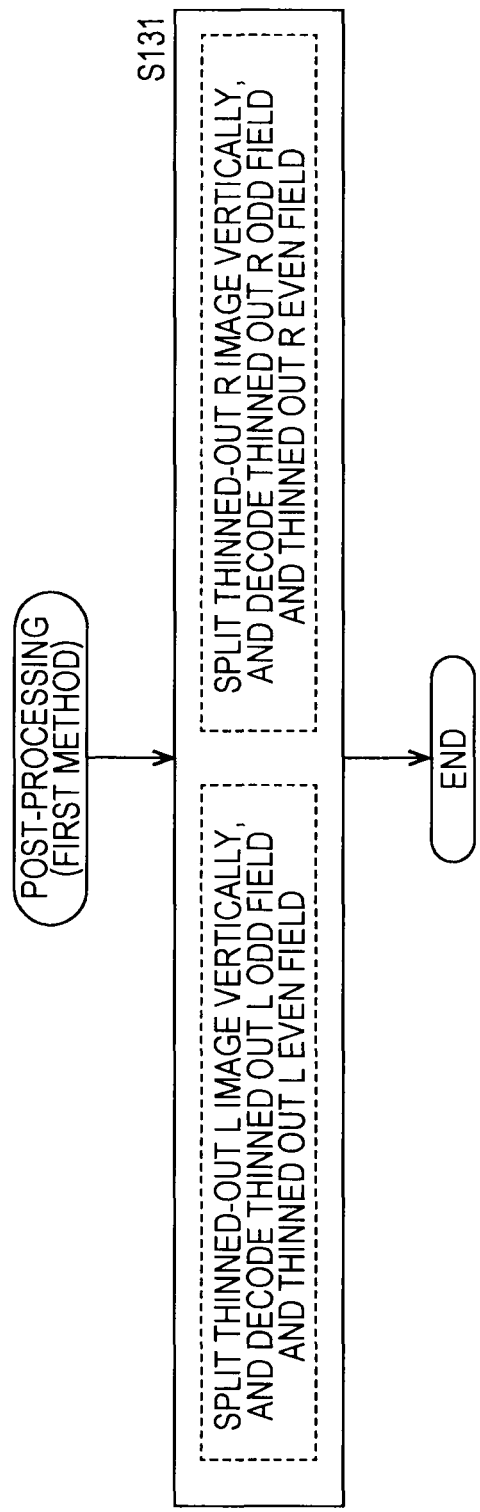
FIG. 33 is a flowchart for describing post-processing of a first format.

FIG. 33 is a flowchart for describing the post-processing of the first method.

Upon being supplied with (the frame of) the thinned-out L image where the thinned-out L odd field and thinned-out L even field are arrayed in the vertical direction, and the thinned-out R image where the thinned-out R odd field and thinned-out R even field are arrayed in the vertical direction, as shown in FIG. 25, from (the inverse horizontal processing unit 163 of) the separating unit 151, in step S131 the post-processing unit 152 splits (separates) the thinned-out L image from the separating unit 151 in the vertical direction, and decodes the thinned-out L odd field and thinned-out L even field.

Further, the post-processing unit 152 splits the thinned-out R image from the separating unit 151 in the vertical direction, and decodes the thinned-out R odd field and thinned-out R even field.

The post-processing unit 152 then supplies the thinned-out L odd field and thinned-out L even field, and thinned-out R odd field and thinned-out R even field, to the interpolating unit 153.

Figure 34:
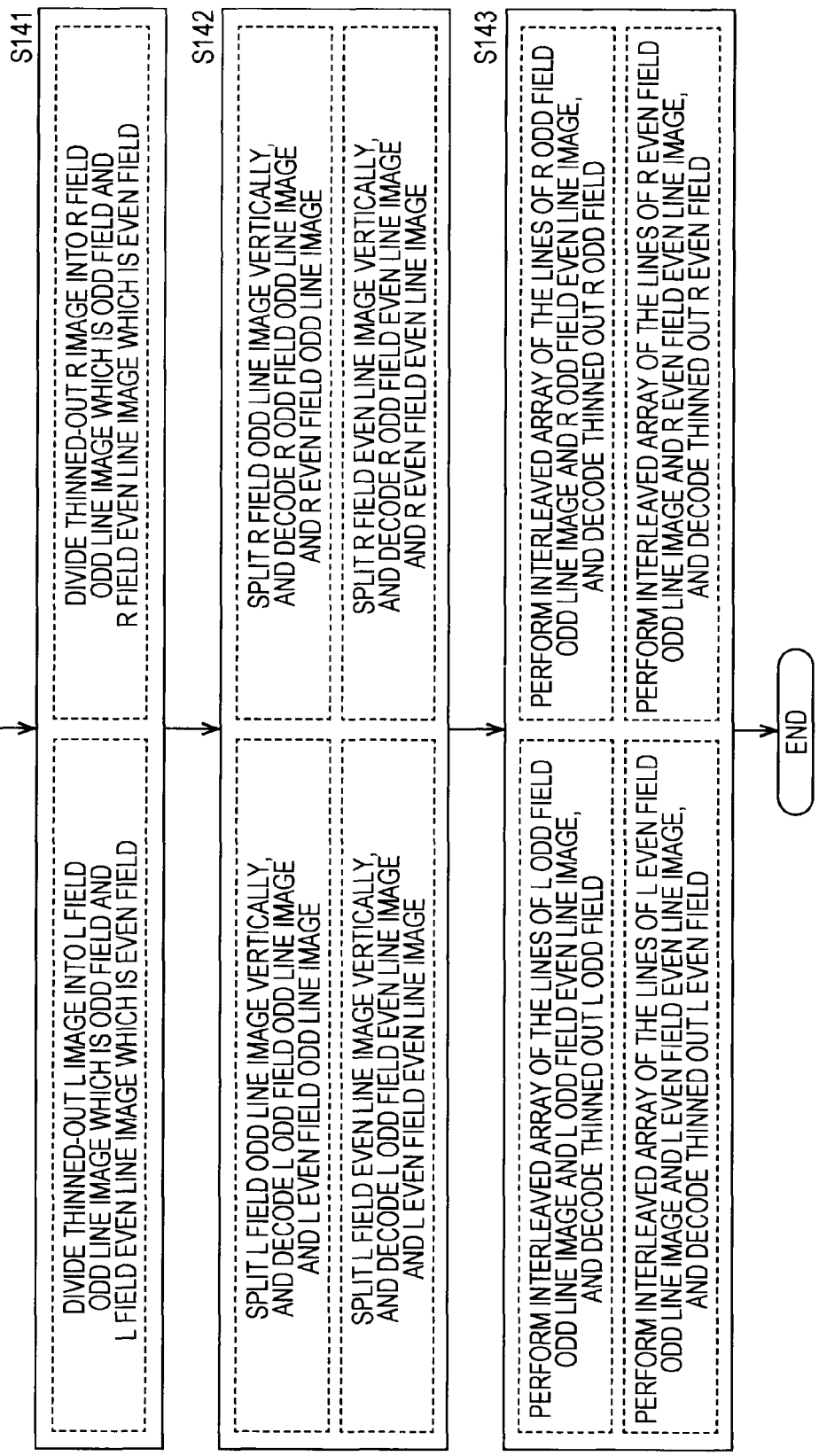
FIG. 34 is a flowchart for describing post-processing of a second format.

FIG. 34 is a flowchart for describing post-processing according to the second method.

Upon being supplied with (the frame of) the thinned-out L image where the thinned-out L odd field and thinned-out L even field are arrayed in the vertical direction, and the thinned-out R image where the thinned-out R odd field and thinned-out R even field are arrayed in the vertical direction, as shown in FIG. 25, from the separating unit 151, in step S141 the post-processing unit 152 separates the thinned-out L image from the separating unit 151 into an L-field odd-line image which is an odd field, and an L-field even-line image which is an even field.

Further, the post-processing unit 152 separates the thinned-out R image from the separating unit 151 into the R-field odd-line image which is an odd field, and R-field even-line image which is an even field, shown in FIG. 28.

The processing then sequentially advances from step S141 to step S142 and on, where the post-processing unit 152 returns the L-field odd-line image (first odd line field) and L-field even-line image (first even line field) into the thinned-out L odd field (first thinned-out odd field) and thinned-out L even field (first thinned-out even field), and also returns the R-field odd-line image (second odd line field) and R-field even-line image (second even line field) into the thinned-out R odd field (second thinned-out odd field) and thinned-out R even field (second thinned-out even field).

That is to say, in step S142, from the L-field odd-line image, L-field even-line image, R-field odd-line image, and R-field even-line image, the post-processing unit 152 decodes the L-odd-field odd-line image, L-odd-field even-line image, L-even-field odd-line image, L-even-field even-line image, R-odd-field odd-line image, R-odd-field even-line image, R-even-field odd-line image, and R-even-field even-line image in FIG. 27.

As described with FIG. 28, the L-field odd-line image is an image of the L-odd-field odd-line image (LOO) and L-even-field odd-line image (LEO) arrayed vertically, the L-field even-line image of the L-odd-field even-line image (LOE) and L-even-field even-line image (LEE), the R-field odd-line image of the R-odd-field odd-line image (ROO) and R-even-field odd-line image (REO), and the R-field even-line image of the R-odd-field even-line image (ROE) and R-even-field even-line image (REE), respectively.

Accordingly, the post-processing unit 152 vertically splits the L-field odd-line image and decodes the L-odd-field odd-line image (LOO) and L-even-field odd-line image (LEO), and also vertically splits the L-field even-line image and decodes the L-odd-field even-line image (LOE) and L-even-field even-line image (LEE).

Further, the post-processing unit 152 vertically splits the R-field odd-line image and decodes the R-odd-field odd-line image (ROO) and R-even-field odd-line image (REO), and also vertically splits the R-field even-line image and decodes the R-odd-field even-line image (ROE) and R-even-field even-line image (REE).

Subsequently, the processing advances from step S142 to step S143, and the post-processing unit 152 arrays the lines (horizontal lines) of the L-odd-field odd-line image (LOO) and L-odd-field even-line image (LOE) in an interleaved manner, and decodes the thinned-out L odd field in FIG. 27.

Further, the post-processing unit 152 arrays the lines of the L-even-field odd-line image (LEO) and L-even-field even-line image (LEE) in an interleaved manner, and decodes the thinned-out L even field in FIG. 27.

Also, the post-processing unit 152 arrays the lines of the R-odd-field odd-line image (ROO) and R-even-field odd lines (REO) in an interleaved manner, and decodes the thinned-out R odd field in FIG. 27.

Further, the post-processing unit 152 arrays the lines of the R-odd-field even lines (ROE) and R-even-field even-line image (REE) in an interleaved manner, and decodes the thinned-out R even field in FIG. 27.

The post-processing unit 152 then supplies the thinned-out L odd field and thinned-out L even field, and thinned-out R odd field and thinned-out R even field to the interpolating unit 153.

As described above, in the event that the L image and R image are interlace format images, at the encoding device (FIG. 20) the pixels of the L-image odd field (L odd field) and even field (L even field) and R-image odd field (R odd field) and even field (R even field) are thinned out, then subjected to pre-processing, following which interleave combining processing is performed, and also, at the decoding device (FIG. 32), post-processing is performed following interleave dividing processing, following which interpolation is performed of the L odd field (thinned-out L odd field), L even field (thinned-out L even field), R odd field (thinned-out R odd field), and R even field (thinned-out R even field), of which pixels have been thinned out, thereby realizing high encoding efficiency of interlace format 3D images while preventing deterioration in spatial resolution.

[Description of Computer Applying Present Invention]

The above-described series of processing can be performed by hardware, or performed by software. In the event of performing the series of processing by software, a program making up the software is installed in a general-purpose computer or the like.

Figure 35:
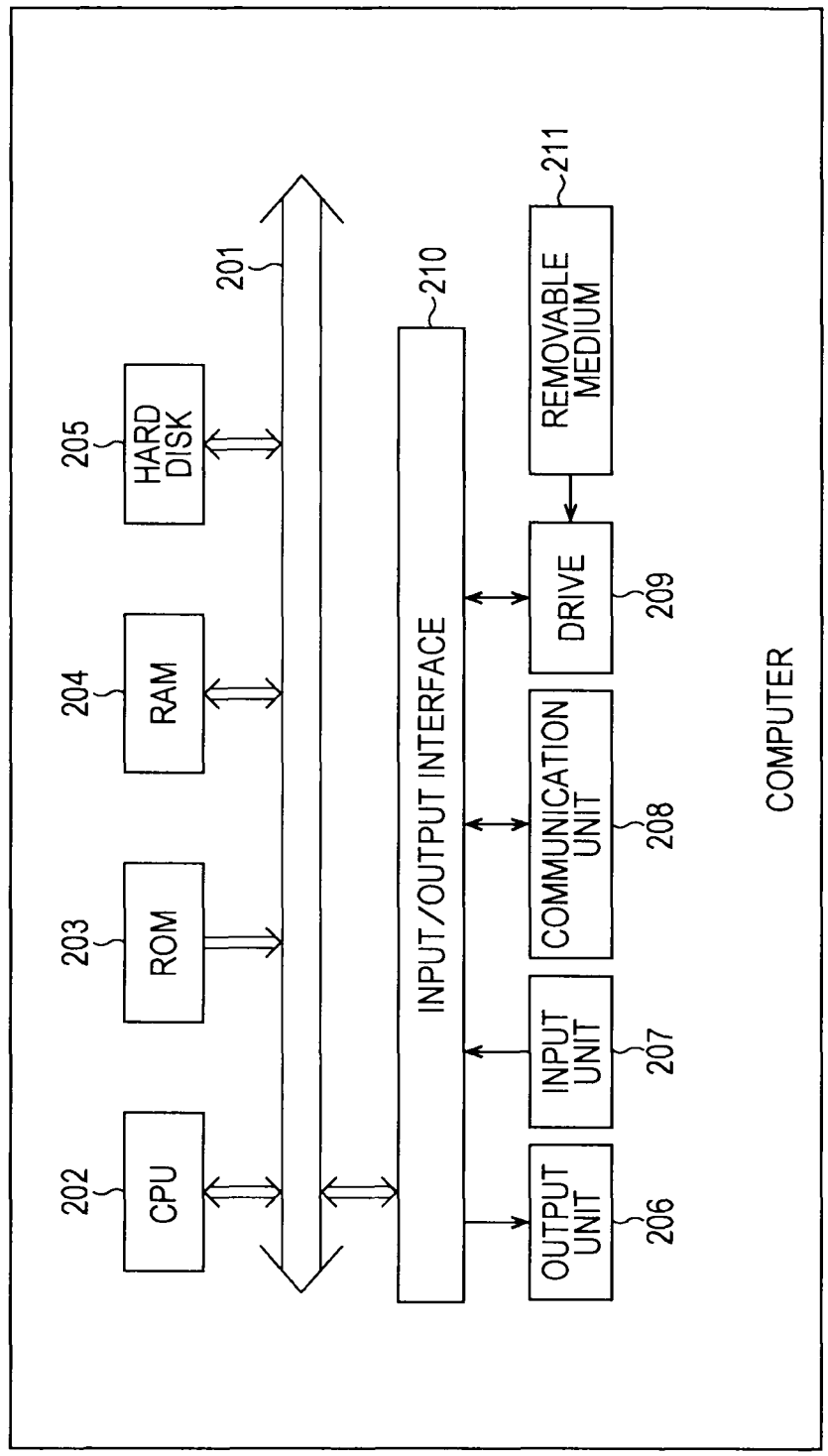
FIG. 35 is a block diagram illustrating a configuration example of a computer to which the present invention has been applied.

Now, FIG. 35 is a block diagram illustrating a configuration example of an embodiment of a computer into which the program which executes the above-described series of processing using the program has been installed.

The program can be stored in a hard disk 205 or ROM 203 as recording media built into the computer, beforehand.

Alternatively, the program may be stored (recorded) in a removable storage medium 211. Such a removable storage medium 211 can be provided as so-called packaged software. Examples of the removable storage medium 211 include flexible disks, CD-ROM (Compact Disc Read Only Memory), MO (Magneto Optical) discs, DVD (Digital Versatile Disc), magnetic disks, semiconductor memory, and so forth.

Note that besides being installed to a computer from a removable recording medium 211 as described above, the program may be downloaded to the computer via a communication network or broadcast network, and installed to an internal hard disk 205. That is to say, the program can be wirelessly transferred from a download site to the computer via a satellite for digital satellite broadcasting, transferred to the computer via a network such as a LAN (Local Area Network) or the Internet, or the like.

The computer has built in a CPU (Central Processing Unit) 202, with an input/output interface 210 connected to the CPU 202 via a bus 201.

Upon a command being input to the CPU 202 by the user operating an input unit 207 or the like, a program stored in ROM (Read Only Memory) 203 is executed in accordance therewith. Alternatively, the CPU 202 loads the program stored in the hard disk 205 to RAM (Random Access Memory) 204 to be executed.

Accordingly, the CPU 202 performs processing following the above-described flowcharts, or processing performed by the configurations in the above-described block diagrams. The CPU 202 then takes the processing thereof results thereof, and as necessary, for example, outputs from an output unit 206 via an input/output interface 210, or transmits from a communication unit 208, or further stores in the hard disk 205 or the like.

Note that the input unit 207 is configured of a keyboard, mouse, microphone, or the like. Also, the output unit 206 is configured of an LCD (Liquid Crystal Display), speaker, or the like.

Now, with the Present Specification, the processing which the computer performs following the program does not necessarily have to be performed in time sequence following the order described as flowcharts. That is to say, the processing which the computer performs following the program includes processing executed in parallel or individually (e.g., parallel processing or processing by object).

Also, the program may be processed by one computer (processor) or may be processed in a dispersed manner among multiple computers. Further, the program may be transferred to a remote computer and executed.

Also, the embodiments of the present invention are not restricted to the above-mentioned embodiments, and various modifications may be made without departing from the essence of the present invention.

REFERENCE SIGNS LIST

11 filter unit
11L, 11R filters
12, 12L, 12R thinning out units
13 combining unit
14 encoder
21 decoder
22 3D display device
31, 31L, 31R horizontal processing unit
32 vertical processing unit
32L, 32R separating unit
33 combining unit
34 encoder
35 control unit
41 A/D converting unit
42 screen rearranging buffer
43 computing unit
44 orthogonal transform unit
45 quantization unit
46 lossless encoding unit
47 storage buffer
48 rate control unit
49 inverse quantization unit
50 inverse orthogonal transform unit
51 computing unit
52 deblocking filter
53 frame memory
54 intra prediction unit
55 motion-prediction/motion/compensation unit
61 decoder
62 separating unit
63 inverse vertical processing unit
63L, 63R synthesizing units
64, 64L, 64R inverse horizontal processing units
65, 65L, 65R interpolating units
66 filter unit
66L, 66R filters
67 3D format converting unit
68 3D display device
71 storage buffer
72 lossless decoding unit
73 inverse quantization unit
74 inverse orthogonal transform unit
75 computing unit
76 deblocking filter
77 frame memory 78 intra prediction unit
79 motion-prediction/motion-compensation unit
80 image rearranging buffer
81 D/A converting unit
101L, 101R imaging apparatuses
102 synthesizing unit
121 filter unit
122 thinning out unit
123 pre-processing unit
124 interleaved combining processing unit
125 control unit
131 horizontal processing unit
132 vertical processing unit
133 combining unit
141 3D image configuring device
151 separating unit
152 post-processing unit
153 interpolating unit
154 filter unit
155 3D format converting unit
161 separating unit
162 inverse vertical processing unit
163 inverse horizontal processing unit
201 bus
202 CPU
203 ROM
204 RAM
205 hard disk
206 output unit
207 input unit
208 communication unit
209 drive
210 input/output interface
211 removable recording medium

The invention claimed is:

1. An image processing device comprising:
horizontal processing circuitry configured to take, as an object of processing, a first thinned-out image obtained by thinning out pixels of a first image in an oblique direction, and a second thinned-out image obtained by thinning out pixels of a second image which differs from the first image in an oblique direction, and perform horizontal packing in which, as horizontal processing for manipulating the array of pixels in the horizontal direction, pixels of said first thinned-out image and pixels of said second thinned-out image are packed in the horizontal direction;
combining circuitry configured to generate, as an encoding object image to serve as the object of prediction encoding, a combined image in which said first thinned-out image and said second thinned-out image subjected to horizontal packing by said horizontal processing are arrayed adjacently; and
vertical processing circuitry configured to take, as an object of processing, of said first thinned-out image and said second thinned-out image subjected to horizontal packing by said horizontal processing circuitry, separate odd lines and even lines from said first thinned-out image and said second thinned-out image subjected to horizontal packing by said horizontal processing circuitry, and generate post-vertical processing images including an image in which only said odd lines are arrayed and an image in which only said even lines are arrayed, as vertical processing to manipulate the vertical direction array of the pixels;
wherein said combining circuitry generates said combined image by adjacently arraying said post-vertical processing images.

2. The image processing device according to claim 1, further comprising:
encoding circuitry configured to generate encoded data by performing prediction encoding on the combined image generated by said combining circuitry;
flag generating circuitry configured to generate a separate flag which indicates whether or not odd lines and even lines are separated from the first thinned-out image and second thinned-out image subjected to horizontal packing by said horizontal processing circuitry; and
transmission circuitry configured to transmit the encoded data generated by said encoding circuitry and the separate flag generated by said flag generating circuitry.

3. The image processing device according to claim 1, wherein said vertical processing circuitry generates, as said post-vertical processing images,
a first odd image in which are arrayed only odd lines of the first thinned-out image subjected to horizontal packing by said horizontal processing circuitry,
a first even image in which are arrayed only even lines of the first thinned-out image subjected to horizontal packing by said horizontal processing circuitry,
a second odd image in which are arrayed only odd lines of the second thinned-out image subjected to horizontal packing by said horizontal processing circuitry, and
a second even image in which are arrayed only even lines of the second thinned-out image subjected to horizontal packing by said horizontal processing circuitry.

4. The image processing device according to claim 3, further comprising:
encoding circuitry configured to generate encoded data by performing prediction encoding on the combined image generated by said combining circuitry;
flag generating circuitry configured to generate an arrange pattern flag indicating an array pattern of said first odd image and said first even image and said second odd image and said second even image; and
transmission circuitry configured to transmit the encoded data generated by said encoding circuitry and the arrange pattern flag generated by said flag generating circuitry.

5. The image processing device according to claim 1, wherein said vertical processing circuitry generates, as said post-vertical processing images,
a post-vertical-processing odd line image, in which the odd lines of the first thinned out image and the odd lines of the second thinned out image, subjected to horizontal packing by said horizontal processing circuitry, are arrayed in an interleaved manner, and
a post-vertical-processing odd line image, in which the even lines of the first thinned out image and the even lines of the second thinned out image, subjected to horizontal packing by said horizontal processing circuitry, are arrayed in an interleaved manner.

6. The image processing device according to claim 5, wherein said first image and said second image are interlace format images; said image processing device further comprising:
pre-processing circuitry configured to
configure an image, in which are adjacently arrayed a first thinned out odd field obtained by thinning out pixels of the odd field configuring a frame of said first image in an oblique direction, and a first thinned out even field obtained by thinning out pixels of the even field configuring the frame of said first image in an oblique direction, and output as said first thinned-out image, and configure an image, in which are adjacently arrayed a second thinned out odd field obtained by thinning out pixels of the odd field configuring a frame of said second image in an oblique direction, and a second thinned out even field obtained by thinning out pixels of the even field configuring the frame of said second image in an oblique direction, and output as said second thinned-out image.

7. The image processing device according to claim 6, wherein said pre-processing circuitry configure:

a first odd line field in which are arrayed only odd lines of said first thinned-out odd field and odd lines of said first thinned-out even field, a first even line field in which are arrayed only even lines of said first thinned-out odd field and even lines of said first thinned-out even field, a second odd line field in which are arrayed only odd lines of said second thinned-out odd field and odd lines of said second thinned-out even field, and a second even line field in which are arrayed only even lines of said second thinned-out odd field and even lines of said second thinned-out even field;

an image in which said first thinned-out odd field and said first thinned-out even field are adjacently arrayed, by configuring a frame in which said first odd line field is taken as an odd field and in which said first even line field is taken as an even field; and an image in which said second thinned-out odd field and said second thinned-out even field are adjacently arrayed, by configuring a frame in which said second odd line field is taken as an odd field and in which said second even line field is taken as an even field.

8. The image processing device according to claim 1, wherein said vertical processing circuitry generate, as said post-vertical processing image, the four images of an image in which are arrayed only odd lines of the first thinned-out image subjected to horizontal packing by said horizontal processing circuitry, an image in which are arrayed only even lines of the first thinned-out image subjected to horizontal packing by said horizontal processing circuitry, an image in which are arrayed only odd lines of the second thinned-out image subjected to horizontal packing by said horizontal processing circuitry, and an image in which are arrayed only even lines of the second thinned-out image subjected to horizontal packing by said horizontal processing circuitry, or the two images of a post-vertical-processing odd line image in which are arrayed, in an interleaved manner, odd lines of the first thinned-out image and odd lines of the second thinned-out image subjected to horizontal packing by said horizontal processing circuitry, and a post-vertical-processing even line image in which are arrayed, in an interleaved manner, even lines of the first thinned-out image and even lines of the second thinned-out image subjected to horizontal packing by said horizontal processing circuitry;

said image processing device further comprising:

encoding circuitry configured to perform prediction encoding of said combined image and generate encoded data;

flag generating circuitry configured to generate a vertical pattern flag indicating, in a post-vertical processing image generated by said vertical processing circuitry, the array of odd lines of the first thinned-out image and odd lines of the second thinned-out image, and even lines of the first thinned-out image and even lines of the second thinned-out image, subjected to horizontal packing by said horizontal processing circuitry; and transmission circuitry configured to transmit the encoded data generated by said encoding circuitry, and the vertical pattern flag generated by said flag generating circuitry.

9. An image processing method comprising:

an image processing device taking, as an object of processing, a first thinned-out image obtained by thinning out pixels of a first image in an oblique direction, and a second thinned-out image obtained by thinning out pixels of a second image which differs from the first image in an oblique direction, and performing horizontal packing in which, as horizontal processing for manipulating the array of pixels in the horizontal direction, pixels of said first thinned-out image and pixels of said second thinned-out image are packed in the horizontal direction;

generating, as an encoding object image to serve as the object of prediction encoding, a combined image in which said first thinned-out image and said second thinned-out image subjected to horizontal packing by said horizontal processing are arrayed adjacently;

taking, as an object of processing, of said first thinned-out image and said second thinned-out image subjected to the horizontal packing, separate odd lines and even lines from said first thinned-out image and said second thinned-out image subjected to the horizontal packing, and generating post-vertical processing images including an image in which only said odd lines are arrayed and an image in which only said even lines are arrayed, as vertical processing to manipulate the vertical direction array of the pixels; and generating said combined image by adjacently arraying said post-vertical processing images.

10. An image processing device comprising:

separating circuitry configured to separate, into a first thinned-out image and a second thinned-out image subjected to horizontal packing by horizontal processing, a combined image obtained by taking, as an object of processing, a first thinned-out image obtained by thinning out pixels of a first image in an oblique direction, and a second thinned-out image obtained by thinning out pixels of a second image which differs from the first image in an oblique direction, and performing horizontal packing in which, as horizontal processing for manipulating the array of pixels in the horizontal direction, pixels of said first thinned-out image and pixels of said second thinned-out image are packed in the horizontal direction, and performing prediction encoding of a combined image combined by adjacently arraying said first thinned-out image and said second thinned-out image subjected to horizontal packing by said horizontal processing, and decoding the encoded data obtained thereby; and inverse horizontal processing circuitry configured to perform inverse horizontal processing, where said first thinned-out image and said second thinned-out image subjected to horizontal packing by said horizontal processing which have been separated by said separating circuitry are returned to said first thinned-out image and said second thinned-out image, wherein said combined image is an image obtained by
performing processing of taking, as an object of processing, a first thinned-out image and a second thinned-out image subjected to horizontal packing by said horizontal processing, separating odd lines and even lines from said first thinned-out image and said second thinned-out image subjected to horizontal packing by said horizontal processing, and generating post-vertical processing images including an image in which only said odd lines are arrayed and an image in which only said even lines are arrayed, as vertical processing to manipulate the vertical direction array of the pixels, and
arraying said post-vertical processing images, wherein said separating circuitry separates said combined image into said post-vertical processing images, and said image processing device further comprises inverse vertical processing circuitry configured to perform inverse processing to return said post-vertical processing images separated by said separating circuitry into the first thinned-out image and second thinned-out image subjected to horizontal packing by said horizontal processing.

11. The image processing device according to claim 10, further comprising:
receiving circuitry configured to receive said encoded data, and a separate flag indicating whether odd lines and even lines have been separated from said first thinned-out image and said second thinned-out image subjected to horizontal packing by said horizontal processing;
wherein, in the event that the separate flag received by said receiving circuitry indicates that odd lines and even lines have been separated from said first thinned-out image and said second thinned-out image subjected to horizontal packing by said horizontal processing, said vertical processing circuitry performs said inverse vertical processing.

12. The image processing device according to claim 10, wherein said post-vertical processing images are
a first odd image in which are arrayed only odd lines of the first thinned-out image subjected to horizontal packing by said horizontal processing,
a first even image in which are arrayed only even lines of the first thinned-out image subjected to horizontal packing by said horizontal processing,
a second odd image in which are arrayed only odd lines of the second thinned-out image subjected to horizontal packing by said horizontal processing, and
a second even image in which are arrayed only even lines of the second thinned-out image subjected to horizontal packing by said horizontal processing;
wherein said separating circuitry separates said combined image into said first odd image, said first even image, said second odd image, and said second even image; and
said vertical processing circuitry returns said first odd image, said first even image, said second odd image, and said second even image, separated by said separating circuitry, to the first thinned-out image and second thinned-out image subjected to horizontal packing by said horizontal processing.

13. The image processing device according to claim 12, further comprising:
receiving circuitry configured to receive said encoded data, and an arrange pattern flag indicating an array pattern of said first odd image, said first even image, said second odd image, and said second even image;
wherein, based on the arrange pattern flag received by said receiving circuitry, said separating circuitry distinguish and separate, from said combined image, said first odd image, said first even image, said second odd image, and said second even image.

14. The image processing device according to claim 12, further comprising:
receiving circuitry configured to receive said encoded data, and a vertical pattern flag indicating, in said post-vertical processing image, the array of odd lines of the first thinned-out image and odd lines of the second thinned-out image, and even lines of the first thinned-out image and even lines of the second thinned-out image, subjected to horizontal packing by said horizontal processing;
wherein said post-vertical processing image is
the four images of
an image in which are arrayed only odd lines of the first thinned-out image subjected to horizontal packing by said horizontal processing,
an image in which are arrayed only even lines of the first thinned-out image subjected to horizontal packing by said horizontal processing,
an image in which are arrayed only odd lines of the second thinned-out image subjected to horizontal packing by said horizontal processing, and
an image in which are arrayed only even lines of the second thinned-out image subjected to horizontal packing by said horizontal processing, or
the two images of
a post-vertical-processing odd line image in which are arrayed, in an interleaved manner, odd lines of the first thinned-out image and odd lines of the second thinned-out image subjected to horizontal packing by said horizontal processing, and
a post-vertical-processing even line image in which are arrayed, in an interleaved manner, even lines of the first thinned-out image and even lines of the second thinned-out image subjected to horizontal packing by said horizontal processing;
wherein said separating circuitry separate said combined image into said four images or said two images, based on the vertical pattern flag received by said receiving circuitry; and
wherein said inverse vertical processing circuitry return said four images or said two images into the first thinned-out image and the second thinned-out image horizontally packed by said horizontal processing, based on said vertical pattern flag.

15. The image processing device according to claim 10, wherein said post-vertical processing images are
a post-vertical-processing odd line image in which are arrayed, in an interleaved manner, odd lines of the first thinned-out image and odd lines of the second thinned-out image subjected to horizontal packing by said horizontal processing, and
a post-vertical-processing even line image in which are arrayed, in an interleaved manner, even lines of the first thinned-out image and even lines of the second thinned-out image subjected to horizontal packing by said horizontal processing;

wherein said separating circuitry separate said combined image into said post-vertical-processing odd line image and said post-vertical-processing even line image; and wherein said inverse vertical processing circuitry return the post-vertical-processing odd line image and post-vertical-processing even line image separated by said separating circuitry into the first thinned-out image and second thinned-out image subjected to horizontal packing by said horizontal processing.

16. The image processing device according to claim 15, wherein said first image and said second image are interlace format images;

wherein said first thinned-out image is an image in which are adjacently arrayed a first thinned out odd field obtained by thinning out pixels of the odd field configuring a frame of said first image in an oblique direction, and a first thinned out even field obtained by thinning out pixels of the even field configuring the frame of said first image in an oblique direction;

wherein said second thinned-out image is an image in which are adjacently arrayed a second thinned out odd field obtained by thinning out pixels of the odd field configuring a frame of said second image in an oblique direction, and a second thinned out even field obtained by thinning out pixels of the even field configuring the frame of said second image in an oblique direction;

said image processing device further comprises:
post-processing circuitry configured to
return said first thinned-out image obtained by said inverse horizontal processing to said first thinned-out odd field and said first thinned-out even field, and
return said second thinned-out image obtained by said inverse horizontal processing to said second thinned-out odd field and said second thinned-out even field.

17. The image processing device according to claim 16, wherein said post-processing circuitry
separate said first thinned-out image into
a first odd line field which is an odd field of said first thinned-out image, in which are arrayed only odd lines of said first thinned-out odd field and odd lines of said first thinned-out even field, and
a first even line field which is an even field of said first thinned-out image, in which are arrayed only even lines of said first thinned-out odd field and even lines of said first thinned-out even field, and
separate said second thinned-out image into
a second odd line field which is an odd field of said second thinned-out image, in which are arrayed only odd lines of said second thinned-out odd field and odd lines of said second thinned-out even field, and
a second even line field which is an even field of said second thinned-out image, in which are arrayed only even lines of said second thinned-out odd field and even lines of said second thinned-out even field, return said first odd line field and said first even line field to said first thinned-out odd field and said first thinned-out even field, and
return said second odd line field and said second even line field to said second thinned-out odd field and said second thinned-out even field.

18. An image processing method comprising:
an image processing device
separating, into a first thinned-out image and a second thinned-out image subjected to horizontal packing by said horizontal processing, a combined image obtained by
taking, as an object of processing, a first thinned-out image obtained by thinning out pixels of a first image in an oblique direction, and a second thinned-out image obtained by thinning out pixels of a second image which differs from the first image in an oblique direction, and performing horizontal packing in which, as horizontal processing for manipulating the array of pixels in the horizontal direction, pixels of said first thinned-out image and pixels of said second thinned-out image are packed in the horizontal direction, and
performing prediction encoding of the combined image combined by adjacently arraying said first thinned-out image and said second thinned-out image subjected to horizontal packing by said horizontal processing, and decoding the encoded data obtained thereby;
performing inverse horizontal processing, where said first thinned-out image and said second thinned-out image subjected to horizontal packing by said horizontal processing are returned to said first thinned-out image and said second thinned-out image, wherein
said combined image is an image obtained by
performing processing of taking, as an object of processing, a first thinned-out image and a second thinned-out image subjected to horizontal packing by said horizontal processing, separating odd lines and even lines from said first thinned-out image and said second thinned-out image subjected to horizontal packing by said horizontal processing, and generating post-vertical processing images including an image in which only said odd lines are arrayed and an image in which only said even lines are arrayed, as vertical processing to manipulate the vertical direction array of the pixels, and
arraying said post-vertical processing images, and
said combined image is separated into said post-vertical processing images and the image processing device performs inverse processing to return said post-vertical processing images separated by said separating into the first thinned-out image and second thinned-out image subjected to horizontal packing by said horizontal processing.

* * * * *